US010796003B2

(12) United States Patent
Yamada et al.

(10) Patent No.: US 10,796,003 B2
(45) Date of Patent: Oct. 6, 2020

(54) DIVIDED INTEGRITY VERIFICATION USING MEMORY SEGMENT PROTECTION

(71) Applicant: TOSHIBA MEMORY CORPORATION, Minato-ku (JP)

(72) Inventors: Naoko Yamada, Yokohama (JP); Jun Kanai, Inagi (JP); Shinya Takumi, Kawasaki (JP); Hiroshi Isozaki, Kawasaki (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 68 days.

(21) Appl. No.: 15/701,082

(22) Filed: Sep. 11, 2017

(65) Prior Publication Data

US 2018/0137285 A1 May 17, 2018

(30) Foreign Application Priority Data

Nov. 17, 2016 (JP) ................. 2016-224356

(51) Int. Cl.
| | | |
|---|---|---|
| *G06F 21/57* | (2013.01) | |
| *G06F 21/51* | (2013.01) | |
| *G06F 21/64* | (2013.01) | |
| *G06F 12/02* | (2006.01) | |
| *G06F 21/55* | (2013.01) | |
| *G06F 21/52* | (2013.01) | |
| *G06F 12/14* | (2006.01) | |

(52) U.S. Cl.
CPC .......... *G06F 21/575* (2013.01); *G06F 12/023* (2013.01); *G06F 12/1441* (2013.01); *G06F 21/51* (2013.01); *G06F 21/52* (2013.01); *G06F 21/554* (2013.01); *G06F 21/64* (2013.01); *G06F 2212/1052* (2013.01); *G06F 2221/2145* (2013.01)

(58) Field of Classification Search
None
See application file for complete search history.

(56) References Cited

U.S. PATENT DOCUMENTS

| 7,543,150 B2 | 6/2009 | Kudo et al. |
| 8,453,206 B2 | 5/2013 | Haga et al. |

(Continued)

FOREIGN PATENT DOCUMENTS

| JP | 2006-39888 | 2/2006 |
| JP | 2006-209690 A | 8/2006 |

(Continued)

*Primary Examiner* — Gary W. Cygiel
(74) *Attorney, Agent, or Firm* — Oblon, McClelland, Maier & Neustadt, L.L.P.

(57) ABSTRACT

According to one embodiment, an information processing apparatus includes a first memory, a signal generation unit, an integrity check unit, and an access-right update unit. Firmware is stored in the first memory. The signal generation unit is configured to generate a signal when there is access violating access right, to the first memory. The integrity check unit is configured to perform, when the access violating access right is a verification request with respect to a predetermined verification target region, integrity check with respect to the verification target region in response to the signal. The access-right update unit is configured to update access right corresponding to the verification target region, to which the integrity check has been performed.

15 Claims, 43 Drawing Sheets

(56) References Cited

U.S. PATENT DOCUMENTS

| | | | | |
|---|---|---|---|---|
| 10,089,498 B2* | 10/2018 | Edwards | ............ | G06F 21/52 |
| 2005/0114687 A1* | 5/2005 | Zimmer | ............ | G06F 9/4401 |
| | | | | 713/193 |
| 2007/0061570 A1* | 3/2007 | Holtzman | ............ | G06F 21/57 |
| | | | | 713/168 |
| 2008/0077973 A1* | 3/2008 | Zimmer | ............ | G06F 9/468 |
| | | | | 726/2 |
| 2015/0370726 A1 | 12/2015 | Hashimoto et al. | | |

FOREIGN PATENT DOCUMENTS

| | | |
|---|---|---|
| JP | 2016-9884 | 1/2016 |
| JP | 2046-9884 | 1/2016 |
| WO | 2008/056700 | 5/2008 |

* cited by examiner

| REGION NUMBER | START ADDRESS | SIZE | READ RIGHT | WRITE RIGHT | EXECUTION PROHIBITION |
|---|---|---|---|---|---|
| 1 | 0x0000 | 0x10000 | NO | NO | YES |
| 2 | 0x0000 | 0xb000 | YES | NO | NO |
| 3 | 0x8000 | 0x8000 | YES | YES | YES |

| BLOCK NUMBER | START ADDRESS | SIZE | VERIFICATION DATA | ACCESS RIGHT TO BE GRANTED | VERIFICATION STATE | REGION NUMBER |
|---|---|---|---|---|---|---|
| BLOCK A | 0x0000 | 0x1000 | MAC1 | Read | VERIFIED | 3 |
| BLOCK B | 0x1000 | 0x2000 | MAC2 | Read | UNVERIFIED | 4 |
| BLOCK C | 0x3000 | 0x8000 | MAC3 | Read, Write | UNVERIFIED | 5 |

| REGION NUMBER | START ADDRESS | SIZE | READ RIGHT | WRITE RIGHT | EXECUTION PROHIBITION | SUBSIDIARY REGION |
|---|---|---|---|---|---|---|
| 1 | 0x0000 | 0x10000 | NO | NO | YES | Sub 1= ENABLED<br>Sub 2= ENABLED<br>Sub 3= ENABLED |
| 2 | 0x0000 | 0xb000 | YES | NO | NO | Sub 1= ENABLED<br>Sub 2= DISABLED<br>Sub 3= ENABLED |
| 3 | 0x8000 | 0x8000 | YES | YES | YES | Sub 1= DISABLED<br>Sub 2= ENABLED<br>Sub 3= ENABLED |

| BLOCK NUMBER | START ADDRESS | SIZE | VERIFICATION DATA | VERIFICATION STATE | REGION NUMBER | SUBSIDIARY REGION NUMBER |
|---|---|---|---|---|---|---|
| BLOCK A | 0x0000 | 0x1000 | MAC1 | VERIFIED | 3 | 1 |
| BLOCK B | 0x1000 | 0x1000 | MAC2 | UNVERIFIED | 3 | 2 |
| BLOCK C | 0x2000 | 0x1000 | MAC3 | UNVERIFIED | 3 | 3 |

FIG.24

| BLOCK NUMBER | REFERENCE ADDRESS | SIZE | VERIFICATION DATA | ACCESS RIGHT TO BE GRANTED | LOAD SOURCE ADDRESS | LOAD | VERIFICATION STATE | REGION NUMBER |
|---|---|---|---|---|---|---|---|---|
| BLOCK A | 0x0000 | 0x1000 | MAC1 | Read | - | NO | VERIFIED | 5 |
| BLOCK B | 0x10000 | 0x2000 | MAC2 | Read | 0x1000 | YES | UNVERIFIED | 6 |
| BLOCK C | 0x11000 | 0x8000 | MAC3 | Read, Write | 0x3000 | YES | UNVERIFIED | 7 |

| BLOCK NUMBER | REFERENCE ADDRESS | SIZE | ACCESS RIGHT TO BE GRANTED | LOAD SOURCE ADDRESS | LOAD | PRESENCE OR ABSENCE OF CRYPTOGRAPHIC PROCESSING | ACCESS STATE | REGION NUMBER |
|---|---|---|---|---|---|---|---|---|
| BLOCK A | 0x0000 | 0x1000 | Read | - | NO | ABSENT | ACCESSED | 5 |
| BLOCK B | 0x10000 | 0x2000 | Read | 0x1000 | YES | PRESENT | NOT ACCESSED | 6 |
| BLOCK C | 0x11000 | 0x8000 | Read, Write | 0x2000 | YES | PRESENT | NOT ACCESSED | 7 |

174

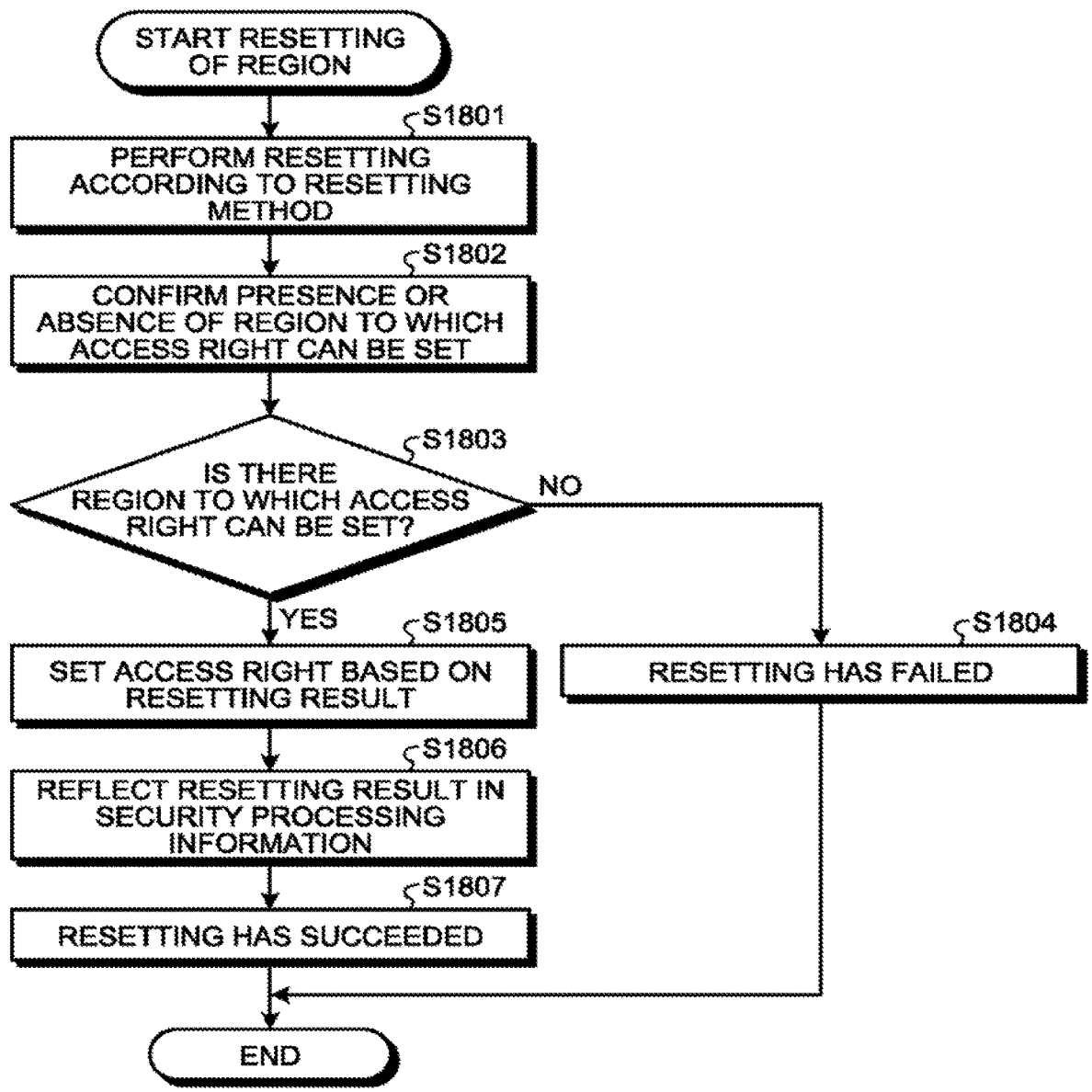

DIVIDED INTEGRITY VERIFICATION USING MEMORY SEGMENT PROTECTION

CROSS-REFERENCE TO RELATED APPLICATIONS

This application is based upon and claims the benefit of priority from Japanese Patent Application No. 2016-224356, filed on Nov. 17, 2016; the entire contents of which are incorporated herein by reference.

FIELD

Embodiments described herein relate generally to an information processing apparatus and a computer program product.

BACKGROUND

In recent years, many security techniques have been proposed with respect to high-end information devices such as a personal computer and a server. Particularly, Secure Boot that performs integrity check with respect to a program at the time of activating a device has been introduced to various devices as an execution preventing mechanism of a program not intended. However, because Secure Boot performs integrity check for the entire program at the time of activating, the time required for activating increases. Therefore, a divided verification technique that performs integrity check only for a portion required for activating at the time of activating, and integrity check is performed later for other portions has been proposed.

However, the conventional divided verification technique assumes execution by the high-end information devices, and the conventional divided verification technique cannot be applied as it is to low-end information devices that do not have high-performance hardware resources. Therefore, construction of a mechanism that can realize the appropriate divided verification with respect to the low-end information devices has been desired.

BRIEF DESCRIPTION OF THE DRAWINGS

FIG. 3 is a diagram illustrating an example of access right information;

FIG. 4 is a diagram illustrating an example of security processing information;

FIG. 14 is a diagram illustrating an example of access right information;

FIG. 15 is a diagram illustrating an example of security processing information;

FIG. 24 is a diagram illustrating an example of security processing information;

FIG. 29 is a diagram illustrating an example of security processing information;

FIG. 46 is a flowchart illustrating a processing flow of resetting a region.

DETAILED DESCRIPTION

Figure 1:
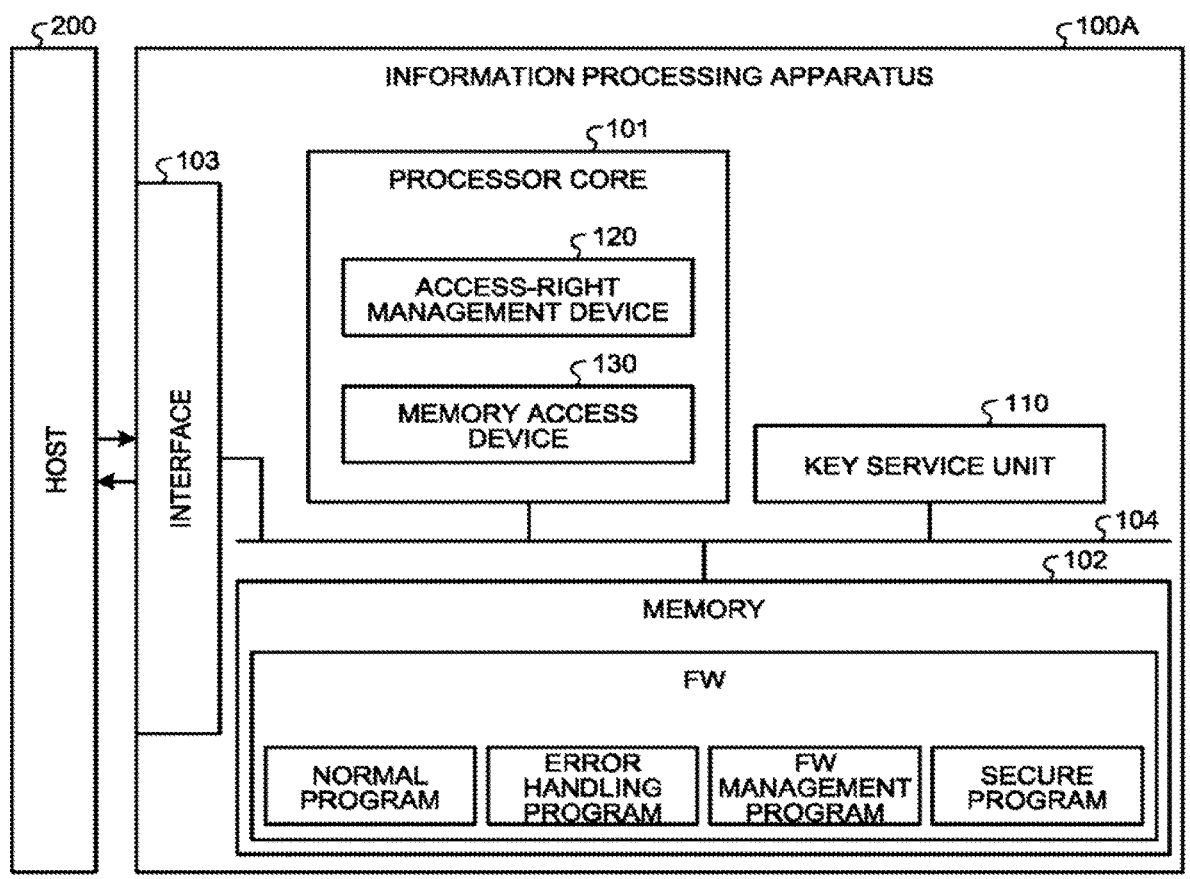
FIG. 1 is a block diagram illustrating a schematic configuration of an information processing apparatus.

An information processing apparatus according to an embodiment is an information processing apparatus including a first memory, a signal generation unit, an integrity check unit, and an access-right update unit. Firmware is stored in the first memory. The signal generation unit is configured to generate a signal when there is access violating access right, to the first memory. The integrity check unit is configured to perform, when the access violating access right is a verification request with respect to a predetermined verification target region, integrity check with respect to the verification target region in response to the signal. The access-right update unit is configured to update access right corresponding to the verification target region, to which the integrity check has been performed.

An information processing apparatus and a program according to embodiments are described below. The information processing apparatus and the program according to the embodiments perform divided verification of firmware, and particularly realize appropriate divided verification in a single device even if the device is a low-end information device.

As a conventional technique related to divided verification of the firmware, for example, there is a technique to realize divided verification of a boot program (boot image) under a network boot environment. In this conventional technique, the boot program (boot image) is fragmented in advance, and an electronic signature and priority are added to each fragmented boot image. The fragmented boot image is loaded from a centralized server to respective calculator resources to perform signature verification according to the priority, thereby enabling to perform divided verification of the boot image. However, the conventional technique has a configuration to load the fragmented boot image from the centralized server to the calculator resources. Because it is difficult to realize the centralized server in a low-end information device such as storage drives or home electronics, divided verification by a single low-end information device cannot be realized even if the conventional technique is applied. Further, in the conventional technique, because the load sequence of the fragmented boot image is fixed, it is not easy to change the load sequence flexibly by the calculator resources depending on processing details.

There is also a technique to realize divided verification by using a paging technique in a virtualized environment. In the conventional technique, a memory in which the boot image is loaded is divided into a unit of page by the paging technique, and a page fault is forcibly generated at the time of execution of data, thereby enabling to perform divided verification of the boot image. However, because the conventional technique assumes the virtualized environment and the paging technique, the technique cannot be applied as it is to the low-end information device that does not include an MMU (Memory Management Unit) required for realizing paging. The MMU is a memory protection mechanism by a paging method, and provides memory protection in a unit of page and a virtual memory mechanism.

On the other hand, the low-end information device includes an MPU (Memory Protection Unit) as a memory protection mechanism. The MPU is basically different from the MMU of the paging method, and is a memory protection mechanism by a segment method. The information processing apparatus and the program according to the embodiments use, for example, the technique of the MPU to realize detection of an unverified region at an arbitrary timing, thereby enabling to realize appropriate divided verification by a single low-end information device. According to the information processing apparatus and the program of the embodiments, the verification sequence can be flexibly changed without relying on the number of upper limits of the segments.

A specific application example of the information processing apparatus and the program according to the embodiments is described below in detail with reference to the drawings. In the respective embodiments, an application example to the information processing apparatus configured as a storage drive such as an SSD (Solid State Drive) is assumed. However, the applicable information processing apparatus is not limited thereto. The information processing apparatus and the program according to the embodiments can be widely applied to various low-end information devices such as home electronics.

First Embodiment

A first embodiment is described first. In the following descriptions, notation of "data" includes data constituting the program itself other than data referred to by the program. The information processing apparatus according to the first embodiment has a mechanism of preventing unintended use of data by performing integrity check in a unit of block having an arbitrary size at the time of using data.

FIG. 1 is a block diagram illustrating a schematic configuration of an information processing apparatus 100A according to the first embodiment. As illustrated in FIG. 1, the information processing apparatus 100A includes a processor core 101, a memory 102, and a key service unit 110. The processor core 101 is provided with an access-right management device 120 and a memory access device 130. Firmware (hereinafter, FW) is stored in the memory 102. The FW includes a normal program, an error handling program, an FW management program, and a secure program. Various constituent elements of the information processing apparatus 100A illustrated in FIG. 1 is configured by hardware, software, or a combination of hardware and software.

The information processing apparatus 100A is connected to a host 200 via an interface 103, and performs communication with the host 200. An interface for a storage drive such as a parallel ATA, a serial ATA, an SCSI (Small Computer System Interface), and an SAS (Serial Attached SCSI) can be used as the interface 103. Other interfaces such as the Ethernet® or a USB (Universal Serial Bus) can be used as the interface 103. The host 200 is a device that operates the information processing apparatus 100A, and various devices using the information processing apparatus 100A such as a personal computer, a server, a television, and a smartphone are assumed. The host 200 can be a device such as a RAID (Redundant Arrays of Inexpensive Disks) controller that operates and manages the information processing apparatus 100A by collecting information processing apparatuses 100A as one apparatus, or can be other devices.

The processor core 101, the memory 102, the key service unit 110, and the interface 103 of the information processing apparatus 100A are connected to an external bus 104.

Figure 2:
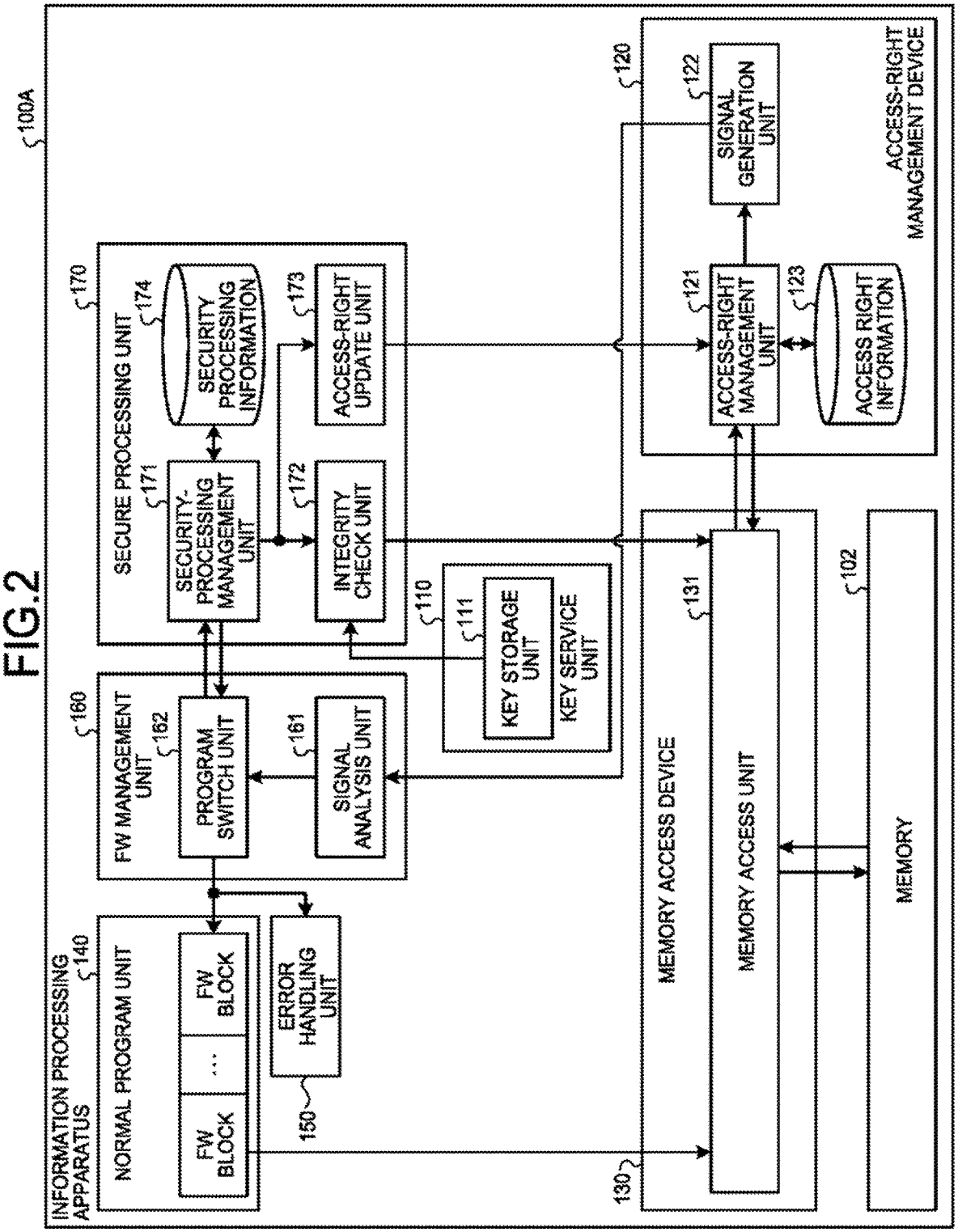
FIG. 2 is a block diagram illustrating a functional configuration example of the information processing apparatus.

FIG. 2 is a block diagram illustrating a functional configuration example of the information processing apparatus 100A according to the first embodiment. As illustrated in FIG. 2, the information processing apparatus 100A includes, as functional constituent elements, a normal program unit 140, an error handling unit 150, an FW management unit 160, and a secure processing unit 170, in addition to the memory access device 130, the access-right management device 120, and the key service unit 110.

The memory access device 130 includes a memory access unit 131 that accesses the memory 102.

The access-right management device 120 includes an access-right management unit 121 that performs access right management of the memory 102 and a signal generation unit 122 that generates a signal when access violating the access right occurs. The access-right management device 120 holds access right information 123, which is information related to the access right for each region set in the memory 102. Setting of the access right is described later in detail with reference to FIG. 7.

The key service unit 110 includes a key storage unit 111 that stores key information.

The normal program unit 140 is a functional module that performs normal processing of the FW.

The error handling unit 150 is a functional module to be performed at the time of abnormal end of the FW.

The FW management unit 160 is a functional module that manages the FW, and includes a signal analysis unit 161 that analyzes signals, and a program switch unit 162 that switches programs.

The secure processing unit 170 is a functional module that performs security processing, and includes a security-processing management unit 171 that manages security processing, an integrity check unit 172 that performs integrity check with respect to data on the memory 102, and an access-right update unit 173 that updates the access right with respect to a memory space of the memory 102. The secure processing unit 170 holds security processing information 174 being information required for the security processing.

In the first embodiment, an example in which the normal program unit 140, the error handling unit 150, the FW management unit 160, and the secure processing unit 170 are realized by programs included in the FW is described. That is, the first embodiment is described by using an example in which the normal program unit 140, the error handling unit 150, the FW management unit 160, and the secure processing unit 170 are assumed to be a normal program, an error handling program, an FW management program, and a secure program, respectively, and are realized as one piece of FW. However, the respective constituent elements may each be realized as hardware independent of the FW. The programs constituting the FW may each be realized as an individual executable file, or may each be realized as a part of an executable file including a plurality of programs.

Detailed functions of the respective units are described below.

The memory access unit 131 performs access (Read, Write, and instruction execution) to the memory 102. Examples of the memory 102 include a MaskROM (Mask Read Only Memory), a PROM (Programmable Read Only Memory), an EPROM (Erasable Programmable Read Only Memory), an EEPROM (Electrically Erasable Programmable Read Only Memory), a NAND flash memory, a NOR flash memory, an MRAM (Magnetoresistive Random Access Memory), a PRAM (Phase change Random Access Memory), a ReRAM (Resistive Random Access Memory), a FeRAM (Ferroelectric Random Access Memory), an SRAM (Static Random Access Memory), and a DRAM (Dynamic Random Access Memory), and the memory 102 can be also other types of semiconductor memories.

The access right information 123 indicates the access right with respect to the memory space having an arbitrary size. The memory space to which the access right is set is referred to as "region". That is, region setting with respect to the memory space of the memory 102 and setting of the access right have equivalent meaning. The access right information 123 is stored in a unit of region.

FIG. 3 is a diagram illustrating an example of the access right information 123. For example, as illustrated in FIG. 3, the access right information 123 includes region number for identifying the region, start address of the region, region size, and flag indicating the type of the access right set to the region (presence or absence of Read right, presence or absence of Write right, and presence or absence of execution prohibition). In addition, the access right information 123 can include information such as an enabled flag and right of mode (privilege mode/user mode). In the access right information 123 exemplified in FIG. 3, a range of the region is represented by the start address and the size. However, the range of the region can be represented by the start address and an end address by using the end address of the region instead of the size.

The access-right management unit 121 manages the access right information 123 and detects a memory access violation of the memory access unit 131. Management of the access right information 123 performed by the access-right management unit 121 is to perform reference, registration, addition, and deletion with respect to the access right information 123. The access-right management unit 121 can perform other operations such as access management to the access right information 123. The access-right management unit 121 monitors memory access by the memory access unit 131, and requests the signal generation unit 122 to generate a signal if access violating the access right indicated by the access right information 123 occurs.

The signal generation unit 122 generates a signal upon reception of the signal generation request from the access-right management unit 121. The signal is described here as an interrupt (or exception, fault). However, other methods can be used.

The signal analysis unit 161 receives the signal generated by the signal generation unit 122, and analyzes the cause. In the case of interrupt, there are different causes even for the same interrupt. Accordingly, the interrupt cause can be analyzed by using an interrupt-cause analysis register or the like incorporated in the processor core 101. Different causes even for the same interrupt mean, for example, alignment fault and permission fault, for both of which the processor core 101 receives an interrupt as a memory fault. However, the cause of the alignment fault is a memory alignment violation, and the cause of the permission fault is an access right violation. Therefore, even for the same interrupt, the interrupt cause is different. The result of signal analysis by the signal analysis unit 161 is notified to the program switch unit 162.

The program switch unit 162 switches the program to be executed by the processor core 101, upon reception of the notified contents. When the result of signal analysis is notified from the signal analysis unit 161, the program switch unit 162 switches the program to be executed by the processor core 101 according to the result of the signal analysis. Meanwhile, when a switching destination is notified from the security-processing management unit 171 during execution of the secure program, the program switch unit 162 switches the program to be executed by the processor core 101 from the secure program to a program at the notified switching destination.

The security processing information 174 is information required for the security processing by the secure processing unit 170, and particularly includes various pieces of information related to a verification target region. The verification target region is a memory space preset as a target of divided verification, and includes not only a memory space (region) to which the access right has been set, but also a memory space to which the access right has not been set. The verification target region to which integrity check has been performed by the integrity check unit 172 is referred to as "verified region", and the verification target region to which integrity check has not been performed by the integrity check unit 172 is referred to as "unverified region".

FIG. 4 is a diagram illustrating an example of the security processing information 174. The security processing information 174 includes, for example as illustrated in FIG. 4, start address of verification target region, size of verification target region, verification data used for integrity check, access right to be granted to the verification target region when having succeeded in integrity check, and verification state indicating whether the verification target region is a verified region or an unverified region.

For convenience sake, the first embodiment is described while assuming that the normal program of the FW includes three FW blocks of a block A, a block B, and a block C, and memory spaces corresponding to these three FW blocks each are set as the verification target region. In this case, the security processing information 174 can include, as exemplified in FIG. 4, block number for identifying the FW block corresponding to each verification target region, and region number for identifying the region when the access right indicated by the access right to be granted to the verification target region is set. Further, the security processing information 174 exemplified in FIG. 4 represents the range of the verification target region by the start address and the size. However, the range of the verification target region can be represented by the start address and an end address by using the end address of the verification target region instead of the size.

As the verification data, for example, a hash value or a MAC value generated by a verification technique such as a hash being a measure for data falsification and a message authentication code (MAC) can be used, or a method of confirming the presence or absence of data corruption, such as electronic signature, check sum, CRC (Cyclic Redundancy Check), and data comparison of a specific address, and other methods can be used. As a representative method, there are MD5 (Message Digest Algorithm 5) and SHA (Secure Hash Algorithm) as the hash, and HMAC (Hash-based MAC) and CMAC (Cipher-based MAC) as the MAC. Other than those methods, as the electronic signature, there are many algorithms such as RSA signature, and in the first embodiment, any algorithm can be used.

As the access right to be set to the verification target region in which integrity check has succeeded, the same authority as that of the access having generated an access right violation can be set, among the authorities indicated by the access right granted by the security processing information 174. For example, when integrity check is performed at the time of Read access to the unverified region even if the access right granted by the security processing information 174 includes the Read right and the Write right, only the Read right can be granted. In this case, when the Write access occurs with respect to the verification target region, a signal is generated again. The integrity check can be performed again in response to the signal, or the integrity check can be skipped because the integrity check has been performed once. By granting the access right in this manner, the Write right can be granted only to the region in which the Write access is really needed. Therefore, the access right granted to the regions can be minimized, thereby enabling to improve the security.

The security-processing management unit 171 performs management of the security processing with respect to the memory space in which an access right violation has occurred, management of the security processing information 174, and boot processing. The security-processing management unit 171 collates the security processing information 174, an address at which an access right violation has occurred, and violation information. When having determined that the access right violation is a verification request, the security-processing management unit 171 requests verification with respect to the integrity check unit 172. Further, when it is notified from the integrity check unit 172 that verification has succeeded, the security-processing management unit 171 requests the access-right update unit 173 to update the access right with respect to the memory space in which verification has been succeeded, and records that the memory space has been verified in the security processing information 174.

The violation information to be used by the security-processing management unit 171 to determine the verification request is information that can be acquired when an access right violation has occurred. For example, information indicating as to which of instruction execution and data access the access right violation has occurred can be used, or information of access that has caused the access right violation (an access right violation has been caused at the time of execution of Read access) can be used. Further, the security-processing management unit 171 performs processing at the time of activating described later.

The integrity check unit 172 performs integrity check with respect to the memory space specified by the security-processing management unit 171 to detect the presence or absence of falsification. The integrity check unit 172 receives the verification data included in the security processing information 174 from the security-processing management unit 171, and receives the key information stored in the key storage unit 111, to perform integrity check according to a predetermined algorithm, and notifies the security-processing management unit 171 of the result. It is assumed here that the integrity check unit 172 can access the memory 102, regardless of the access right to the memory 102. This can be realized by disabling a part or all of the functions of the access-right management device 120 at the time of access from the integrity check unit 172, or can be realized by using a separate means for the memory access by the integrity check unit 172, which is different from the memory access involved with the access-right management device 120, for example, by using a dedicated memory bus.

The access-right update unit 173 requests the access-right management unit 121 to update the access right to the memory space specified from the security-processing management unit 171. Upon reception of the request, the access-right management unit 121 performs registration, addition, or deletion of the access right information 123, thereby updating the access right to the specified memory space.

The normal program unit 140 is realized by the normal program of the FW. The normal program is constituted by one or more FW blocks, to perform read and write (Read, Write) with respect to the memory 102 and execute the program in the memory 102 via the memory access unit 131. It is assumed that the FW blocks are obtained by dividing the normal program according to a predetermined method and the individual FW block does not need to have the same size. In the first embodiment, as described above, the normal program is constituted by the three FW blocks of the block A, the block B, and the block C, and it is assumed that memory spaces corresponding to these FW blocks are set in the verification target region.

The error handling unit 150 is realized by the error handling program of the FW. The error handling program is executed when an abnormal state occurs during execution of the FW. The error handling program can be realized as the FW block included in the normal program, or can be realized as a part of the FW management program or a part of the secure program.

Figure 5:
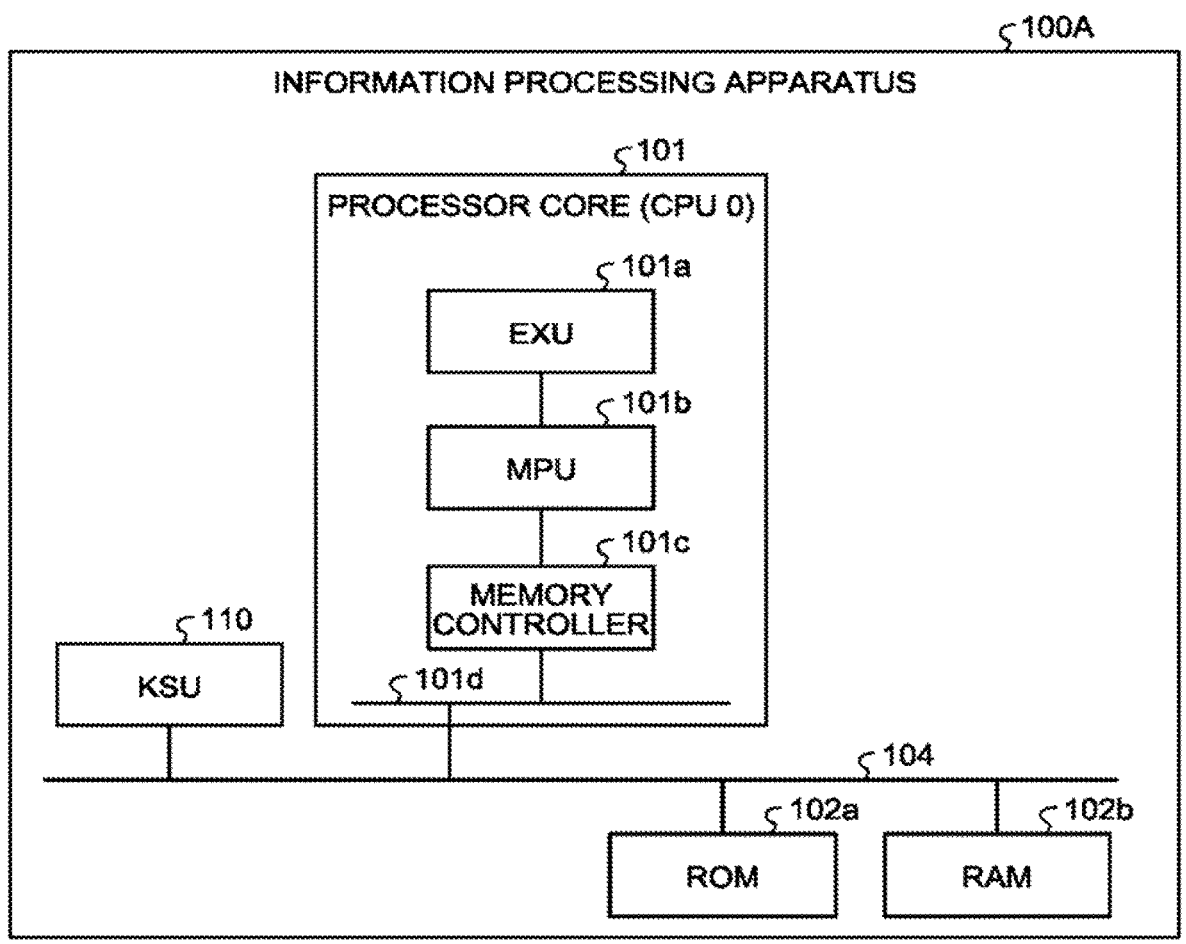
FIG. 5 is a block diagram illustrating a hardware configuration example of the information processing apparatus.

FIG. 5 is a block diagram illustrating a hardware configuration example of the information processing apparatus 100A according to the first embodiment. The information processing apparatus 100A includes, for example as illustrated in FIG. 5, the processor core (CPU0) 101, the key service unit (KSU) 110, a ROM (Read Only Memory) 102a, a RAM (Random Access Memory) 102b, and the external bus 104. The ROM 102a and the RAM 102b correspond to the memory 102 illustrated in FIG. 1 and FIG. 2. It is assumed that the processor core (CPU0) 101, the ROM 102a, and the RAM 102b can transmit and receive data, signals, and instructions to and from each other via the external bus 104. It is assumed that the key service unit (KSU) 110 can transmit and receive data, signals, and instructions only to and from a device to which access is permitted.

The processor core (CPU0) 101 includes an instruction execution unit (EXU) 101a that executes an instruction, a memory protection unit (MPU) 101b that protects the memory 102, a memory controller 101c that performs access to the memory 102, and an internal bus 101d. It is assumed that the instruction execution unit (EXU) 101a, the memory protection unit (MPU) 101b, and the memory controller 101c can transmit and receive data, signals, and instructions to and from each other via the internal bus 101d. In the first embodiment, it is assumed that the memory controller 101c is used as the memory access device 130 illustrated in FIG. 1 and FIG. 2, and the memory protection unit (MPU) 101b is used as the access-right management device 120 illustrated in FIG. 1 and FIG. 2.

The processor core (CPU0) 101 performs data access by using the memory controller 101c. At this time, the memory protection unit (MPU) 101b confirms the access right to the data to which the instruction execution unit (EXU) 101a performs access. If the access violates a predetermined access right, the memory protection unit (MPU) 101b generates an interrupt to the instruction execution unit (EXU) 101a. If the access does not violate the access right, the memory controller 101c performs data access.

The key service unit (KSU) 110 stores therein the key information to be used for the security processing. Access to the key service unit (KSU) 110 can be limited and the key service unit (KSU) 110 can be accessed only from a specified device. For example, when another processor core (CPUx) is present on the external bus 104, it can be set such that the key service unit (KSU) 110 can be accessed from the processor core (CPU0) 101 but cannot be accessed from the other processor core (CPUx). In the first embodiment, it is set such that only the processor core (CPU0) 101 can access the key service unit (KSU) 110. Further, when encryption and integrity check are performed by using hardware, the key service unit (KSU) 110 can include encryption hardware and integrity check hardware. Further, the key service unit (KSU) 110 can be realized in the processor core (CPU0) 101. In this case, the instruction execution unit (EXU) 101a, the memory protection unit (MPU) 101b, the memory controller 101c, and the key service unit (KSU) 110 can transmit and receive data, signals, and instructions to and from each other via the internal bus 101d.

Figure 6:
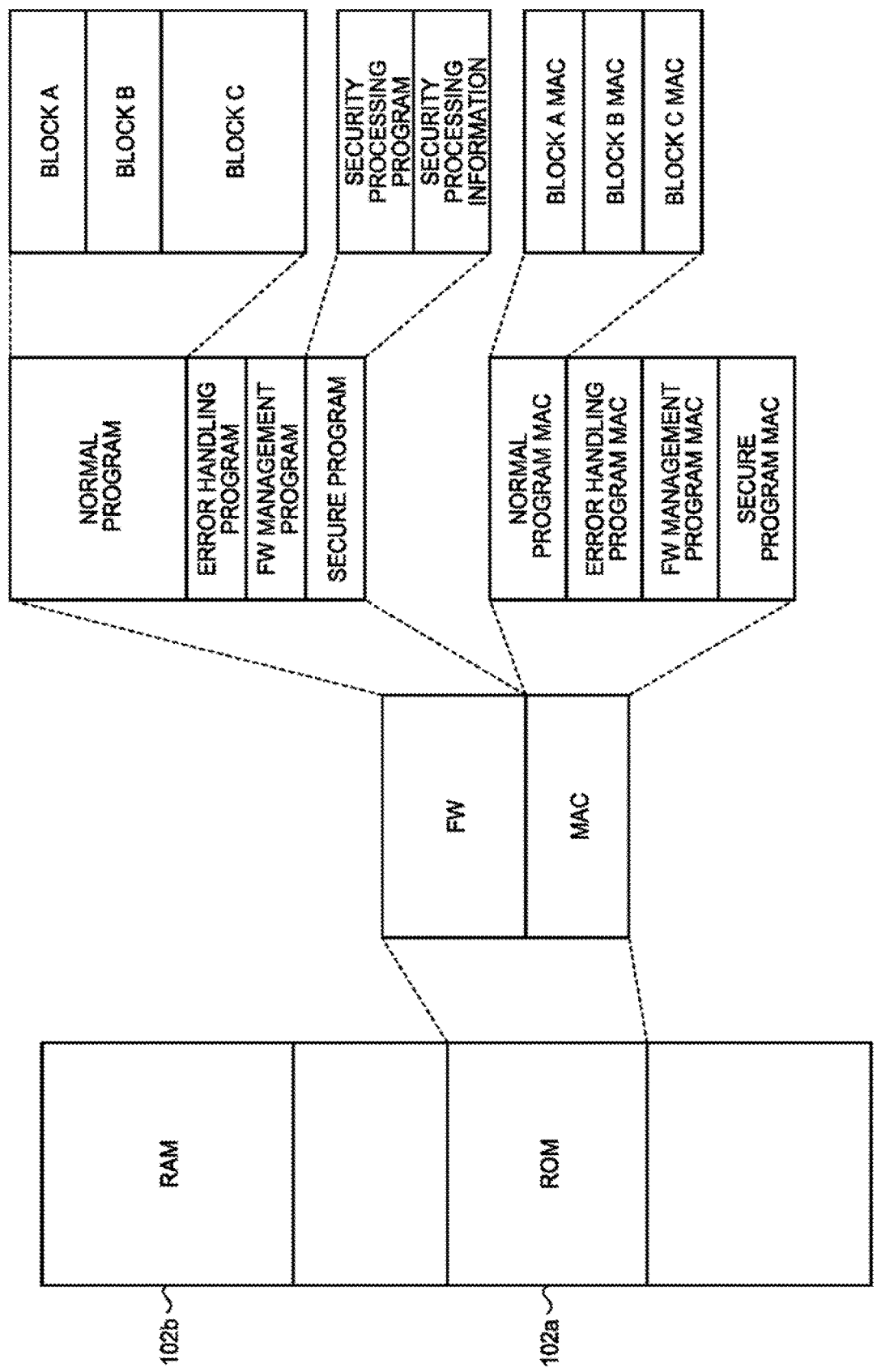
FIG. 6 is a diagram illustrating an example of a memory map.

A memory map assumed in the first embodiment is described next. FIG. 6 is a diagram illustrating an example of the memory map in the first embodiment. In the first embodiment, such an example is described that the ROM 102a and the RAM 102b are mapped in the same memory space so that byte access from the processor core 101 can be performed. The first embodiment is described while assuming that all the data is stored in the ROM 102a. However, the data can be stored in the RAM 102b, or can be distributed and stored in the ROM 102a and the RAM 102b. The ROM 102a includes not only MaskROM, PROM, EPROM, and EEPROM, but also a NAND flash memory and a NOR flash memory, and other nonvolatile memories can be used. Meanwhile, the RAM 102b includes SRAM and DRAM, and other nonvolatile memories can be used. Further, MRAM, PRAM, ReRAM, and FeRAM are nonvolatile RAMs, which are included in the RAM 102b and described in the first embodiment. However, these can be handled as the ROM 102a.

The FW formed of the normal program, the error handling program, the FW management program, and the secure program, and the MAC thereof are stored on the ROM 102a. The normal program is formed of one or more FW blocks. The size of each FW block does not need to be identical, and the normal program is divided according to a predetermined method, such as in a unit of object or in a unit of size. The normal program is described here, while assuming that the normal program is divided into three FW blocks (the block A, the block B, and the block C), and the respective block sizes are not uniform. The secure program is formed of a security processing program for performing secure processing and the security processing information 174. The MAC is formed of a normal program MAC, an error handling program MAC, an FW management program MAC, and a secure program MAC. The normal program MAC is further formed of a MAC for each FW block (block A MAC, block B MAC, and block C MAC). For the MAC on the ROM 102a, a MAC value does not need to be stored therein and a pointer to the MAC value can be stored therein. In this case, the MAC value is stored in a predetermined memory space on the ROM 102a and the RAM 102b, or in other memories such as a memory dedicated for storing the MAC values.

Figure 7:
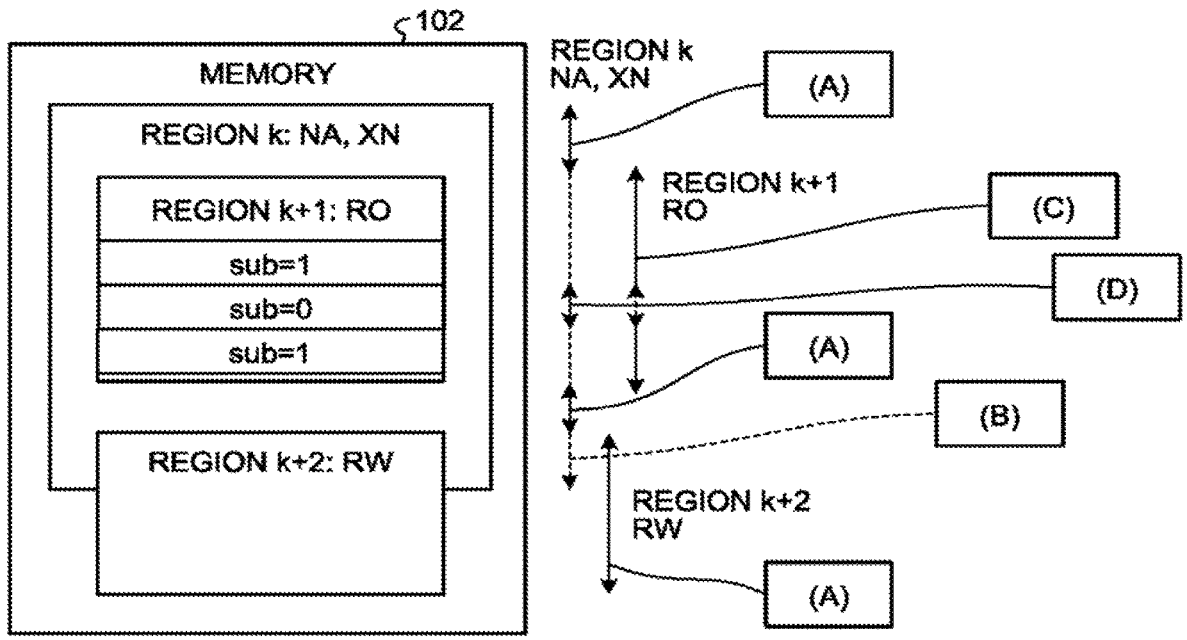
FIG. 7 is an explanatory diagram of an outline of a setting method of access right.

A setting method of the access right to an arbitrary memory space is described here. FIG. 7 is an explanatory diagram of an outline of the setting method of access right, and illustrates an example in which three regions are set with respect to a certain memory 102.

In FIG. 7, a region k is a region having an arbitrary size on the memory 102, a region k+1 is a region in the region k, and a region k+2 is a region including a memory adjacent to a part of the region k. Further, the respective regions can be divided into an arbitrary number of subsidiary regions. It is assumed that the size of the subsidiary regions in one region is identical, and the division number to the subsidiary regions is fixed through the system. That is, in a case of a system in which an 8-Byte region is divided into eight subsidiary regions, one subsidiary region has 1 Byte, and if there is another 16-Byte region, the region can be divided only into eight subsidiary regions, and thus one subsidiary region has 2 Bytes. The regions k to k+2 can be overlapped on each other, and when being overlapped, setting priority is decided according to a predetermined rule. A case where region setting of a higher order number (ascending order) has priority is described here. However, other methods can be used, such as according to region setting of a lower order number (descending order), or a preferred region is set.

Read right, Write right, and execution right can be set to each region, and an enabled flag can be set to the respective subsidiary regions. Hereinbelow, setting with Read right and with Write right is noted as "RW", setting with Read right and without Write right is noted as "RO", setting without Read right and with Write right is noted as "WO", setting without Read right and without Write right is noted as "NA" (Non-Access), and setting without execution right is noted as "XN" (execution never). Further, the subsidiary region in which the enabled flag has been set is noted as "sub=1", and a disabled subsidiary region in which the enabled flag has not been set is noted as "sub=0".

In the case of the example illustrated in FIG. 7, in a part of the region k in which an overlap of regions does not occur and the region k+2, respective settings are used (A). In a part of the region k overlapped on the region k+2, setting of the region k+2 is used (B). In a part of the region k overlapped on the region k+1, setting of the region k+1 is used (C); however, if the subsidiary region of the region k+1 is disabled, setting of the region k is used (D).

According to the first embodiment, by matching the region in which the access right has been set with the block obtained by dividing the FW (FW block), an unverified FW block is detected to perform verification processing. Setting of the region and detection of the unverified FW block is described below.

Figure 8:
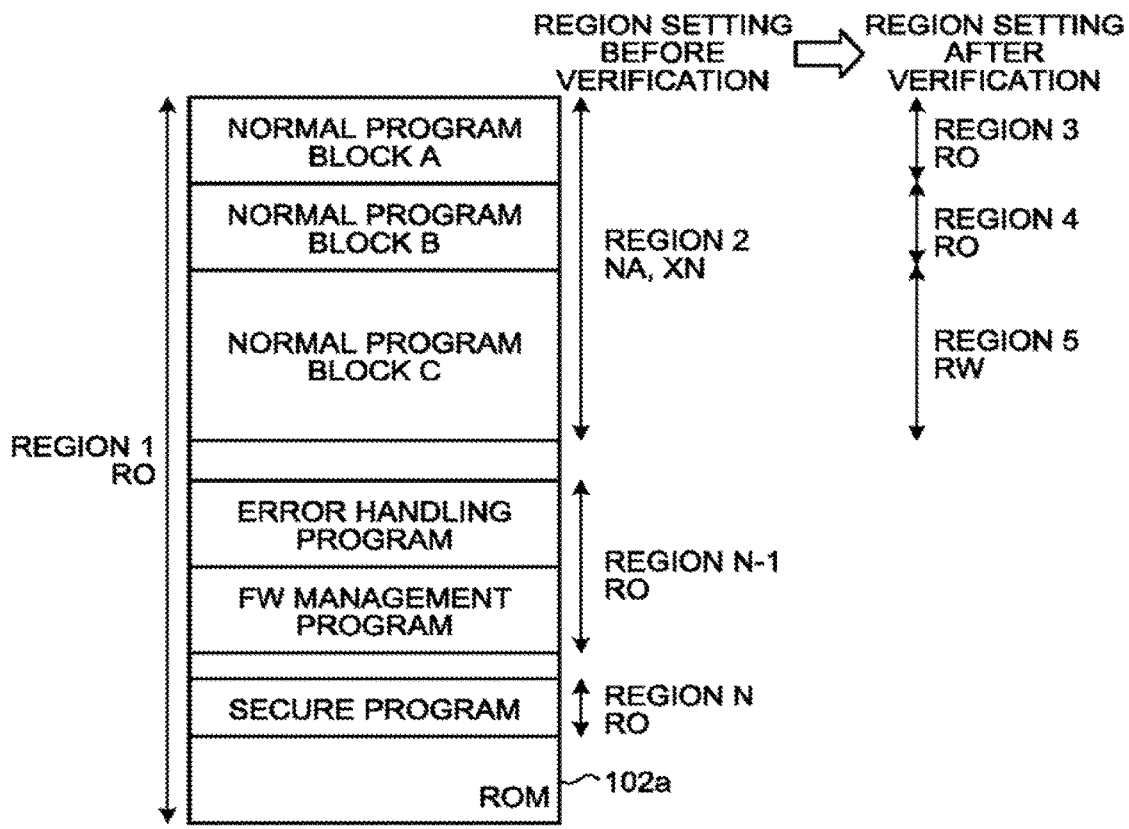
FIG. 8 is a diagram illustrating an example of FW region setting.

FIG. 8 is a diagram illustrating an example of FW region setting according to the first embodiment. The example illustrated in FIG. 8 is an example in which the normal program of the FW is formed of three FW blocks of the block A, the block B, and the block C. There is an upper limit in the number of regions to which the access right can be set. It is assumed here that the upper limit in the number of regions to which the access right can be set is N. That is, the access-right management device 120 can set the access right to the N regions.

First, in the memory space of the ROM 102a, because a program that can be executed but cannot perform Write is arranged, RO is set in a region 1. The memory space in which the normal program being a target of divided verification is arranged is set to NA and XN in a region 2. In this state, when the FW is executed, if access has occurred to the data belonging to any of the unverified blocks A, B, and C, an access right violation occurs due to setting of the region 2. Upon reception of the access right violation, the secure program (the secure processing unit 170) verifies the FW block that has caused the access right violation, and when verification has succeeded, the secure program (the secure processing unit 170) adds new regions (regions 3, 4, 5) to the memory space of the verified FW block so as to allow access thereto.

The normal program, the FW management program, and the secure program can be executed in the region 1, an additional region does not need to be provided. However, in the first embodiment, because a region is added during execution of the program, a new region to which unintended access right is set may be added to the memory space of the normal program, the FW management program, and the secure program unintentionally due to a bug or the like. Therefore, by allocating the secure program to a region N having the highest priority, and allocating the error handling program and the FW management program to a region N-1, this problem can be avoided.

In FIG. 8, the secure program is arranged in an individual region, and the error handling program and the FW management program are arranged in the same region. However, these programs can be arranged in separate regions, or all the programs can be arranged in the same region. Further, in FIG. 8, NA and XN are set in the region 2 in the unverified state. However, RO and XN can be set therein, and any setting can be used so long as an access right violation occurs at the time of access to the memory space.

Further, the region number added by verification can be decided in advance, or dynamically decided. For example, if access has occurred in the order of the block C, the block A, and the block B, when the region number has been decided such that the block A is the region 3, the block B is the region 4, and the block C is the region 5, the region is added in the order from the region 5, the region 3, and the region 4. Meanwhile, when the region number is decided dynamically, the region is added in the order from the region 3 to the block C, the region 4 to the block A, and the region 5 to the block B according to the sequence of occurrence of the access.

A processing flow of the information processing apparatus 100A according to the first embodiment is described next. In the first embodiment, it is assumed that all the integrity check processing is performed by using software HMAC (Hash-based Message Authentication Code). However, other algorithms can be used or hardware can be used. The processing flow is described while assuming that the key service unit 110 holds an HMAC key and the same key is used in the entire integrity check. However, an individual key can be used, or a different algorithm can be used. Further, the processing flow is described while assuming that the FW is activated from the secure program, and the FW block to be executed first of the normal program is the block A. However, the FW can be activated from the FW management program or other programs. It is assumed here that the security processing information 174 is the same as that illustrated in FIG. 4, the memory map of the FW is the same as that illustrated in FIG. 6, and the region setting of the FW is the same as that illustrated in FIG. 8, and the region setting for the RAM 102b is appropriately performed.

Figure 9:
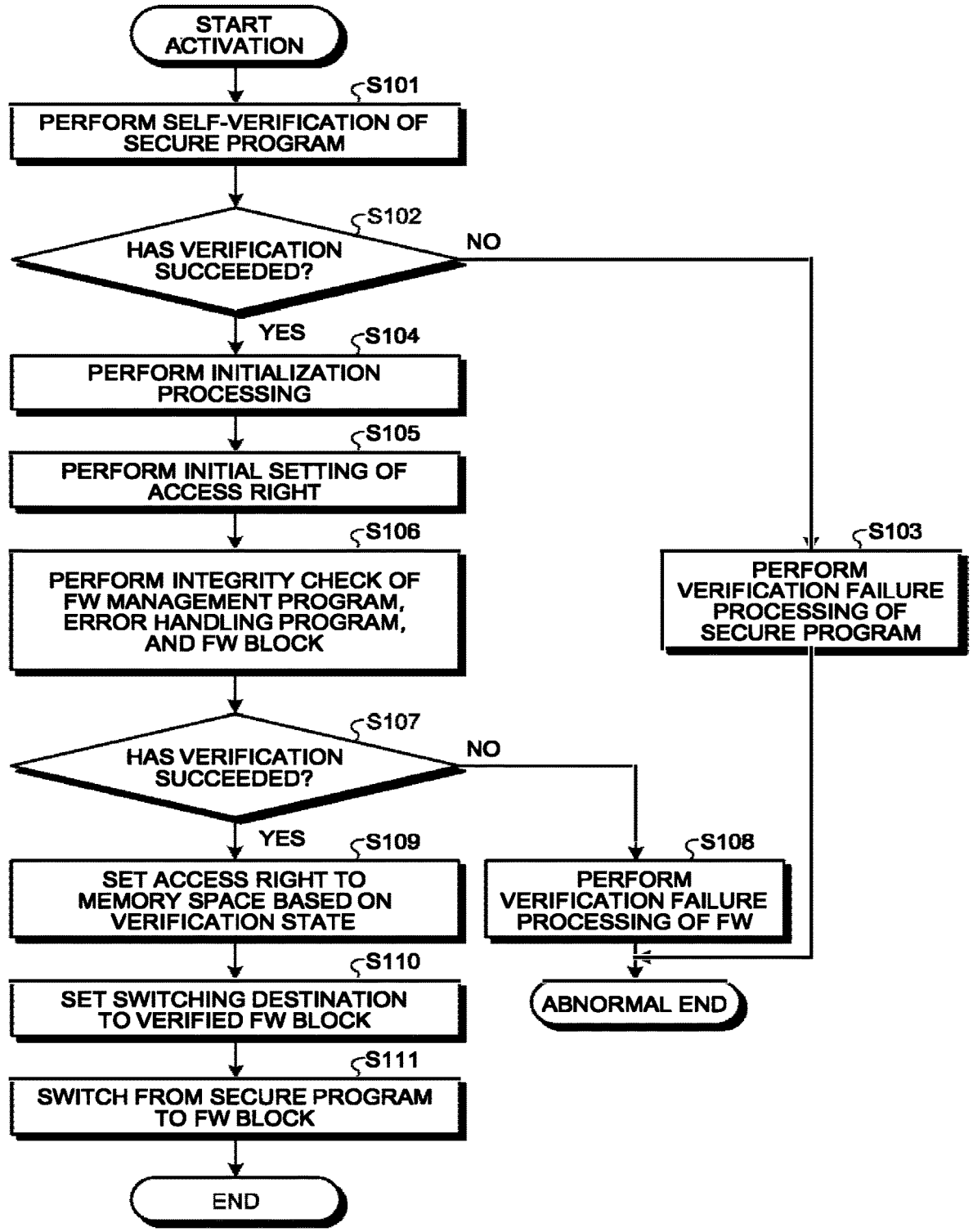
FIG. 9 is a flowchart illustrating a processing flow at the time of activating.

FIG. 9 is a flowchart illustrating a processing flow at the time of activating the information processing apparatus 100A according to the first embodiment. Upon input of power, the information processing apparatus 100A starts execution of the secure program of the FW by the processor core (CPU0) 101.

The secure program (the secure processing unit 170) acquires the key information from the key service unit 110 to first perform self-integrity check, and acquires the secure program MAC from the ROM 102a, thereby performing self-verification by the integrity check unit 172 (Step S101). If the self-verification has failed (NO at Step S102), the secure program performs post-processing involved with the verification failure (Step S103), and the process is finished abnormally.

On the other hand, if self-verification has succeeded (YES at Step S102), the secure program performs initialization processing such as peripheral initialization (Step S104), thereby performing initial setting of the access right (Step S105). The initial setting of the access right according to the first embodiment is to set all the memory spaces of the ROM 102a to the region 1 (RO), the memory space of the normal program (blocks A, B, C) being a verification target to the region 2 (NA, XN), and the memory space of the secure program having been verified to the region N (RO). The secure program requests the access-right update unit 173 to perform the initial setting. The access-right update unit 173 requests the access-right management unit 121 to update the access right, and the access-right management unit 121 sets the requested access right and registers the set access right in the access right information 123.

Subsequently, the secure program performs integrity check of the FW management program and the error handling program on the ROM 102a and the FW block (the block A) to be executed first by the integrity check unit 172 (Step S106). If any of the verification processes has failed (NO at Step S107), the secure program performs post-processing involved with the verification failure of the FW (Step S108), and the process is finished abnormally.

On the other hand, if verification has succeeded (YES at Step S107), the secure program performs setting of the access right to the memory space based on the verification state (Step S109). That is, the secure program requests the access-right update unit 173 to set the access right based on the verification state. The access-right update unit 173 requests update of the access right to the access-right management unit 121. The access-right management unit 121 updates the requested access right, and registers the updated access right in the access right information 123. In the case of the first embodiment, the access-right management unit 121 sets the memory spaces of the FW management program and the error handling program in which verification has been performed to the region N-1 (RU), and sets the memory space of the FW block (the block A) to be executed first to the region 3 (RO).

The secure program sets the switching destination to the verified FW block (the block A) (Step S110). Accordingly, the FW program to be executed by the processor core (CPU0) 101 switches from the secure program to the FW block (the block A) of the normal program (Step S111), and the boot processing is finished.

The error handling program and the FW block to be executed first do not necessarily need to be verified at the time of activating, and verification can be performed at the time of access to the program according to the processing flow at the time of data access described later. In this case, the FW management program specifies an unverified FW block as the switching destination, and upon switching to the FW block, the processing flow at the time of data access to the FW block is generated. Accordingly, setting of the region is performed such that in the state where all the memory spaces of the ROM 102a are set to the region 1 (RO), and the memory spaces of the normal program (blocks A, B, C) to be verified are set to the region 2 (NA, XN), the memory space of the verified secure program is changed to the region N (RO), and the memory space of the FW management program is changed to the region N-1(RO). Further, if the error handling program has been verified, the memory space thereof is set to a region N-2 (RO), and if the FW block (the block A) has been verified, the memory space thereof is set to the region 3 (RO).

The initial setting of the access right does not necessarily need to be performed before verification of the FW management program and the error handling program. The initial setting of the access right can be performed at the time of setting the access right of the verified FW management program and error handling program, and the initial setting can be performed at an arbitrary timing if the switch from the secure program to the FW block has not been performed.

The post-processing involved with the verification failure of the respective programs can be not only general shutdown of devices but also transmission of an error code or an error status indicating the own status, for example, to the host, and removal of the abnormality generation cause and recovery from the abnormal state can be performed. In addition, cutoff from an external interface (the interface 103), deletion of specific data in the information processing apparatus 100A, and deletion of all the pieces of data can be performed.

Figure 10:
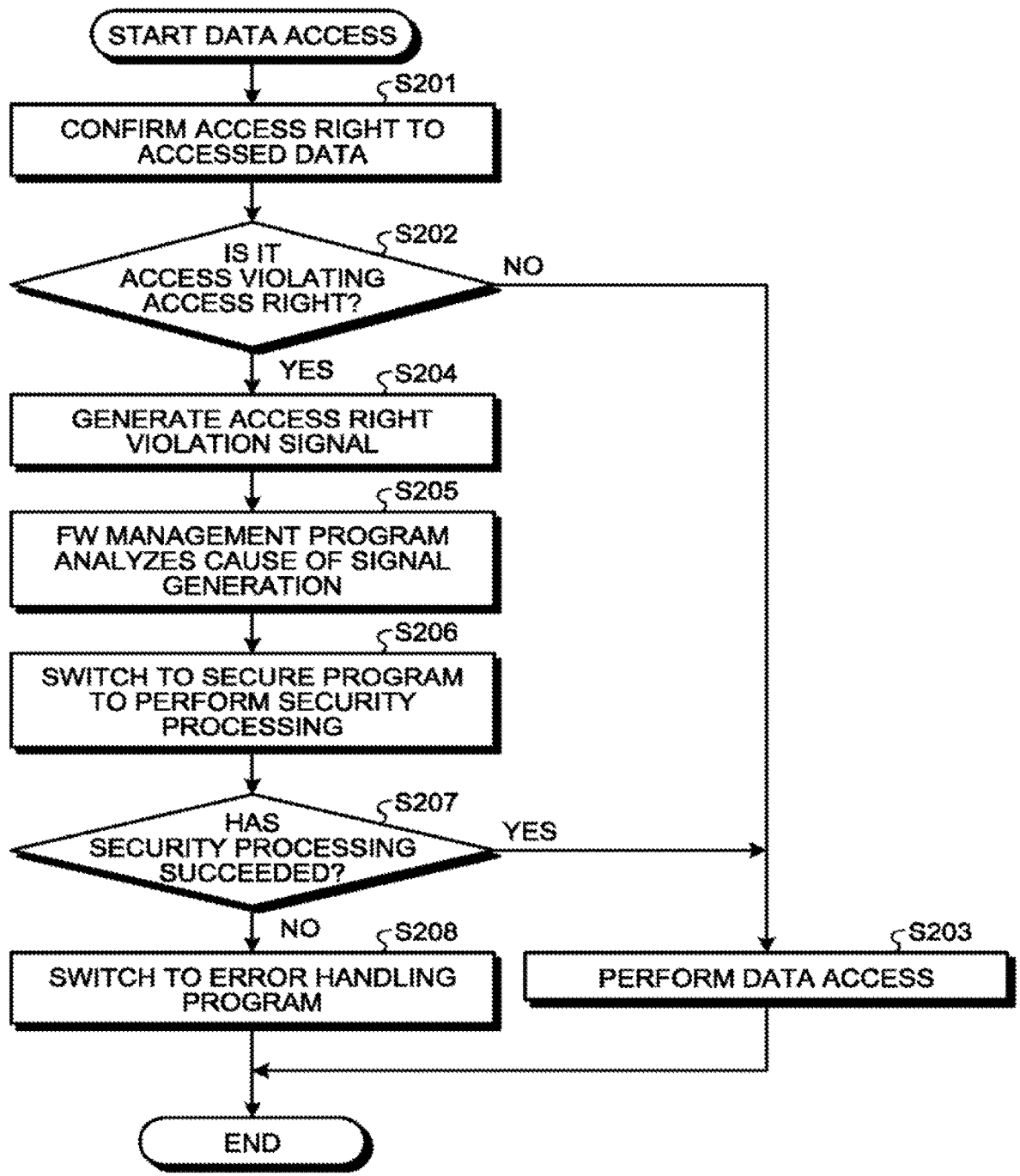
FIG. 10 is a flowchart illustrating a processing flow at the time of data access.

FIG. 10 is a flowchart illustrating a processing flow at the time of data access by the information processing apparatus 100A according to the first embodiment. The processing flow is described here while assuming a case where data access has occurred from the block A to the block B of the normal program operating in the processor core (CPU0) 101.

When data access to the memory 102 occurs, the memory access unit 131 accesses the data on the memory 102. Upon detection of data access by the memory access unit 131, the access-right management unit 121 refers to the access right information 123 to confirm whether the data access by the memory access unit 131 violates access right (Step S201). If the access does not violate the access right (NO at Step S202), the memory access unit 131 performs data access to the block B on the memory 102 (Step S203).

On the other hand, if the access violates the access right (YES at Step S202), the signal generation unit 122 generates an access right violation signal (Step S204). When the signal is generated, the processor core (CPU0) 101 interrupts execution of the normal program. The signal analysis unit 161 analyzes the cause of signal generation (Step S205). In this case, because the cause of signal generation is the access right violation, the process proceeds to the next step.

The program switch unit 162 switches the program executed by the processor core (CPU0) 101 to the secure program to perform the security processing described later by the secure program (Step S206). If the security processing by the secure program is not successful (NO at Step S207), the program switch unit 162 switches the program executed by the processor core (CPU0) 101 to the error handling program (Step S208). Accordingly, the processor core (CPU0) 101 executes the error handling program.

On the other hand, if the security processing by the secure program is successful (YES at Step S207), the program switch unit 162 switches the program executed by the processor core (CPU0) 101 to the interrupted normal program, and the memory access unit 131 performs data access to the block B (Step S203).

The error handling program performs predetermined processing at the time of occurrence of abnormality. The predetermined processing can be not only general shutdown of the information processing apparatus 100A, but also transmission of an error code or an error status indicating the own status, for example, to the host, and removal of the abnormality generation cause and recovery from the abnormal state can be performed. In addition, cutoff from the interface 103, deletion of specific data in the information processing apparatus 100A, and deletion of all the pieces of data can be performed.

Figure 11:
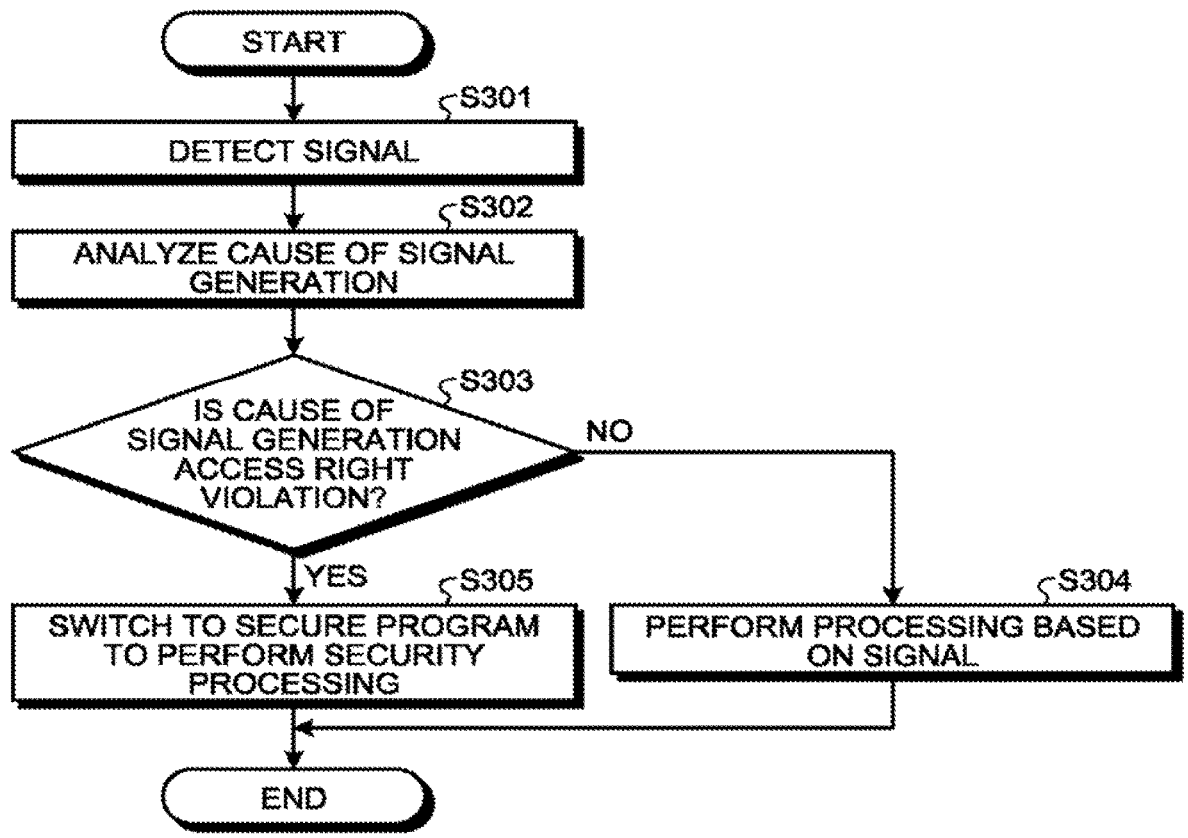
FIG. 11 is a flowchart illustrating a processing flow at the time of signal generation.

FIG. 11 is a flowchart illustrating a processing flow at the time of signal generation performed by the information processing apparatus 100A according to the first embodiment. In FIG. 10, descriptions have been made while assuming that the signal generation cause is an access right violation. However, the signal analysis unit 161 has an analysis function of other signals generated by the information processing apparatus 100A.

First, when a signal is detected (Step S301), the processor corn (CPU0) 101 interrupts execution of the normal program, and the signal analysis unit 161 analyzes the signal generation cause (Step S302). If the signal generation cause is not an access right violation (NO at Step S303), the signal analysis unit 161 performs predetermined processing based on the signal (Step S304). On the other hand, if the signal generation cause is an access right violation (YES at Step S303), the program switch unit 162 switches the program to be executed by the processor core (CPU0) 101 to the secure program, thereby performing the security processing by the secure program (Step S305).

Figure 12:
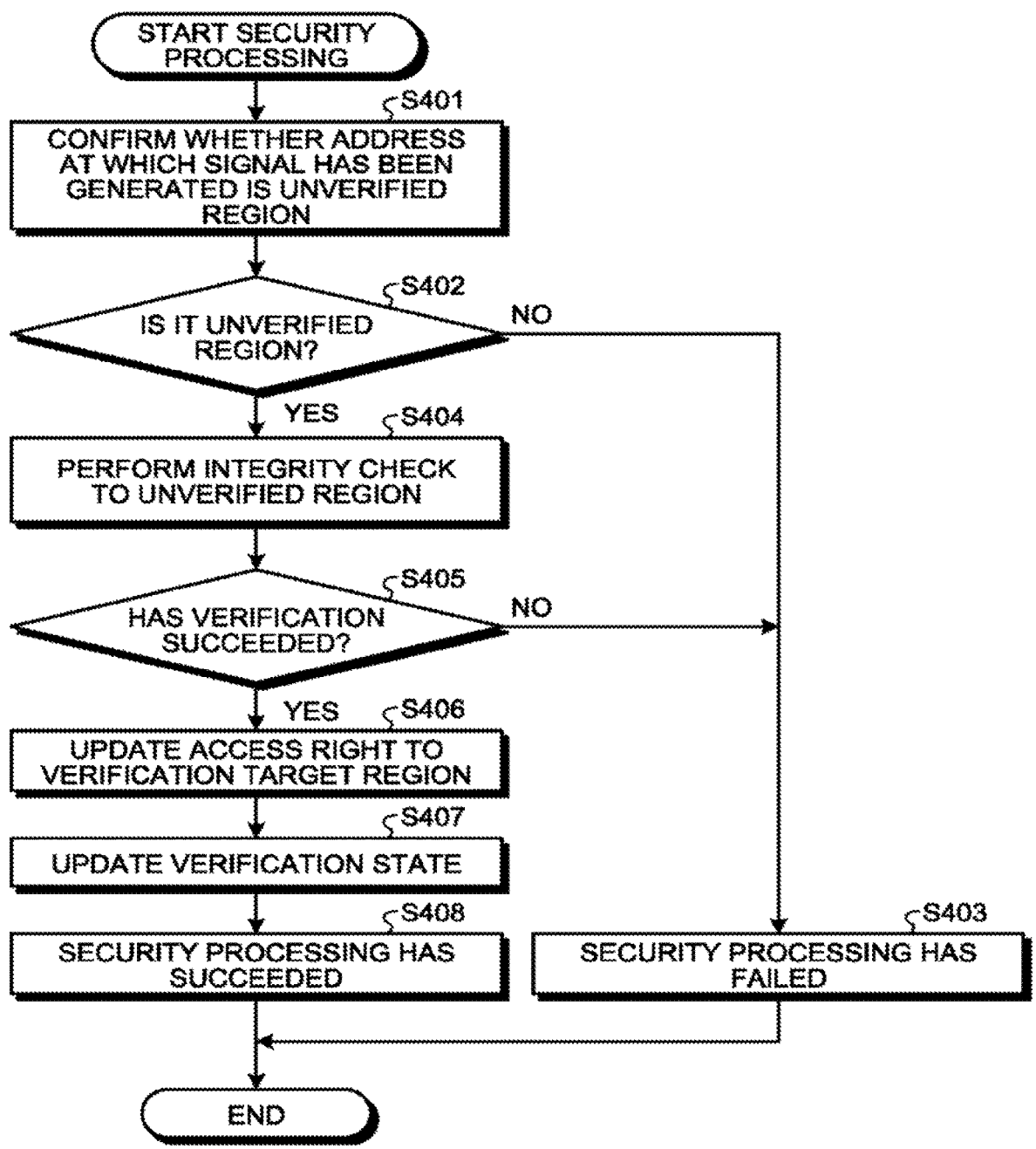
FIG. 12 is a flowchart illustrating a processing flow of security processing.

FIG. 12 is a flowchart illustrating a processing flow of the security processing according to the first embodiment. When the security processing is started by the secure program, the security-processing management unit 171 confirms whether the address at which the signal has been generated is an unverified region (Step S401). For example, the security-processing management unit 171 confirms whether the address at which the signal has been generated is an unverified region, by referring to the start address and the size of the verification target region registered in the security processing information 174. If the address at which the signal has been generated is the verification target region, the security-processing management unit 171 further confirms whether the verification target region is an unverified region by referring to the verification state of the verification target region.

If the address at which the signal has been generated is not the verification target region, or even if the address at which the signal has been generated is the verification target region, but has been already verified (NO at Step S402), the security-processing management unit 171 assumes that the security processing has failed (Step S403), and the process is finished. On the other hand, if the address at which the signal has been generated is an unverified region (YES at 402), the security-processing management unit 171 requests the integrity check unit 172 to verify the unverified region for which the signal has been generated. The integrity check unit 172 receives the start address, the size, and the MAC value of the unverified region acquired by the security-processing management unit 171 from the security processing information 174 and acquires the key information from the key service unit 110, thereby performing integrity check with respect to the unverified region (Step S404).

If the integrity check unit 172 has failed in verification (NO at Step S405), the security-processing management unit 171 assumes that the security processing has failed (Step S403), and the process is finished. On the other hand, if the integrity check unit 172 has succeeded in verification (YES at Step S405), the access right to the verification target region that has been verified is updated (Step S406). That is, the access-right update unit 173 receives the start address, the size, the access right to be granted, and the region number of the verification target region, which have been acquired by the security-processing management unit 171 from the security processing information 174, and requests the access-right management unit 121 to change the access right. The access-right management unit 121 having received the request sets the access right indicated by the access right to be granted to the verification target region, and updates the access right information 123 according to the set access right, to update the access right to the verification target region.

When update of the access right to the verification target region is complete, the security-processing management unit 171 updates the verification state in the security processing information 174 corresponding to the verified verification target region to "verified" (Step S407), and finishes the process, while assuming that the security processing has succeeded (Step S408).

Figure 13:
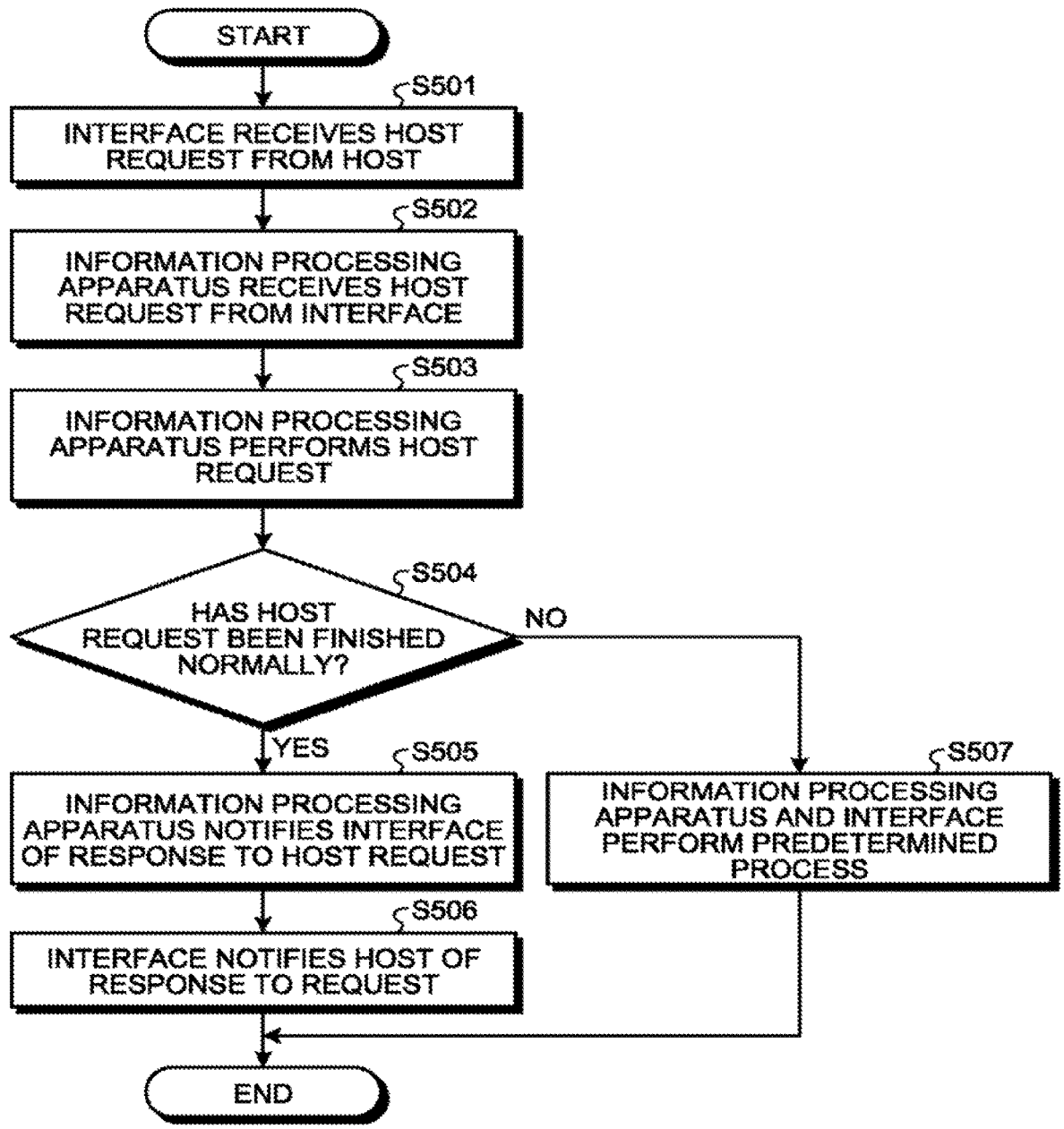
FIG. 13 is a flowchart illustrating a processing flow at the time of generating a host request.

FIG. 13 is a flowchart illustrating a processing flow at the time of generating a host request by the information processing apparatus 100A according to the first embodiment. The processing flow is described while assuming a case where the information processing apparatus 100A responds to the request from the host 200 via the interface 103.

When a request from the host 200 is generated, the interface 103 receives the request from the host 200 as a host request (Step S501). The information processing apparatus 100A receives the host request from the interface 103 (Step S502), thereby performing the host request (Step S503).

At the time of performing the host request, data access occurs, and if the region to which access has occurred is an unverified region, the information processing apparatus 100A performs the security processing described above. If the information processing apparatus 100A has finished the host request normally (YES at Step S504), the information processing apparatus 100A notifies the interface 103 of a response to the host request (Step S505). Further, the interface 103 notifies the host 200 of the response to the request (Step S506), and the process is finished.

On the other hand, if the information processing apparatus 100A has not finished the host request normally (NO at Step S504), the information processing apparatus 100A and the interface 103 perform a predetermined process (Step S507).

It is assumed here that the normal end of the host request is a case where the information processing apparatus 100A does not respond to the host request by abnormal end or by the error handling program. Further, even if the information processing apparatus 100A offers a response by the error handling program, if recovery from an abnormal state is performed in the error handling program, it is assumed that the information processing apparatus 100A has finished the process normally.

The predetermined process performed by the information processing apparatus 100A and the interface 103 when the host request has not been finished normally can be performed only by the information processing apparatus 100A, or performed in cooperation by the information processing apparatus 100A and the interface 103. When only the information processing apparatus 100A performs the predetermined process, for example, the information processing apparatus 100A can be a state in which transmission from the interface 103 is not received at all, or it is assumed that the information processing apparatus 100A has been attacked, and important data can be deleted or fallback can be performed. On the other hand, when the information processing apparatus 100A and the interface 103 operate in cooperation, for example, the information processing apparatus 100A can generate an error code and send the error code to the interface 103 and the interface 103 can offer a response according to the error code to the host 200, in addition to the case where only the information processing apparatus 100A operates. Further, once the interface 103 has received the error code from the information processing apparatus 100A, the interface 103 can offer a response uniquely without notifying the information processing apparatus 100A of the host request thereafter.

As described above, according to the first embodiment, by matching the region to which the access right has been set with the FW block being a target of divided verification (verification target region), an unverified region being an unverified FW block is detected so that integrity check is performed. Therefore, according to the first embodiment, high-performance hardware resources are not required for divided verification of the FW, and even the low-end information devices can realize appropriate divided verification of the FW. Further, according to the first embodiment, divided verification of the FW in which the verification sequence can be changed dynamically can be realized.

(Modification of First Embodiment)

The present modification is an example in which divided verification of the FW is performed by using the subsidiary region. In the first embodiment described above, a region is set in which the access right is newly granted with respect to the verified verification target region. However, in the present modification, a region is allocated in advance to a verification target region, which becomes a target of divided verification, and by switching the subsidiary regions in the region between enabled and disabled, divided verification of the FW is realized. The present modification is described here while assuming that the normal program to be verified is formed of three FW blocks of the blocks A, B, and C, and one region can be divided into three subsidiary regions. However, one region can be divided into any number of subsidiary regions.

FIG. 14 is a diagram illustrating an example of the access right information 123 according to the present modification. The access right information 123 according to the present modification includes information as to whether the subsidiary region is enabled or disabled, as compared with the access right information 123 illustrated in FIG. 3.

FIG. 15 is a diagram illustrating an example of the security processing information 174 according to the present modification. In the security processing information 174 according to the present modification, as compared with the security processing information 174 illustrated in FIG. 4, the subsidiary region number is added and the access right to be granted at the time of verification success is deleted, because the access right is not required to be held. Further, in the present modification, because an example in which three FW blocks each are divided by three subsidiary regions is used, the size of one subsidiary region has a fixed value, and the size information does not need to be held. However, in a case where, for example, two FW blocks are verified by three subsidiary regions, it is also possible to allocate a plurality of subsidiary regions to one FW block. Therefore, the size information can be held. The case where two FW blocks are verified by three subsidiary regions indicates, for example, a case in which when the block A has 2 Kbytes and the block B has 1 Kbyte, the block A is verified by a subsidiary region 1 and a subsidiary region 2, and the block B is verified by a subsidiary region 3. Further, as in the present modification, when verification is performed by using only subsidiary regions of one region, the region number does not need to be held. However, when verification is performed by using subsidiary regions of a plurality of regions, for example, when three subsidiary regions of the region 3 and three subsidiary regions of the region 4, in total six subsidiary regions are to be used, the region number is required.

Figure 16:
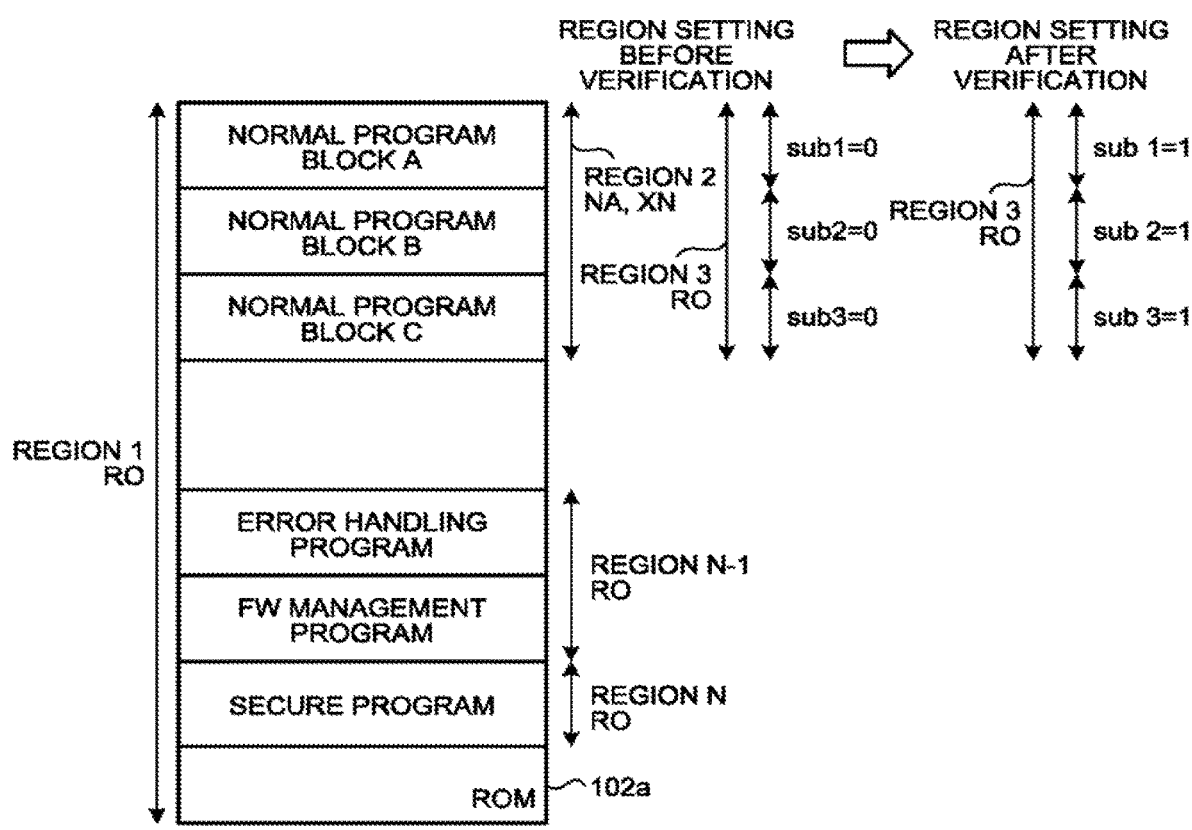
FIG. 16 is a diagram illustrating an example of region setting of FW.

FIG. 16 is a diagram illustrating an example of region setting of FW according to the present modification. The example illustrated in FIG. 16 is an example in which the normal program of the FW is formed of three FW blocks (blocks A, B, C). It is assumed here that the access-right management unit 120 can set the access right to N regions, and one region can be divided into three subsidiary regions. It is also assumed that the blocks A, B, and C of the normal program are targets of divided verification, and the error handling program, the FW management program, and the secure program have been already verified. The present modification is described while assuming that integrity check using the subsidiary regions is performed with respect to the blocks A, B, and C being targets of divided verification, and integrity check using the region is performed with respect to the error handling program, the FW management program, and the secure program as in the first embodiment. However, the configuration can be such that integrity check using the subsidiary regions is performed with respect to the error handling program, the FW management program, and the secure program.

In the region setting of the FW according to the present modification illustrated in FIG. 16, as compared with the example illustrated in FIG. 8, a region 3 having the access right (RO) to be granted after the verification is set in addition to the region 2 (NA, XN) with respect to the memory space of the blocks A, B, and C. However, three subsidiary regions (sub1, sub2, sub3) of the region 3 corresponding to each of the blocks A, B, and C are set to be disabled (sub=0), and setting of the region 2 is used. Therefore, when access occurs to the data belonging to any of the blocks A, B, and C that have not been verified, an access right violation occurs. Upon reception of the access right violation, the secure program verifies the FW block that has caused the access right violation, and enables (sub=1) the subsidiary regions (sub1, sub2, sub3) of the memory space of the FW block in which verification has succeeded to allow access thereto.

A processing flow according to the present modification is the same as the processing flow of the first embodiment described above. However, the access right to be updated by the access-right update unit 173 is not an addition of the region, but enablement of the subsidiary region.

As described above, according to the present modification, by disabling the subsidiary regions in the region having the access right to be granted after the verification, the unverified FW block can be detected by the access right violation and verified, to realize an FW integrity check mechanism that can change the verification sequence dynamically. Particularly, in the present modification, by using the subsidiary regions, divided verification can be realized by using less number of regions than in the first embodiment. Further, because the subsidiary regions are obtained by dividing the region into equal sized subsidiary regions, divided verification by using the subsidiary regions automatically divided into equal sizes can be realized only by setting the region having the same size as the normal program. Accordingly, because there is no need to divide the normal program into a plurality of FW blocks, the development cost can be reduced.

Second Embodiment

In the first embodiment, the secure program to be executed first at the time of activating the information processing apparatus 100A performs falsification detection by self-verification, and it is not assumed that integrity check of each program is avoided because of falsification of the secure program. However, the ROM 102a having the FW stored therein includes a ROM that cannot be updated from the time of shipment such as a MaskROM, and a ROM that can be updated by a predetermined procedure such as the NOR flash memory. Therefore, in order to realize divided verification of the FW according to the first embodiment while preventing falsification of the secure program, it has been required to arrange the FW in the ROM that cannot be updated from the time of shipment.

In a second embodiment, unavoidable divided verification of the FW is realized by realizing a chain of trust from the MaskROM that cannot be updated from the time of shipment, while arranging the FW on the ROM that can be updated by a predetermined procedure.

Figure 17:
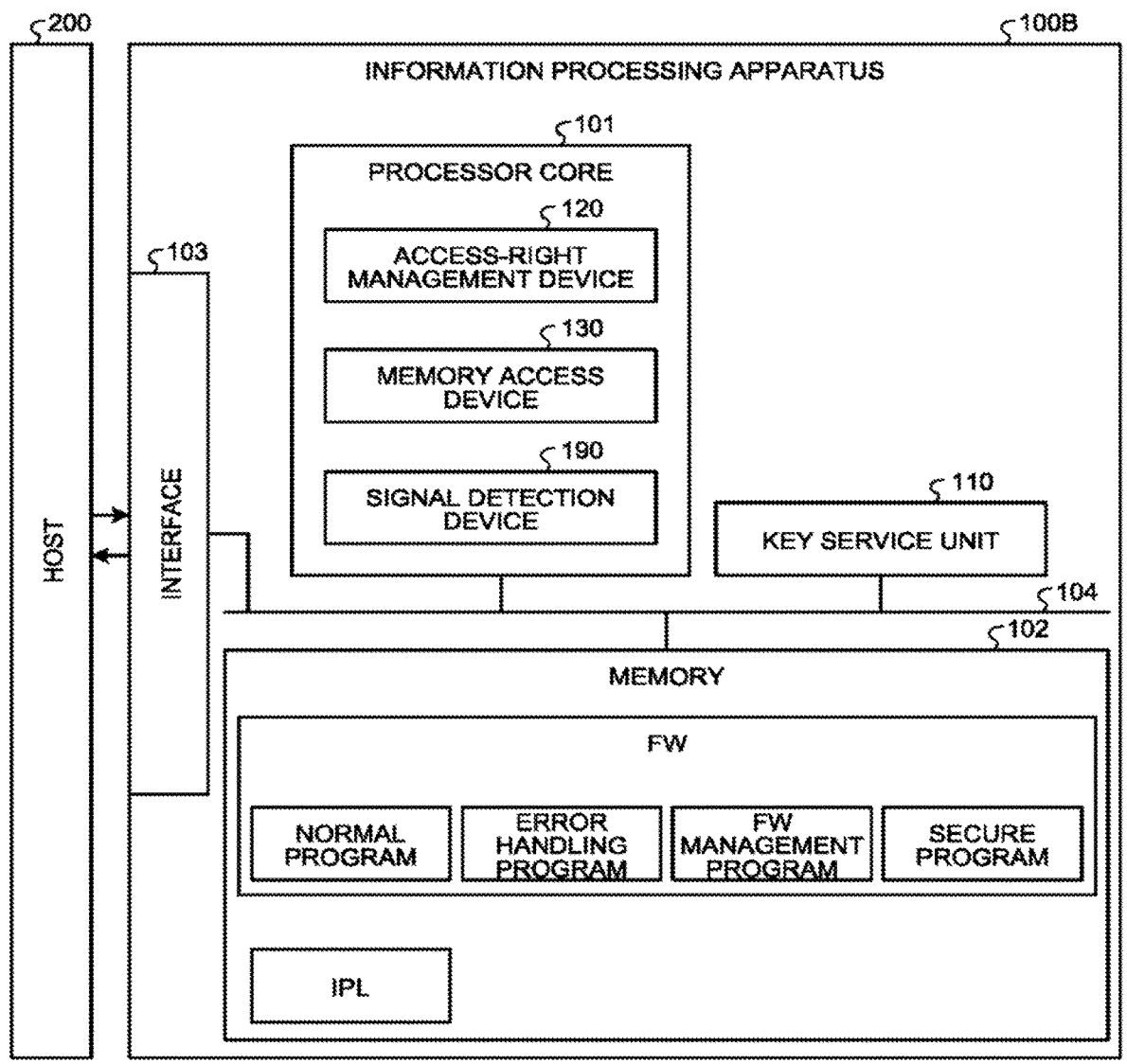
FIG. 17 is a block diagram exemplifying a schematic configuration of an information processing apparatus.

FIG. 17 is a block diagram exemplifying a schematic configuration of an information processing apparatus 100B according to the second embodiment. The information processing apparatus 100B has the same schematic configuration as the information processing apparatus 100A according to the first embodiment illustrated in FIG. 1. However, a signal detection device 190 is further provided in the processor core 101, and an IPL (Initial Program Loader) is held in the memory 102 in addition to the FW. The IPL is a program executed first after input of power of the information processing apparatus 100B. Various constituent elements of the information processing apparatus 100B illustrated in FIG. 17 are formed of hardware, software, or a combination of hardware and software.

Figure 18:
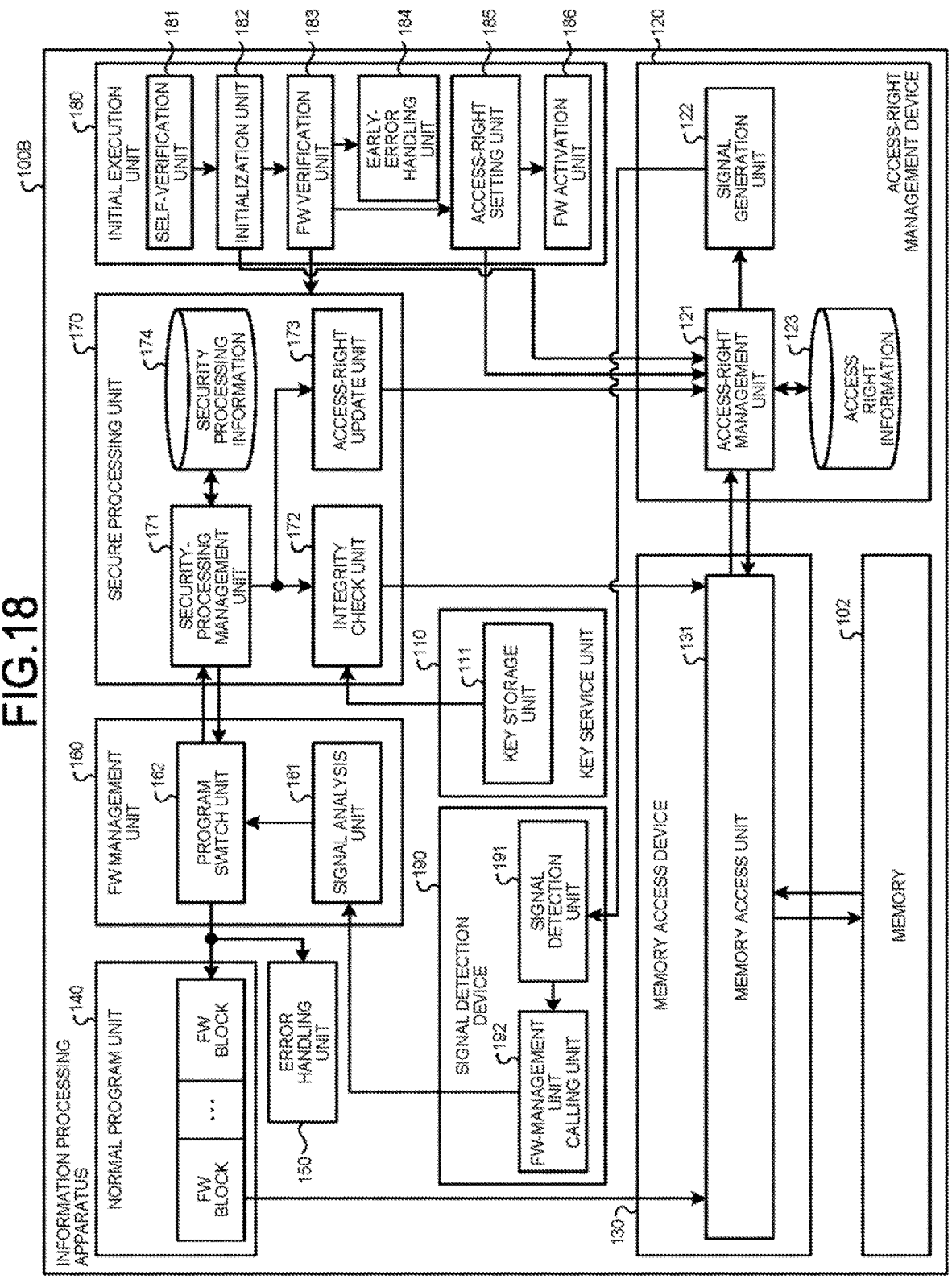
FIG. 18 is a block diagram illustrating a functional configuration example of the information processing apparatus.

FIG. 18 is a block diagram illustrating a functional configuration example of the information processing apparatus 100B according to the second embodiment. The information processing apparatus 100B according to the second embodiment is further added with the signal detection device 190 and an initial execution unit 180, with respect to the functional configuration of the information processing apparatus 100A according to the first embodiment illustrated in FIG. 1.

The signal detection device 190 includes a signal detection unit 191 and an FW-management unit calling unit 192.

The signal detection unit 191 detects a signal generated by the signal generation unit 122, and sends notice to the FW-management unit calling unit 192 when the signal requires call-out of the FW management unit 160. The notice includes information of the signal, and when the signal is an interrupt, includes information such as an interrupt cause.

Upon reception of the notice from the signal detection unit 191, the FW-management unit calling unit 192 calls the FW management unit 160 based on the information of the signal included in the notice. For example, in a case where there are FW management units A and B corresponding to different signals A and B, respectively, when the signal detection unit 191 detects the signal A and a notice is received, the FW-management unit calling unit 192 calls the FW management unit A corresponding to the signal A. When the signal detection unit 191 detects the signal B and a notice is received, the FW-management unit calling unit 192 calls the FW management unit B corresponding to the signal B. Further, even if any of the signal A or the signal B is detected by the signal detection unit 191, the FW-management unit calling unit 192 can call the FW management unit A corresponding to the signal A.

The initial execution unit 180 includes a self-verification unit 181, an initialization unit 182, an FW verification unit 183, an early-error handling unit 184, an access-right setting unit 185, and an FW activation unit 186.

The self-verification unit 181 performs self-verification of the initial execution unit 180. The initialization unit 182 performs initialization processing of the information processing apparatus 100B.

The FW verification unit 183 performs verification of a part or all of the specified FW. The early-error handling unit 184 performs abnormality processing when verification of the FW has failed. The early-error handling unit 184 has functions identical to those of the error handling unit 150. The early-error handling unit 184 and the error handling unit 150 can perform the same abnormality processing, or can perform processing different from each other.

The access-right setting unit 185 requests the access-right management unit 121 to set the access right. The FW activation unit 186 activates the FW. In the second embodiment, an example in which the initial execution unit 180 is realized by the IPL is described. However, the initial execution unit 180 can be realized as hardware.

The security-processing management unit 171 according to the second embodiment performs management of the security processing with respect to the memory space in which an access right violation has occurred and management of the security processing information 174, but does not perform the boot processing.

Figure 19:
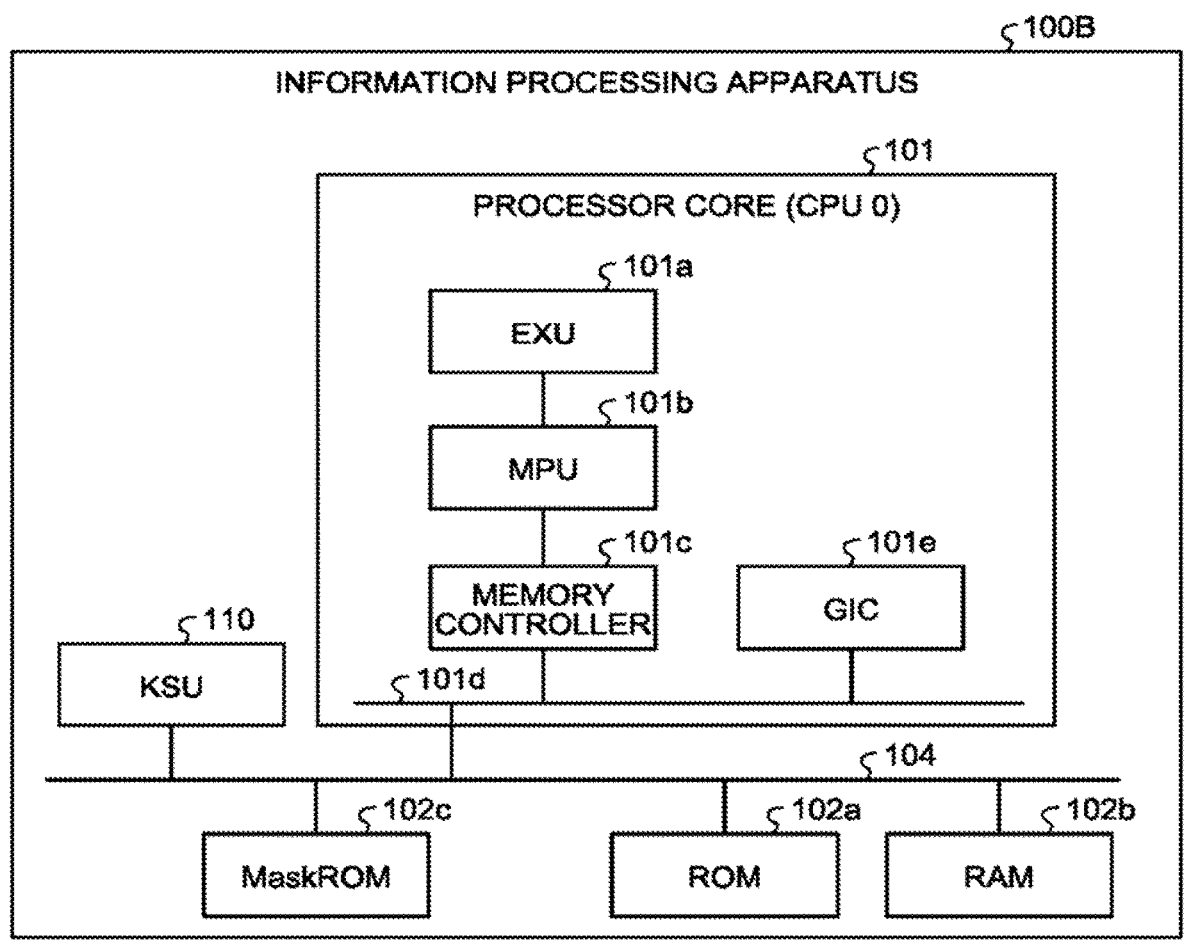
FIG. 19 is a block diagram illustrating a hardware configuration example of the information processing apparatus.

FIG. 19 is a block diagram illustrating a hardware configuration example of the information processing apparatus 100B according to the second embodiment. The information processing apparatus 100B according to the second embodiment includes a MaskROM 102c and an interrupt controller (GIC) 101e provided in the processor core (CPU0) 101, which are added to the hardware configuration of the information processing apparatus 100A according to the first embodiment illustrated in FIG. 5. In the second embodiment, the MaskROM 102c in addition to the ROM 102a and the ROM 102b correspond to the memory 102 illustrated in FIGS. 17 and 18.

It is assumed that the processor core (CPU0) 101, the ROM 102a, the RAM 102b, and the MaskROM 102c can transmit and receive data, signals, and instructions to and from each other via the external bus 104. It is assumed that the key service unit (KSU) 110 can transmit and receive data, signals, and instructions only to and from the device to which access is permitted. It is also assumed that the instruction execution unit (EXU) 101a, the memory protection unit (MPU) 101b, the memory controller 101c, and the interrupt controller (GIC) 101e in the processor core (CPU0) 101 can transmit and receive data, signals, and instructions to and from each other via the internal bus 101d. In the second embodiment, it is assumed that the interrupt controller (GIC) 101e is used as the signal detection device 190 illustrated in FIGS. 17 and 18. It is also assumed that the IPL is a program on the MaskROM 102c and is executed first by the processor core 101.

Figure 20:
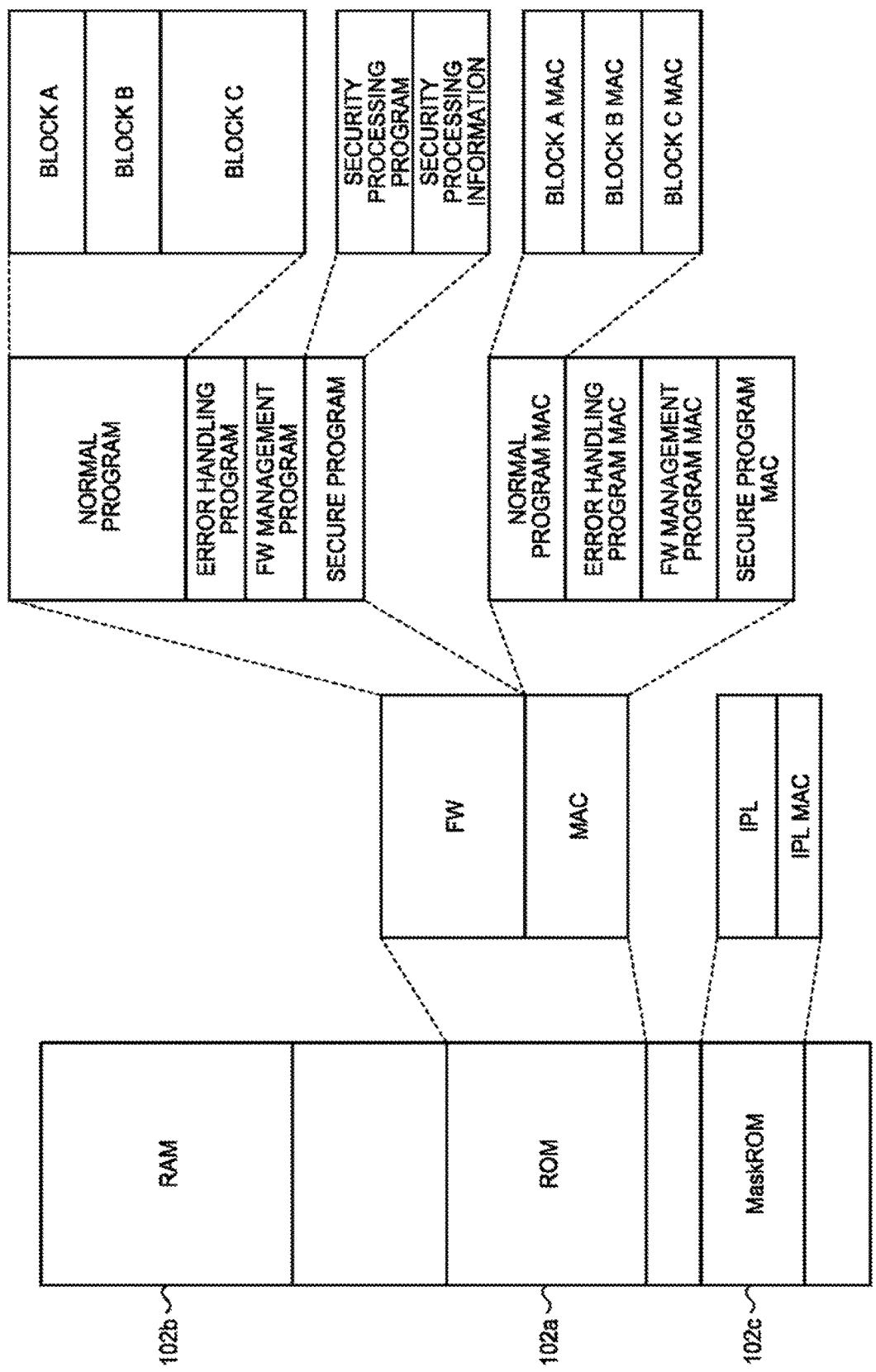
FIG. 20 is a diagram illustrating an example of the memory map.

A memory map assumed in the second embodiment is described next. FIG. 20 is a diagram illustrating an example of the memory map in the second embodiment. In the second embodiment, there is the MaskROM 102c on the memory space, as compared with the memory map illustrated in FIG. 6. The IPL and an IPL MAC are stored in the MaskROM 102c. The IPL MAC is a MAC of the IPL, and is used in self-verification at the time of activation of the IPL. The second embodiment is described while assuming that the MaskROM 102c is mapped in the memory as illustrated in FIG. 20.

A processing flow of the information processing apparatus 100B according to the second embodiment is described next. In the second embodiment, as compared with the first embodiment, processing performed by the signal detection device 190 is added to the processing flow at the time of data access, and in the processing flow at the time of activating, processing performed by the secure processing unit 170 (security processing program) is changed to processing performed by the initial execution unit 180 (IPL). It is assumed here that the security processing information 174 is the same as that illustrated in FIG. 4, the memory map of the FW is the same as that illustrated in the FIG. 20, the region setting of the FW is the same as that illustrated in FIG. 8, and the region setting for the RAM 102b is appropriately performed, and only differences from the first embodiment are described here.

Figure 21:
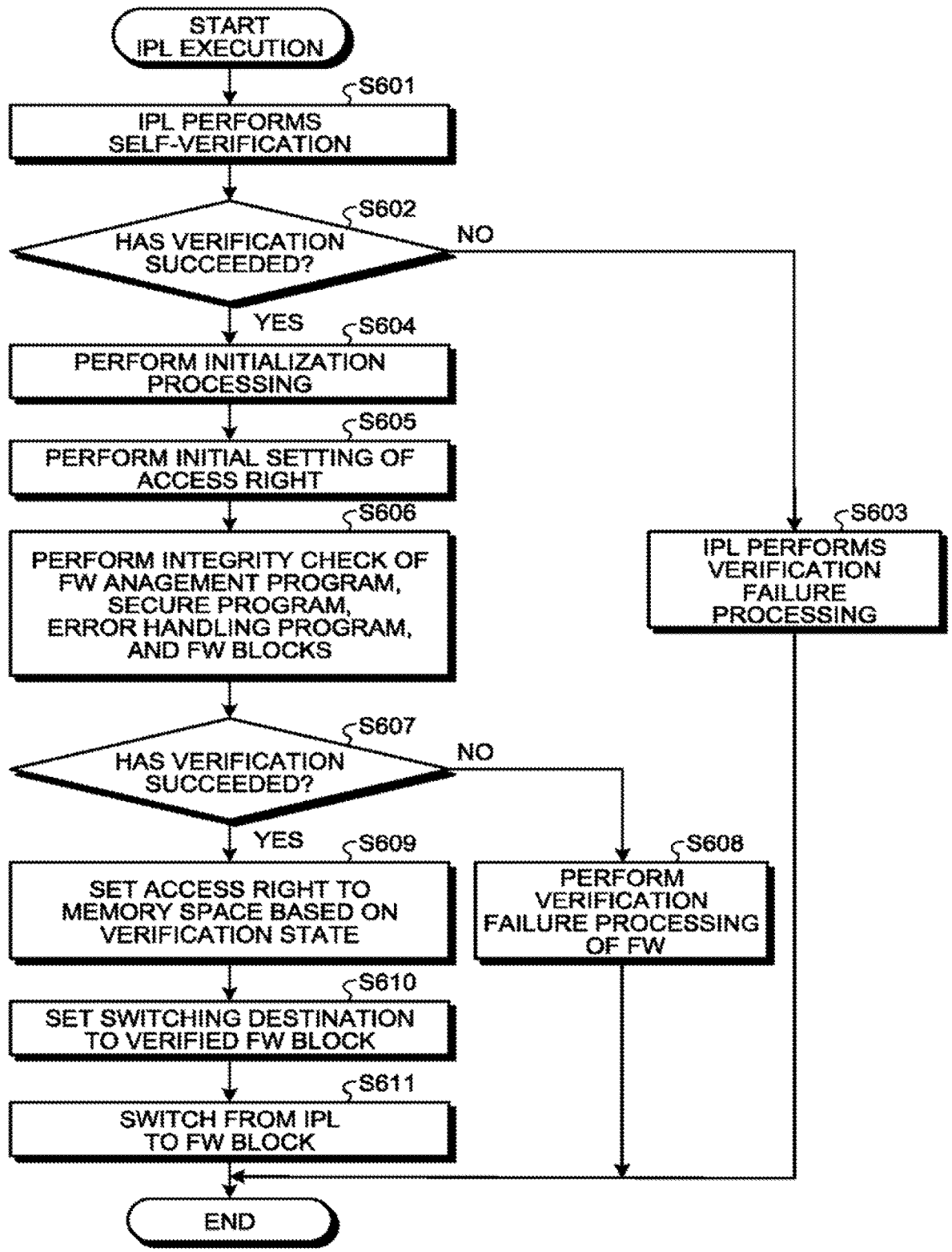
FIG. 21 is a flowchart illustrating a processing flow at the time of activating.

FIG. 21 is a flowchart illustrating a processing flow at the time of activating the information processing apparatus 100B according to the second embodiment. Upon input of power, the information processing apparatus 100B starts execution of the IPL by the processor core (CPU0) 101.

Because the IPL first performs self-integrity check, the IPL acquires the key information from the key service unit 110 and acquires the IPL MAC from the MaskROM 102c, thereby performing self-verification by the self-verification unit 181 (Step S601). If self-verification has failed (NO at Step S602), the IPL performs post-processing involved with the verification failure (Step S603), and the process is finished abnormally.

On the other hand, if self-verification has succeeded (YES at Step S602), the IPL performs initialization processing such as peripheral initialization by the initialization unit 182 (Step S604), thereby performing initial setting of the access right (Step S605). The initial setting of the access right according to the second embodiment is to set all the memory spaces of the ROM 102a to the region 1 (RO), and the memory space in the normal program (blocks A, B, C) being a verification target to the region 2 (NA, XN). The IPL requests the access-right setting unit 185 to perform the initial setting. The access-right setting unit 185 requests the access-right management unit 121 to set the access right, and the access-right management unit 121 sets the requested access right and registers the set access right in the access right information 123.

Subsequently, the IPL performs integrity check of the secure program, the FW management program, and the error handling program on the ROM 102a and the FW block (the block A) to be executed first by the FW verification unit 183 (Step S606). If any of the verification processes has failed (NO at Step S607), the IPL performs post-processing involved with the verification failure of the FW by the early-error handling unit 184 (Step S608), and the process is finished abnormally.

On the other hand, if verification has succeeded (YES at Step S607), the IPL performs setting of the access right to the memory space based on the verification state by the access-right setting unit 185 (Step S609). That is, the access-right setting unit 185 requests the access-right management unit 121 to set the access right based on the verification state, and the access-right management unit 121 sets the requested access right and registers the set access right in the access right information 123. In the case of the second embodiment, the access-right management unit 121 sets the memory space of the verified secure program in which verification has been performed to the region N (RO), sets the memory spaces of the FW management program and the error handling program to the region N-1 (RO), and sets the memory space of the FW block (the block A) to be executed first to the region 3 (RO).

The IPL then sets the switching destination to the verified FW block (the block A) (Step S610), and activates the FW by the FW activation unit 186. Accordingly, the program to be executed by the processor core (CPU0) 101 switches from the IPL to the FW block (the block A) (Step S611), and the activation processing is finished.

The initial setting of the access right does not necessarily need to be performed before verification by the FW verification unit 183. The initial setting of the access right can be performed at the time of setting of the access right to the verified FW management program and error handling program, and the initial setting can be performed at an arbitrary timing, so long as it is before switching from the IPL to the FW block.

Figure 22:
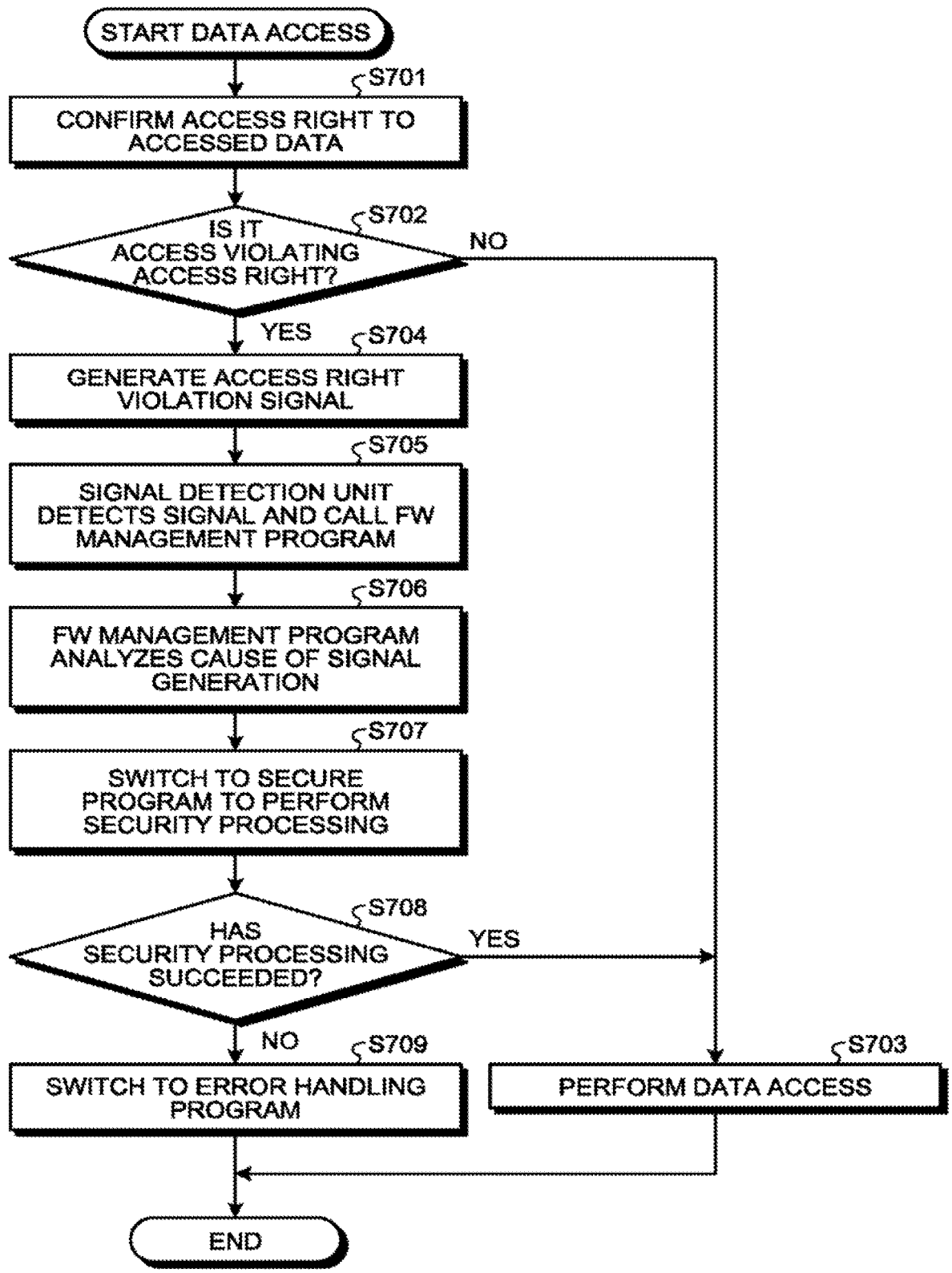
FIG. 22 is a flowchart illustrating a processing flow at the time of data access.

FIG. 22 is a flowchart illustrating a processing flow at the time of data access by the information processing apparatus 100B according to the second embodiment. The processing flow is described here while assuming a case where data access has occurred from the block A to the block B of the normal program operating in the processor core (CPU0) 101.

When data access to the memory 102 occurs, the memory access unit 131 accesses the data on the memory 102. Upon detection of data access from the memory access unit 131, the access-right management unit 121 refers to the access right information 123 to confirm whether the data access from the memory access unit 131 violates the access right (Step S701). If the access does not violate the access right (NO at Step S702), the memory access unit 131 performs data access to the block B on the memory 102 (Step S703).

On the other hand, if the access violates the access right (YES at Step S702), the signal generation unit 122 generates an access right violation signal (Step S704). In the signal detection device 190, the signal detection unit 191 detects the signal to interrupt execution of the block A in the normal program being executed by the processor core (CPU0) 101, and the FW-management unit calling unit 192 calls the FW management program (Step S705). Accordingly, the processor core (CPU0) 101 executes the FW management program. In the FW management program, the signal analysis unit 161 analyzes the cause of signal generation (Step S706). Because the processing flow thereafter is the same as the processing flow illustrated in FIG. 10, descriptions thereof are omitted.

As described above, according to the second embodiment, by the chain of trust using the IPL on the MaskROM 102c that cannot be updated from the time of shipment as an origin, the integrity of the FW management program and the secure program involved with the security processing can be guaranteed, and avoidance of integrity check can be effectively prevented.

(First Modification of Second Embodiment)

A first modification is an example in which a part of data of the FW stored in the ROM 102a is once loaded to the RAM 102b and verified. In the second embodiment described above, the data stored in the ROM 102a is verified as it is and access is performed to the data at the verified place. In the first modification, the data on the ROM 102a is once loaded onto the RAM 102b and verified, to perform access thereto. When a non-volatile main storage memory is used, the non-volatile main storage memory is regarded as the ROM 102a, and the FW can be loaded to another memory space on the RAM 102b and verified, or a particular memory space of the non-volatile main storage memory can be regarded as the RAM 102b and the FW can be loaded thereto and verified. Further, the first modification is described while assuming that a part of the data on the ROM 102a is loaded to the RAM 102b and used, and a part of the data on the ROM 102a is used as it is. When the data on the ROM 102a is used as it is, load to the RAM 102b does not occur, and verification can be performed without loading of data.

Figure 23:
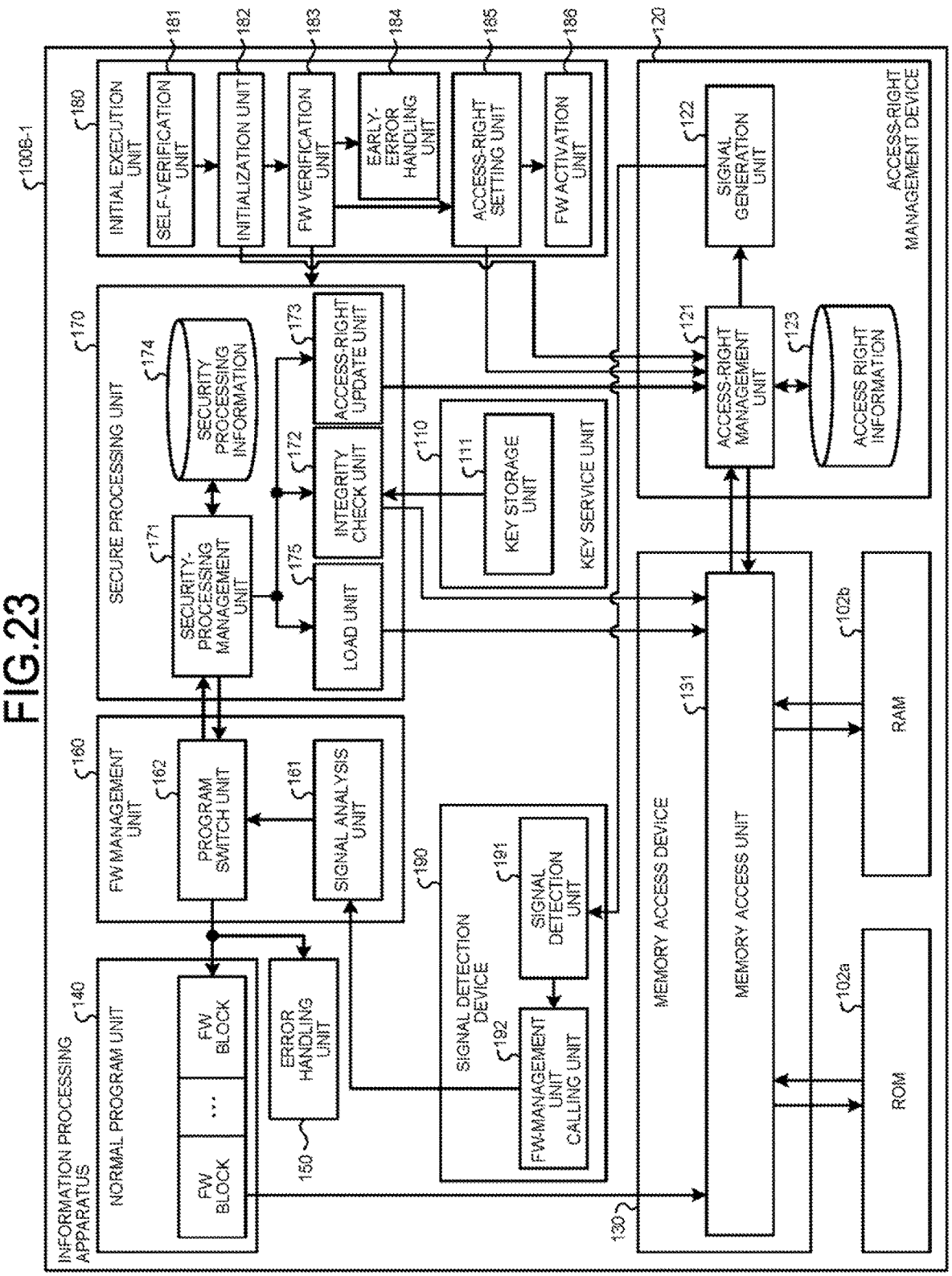
FIG. 23 is a block diagram illustrating a functional configuration example of an information processing apparatus.

FIG. 23 is a block diagram illustrating a functional configuration example of an information processing apparatus 100B-1 according to the first modification. The information processing apparatus 100B-1 further includes a load unit 175 added in the secure processing unit 170, with respect to the functional configuration of the information processing apparatus 100B illustrated in FIG. 18. The load unit 175 is a functional module for loading data on the ROM 102a onto the RAM 102b.

The first modification is described while assuming that an address to be accessed by the processor core 101 is a reference address, an address holding data required to be loaded is a load source address, and the security-processing management unit 171 uses the load source address included in the security processing information 174 and the reference address. When load is performed from the ROM 102a to the RAM 102b, an address of the memory space of the RAM 102b becomes the reference address, and an address of the memory space of the ROM 102a becomes the load source address. When data is not loaded from the ROM 102a to the RAM 102b (the data on the ROM 102a is referred to as it is), the address of the memory space of the ROM 102a becomes the reference address. The load source address and the reference address are managed by the FW management unit 160, and the security-processing management unit 171 can acquire these addresses from the FW management unit 160 or can acquire these addresses by another means.

FIG. 24 is a diagram illustrating an example of the security processing information 174 in the first modification. In the security processing information 174 according to the first modification, the load source address and presence or absence of load ("LOAD" in FIG. 24) are added and the start address is changed to the reference address, as compared with the security processing information 174 illustrated in FIG. 4. The start address and the reference address are basically the same information, and indicate a region address at which a verification request is generated. The presence or absence of load is information indicating whether the load unit 175 performs load, and in the case of presence of load, the load unit 175 performs load, and in the case of absence of load, the load unit 175 does not perform load.

The security-processing management unit 171 according to the first modification manages data load with respect to a memory space in which an access right violation has occurred, in addition to management of the integrity check processing of data with respect to the memory space in which the access right violation has occurred, and management of the security processing information 174. When having determined that the generated access right violation is a verification request based on the reference address in the security processing information 174, the address at which the access right violation has occurred, the size, and the verification state, the security-processing management unit 171 confirms the presence or absence of load, and if the load is required, requests the load unit 175 to load the data. Further, the security-processing management unit 171 requests the integrity check unit 172 to perform integrity check with respect to the verification target region to which a verification request has been made. Upon reception of a notice of success in verification from the integrity check unit 172, the security-processing management unit 171 requests the access-right update unit 173 to update the access right to the memory space in which verification has been successful, and records that the memory space has been verified in the security processing information 174.

The load unit 175 loads data in a size specified by the security-processing management unit 171 from the load source address to the reference address. The load can be performed by software, or can be performed by hardware by using a DMAC (Direct Memory Access Controller) or the like.

The integrity check unit 172 performs integrity check with respect to the memory space specified by the security-processing management unit 171 to detect the presence or absence of falsification. The integrity check unit 172 receives verification data in the security processing information 174 from the security-processing management unit 171, performs integrity check according to a predetermined algorithm, and notifies the security-processing management unit 171 of the result. In the case of the first modification, the security-processing management unit 171 specifies the reference address and the size to the integrity check unit 172, and the integrity check unit 172 performs integrity check with respect to the memory space (corresponding to the verification target region) in a range indicated by the reference address and the size.

The access-right update unit 173 notifies the access-right management unit 121 of update of the access right to the memory space specified by the security-processing management unit 171. In the case of the first modification, the security-processing management unit 171 specifies the reference address and the size to the access-right update unit 173, and the access-right update unit 173 performs update of the access right to the memory space (corresponding to the verification target region) in the range indicated by the reference address and the size.

Figure 25:
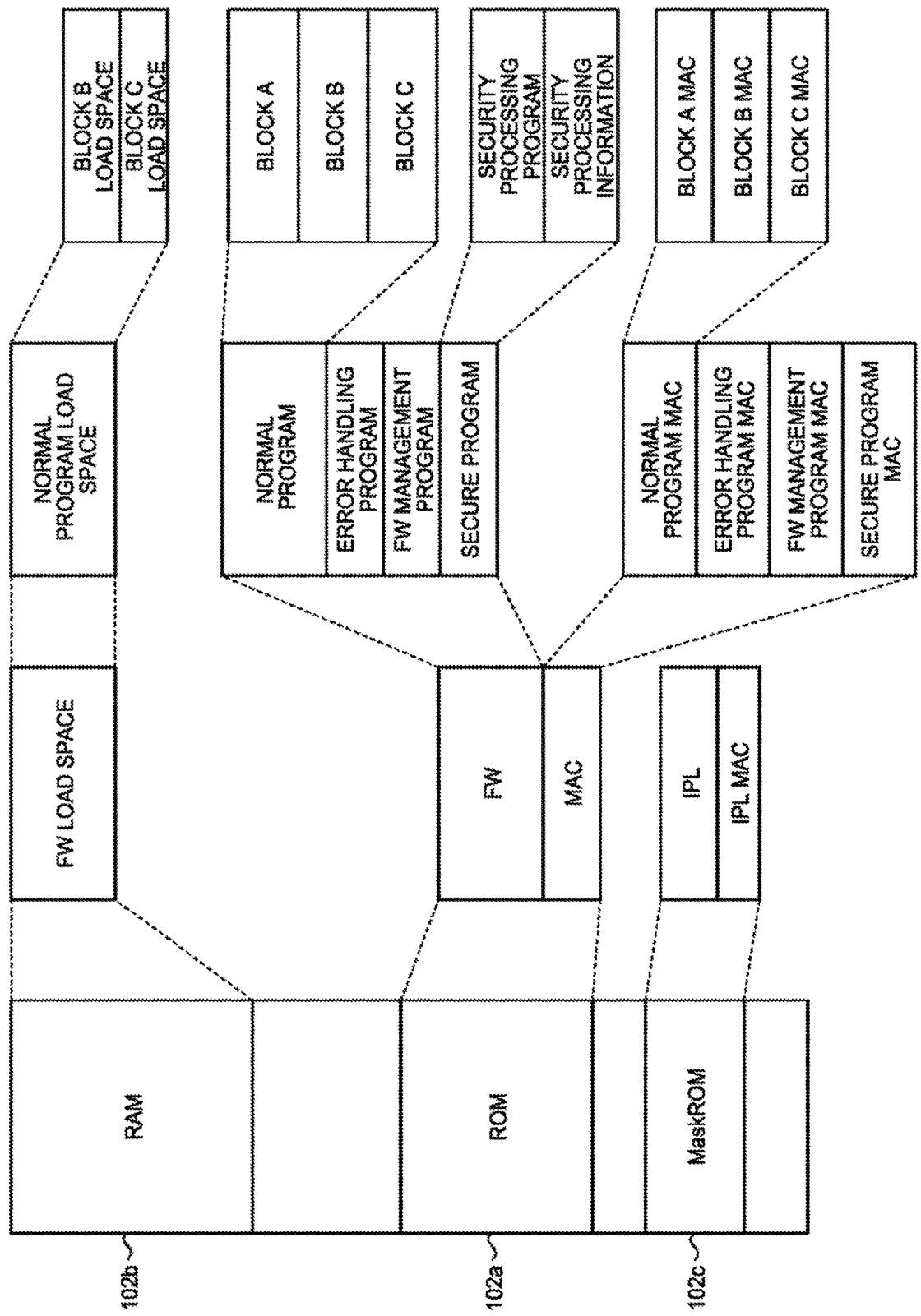
FIG. 25 is a diagram illustrating an example of the memory map.

The memory map assumed in the first modification is described next. FIG. 25 is a diagram illustrating an example of the memory map in the first modification. The first modification is described while assuming that the FW and the MAC are stored in the ROM 102a, the FW includes one that is executed by referring to the ROM 102a and one that is executed by loading data from the ROM 102a to the RAM 102b, and regarding the MAC, the ROM 102a is referred to. However, the MAC can be loaded to the RAM 102b, and the FW can have a configuration in which the entire FW is loaded from the ROM 102a to the RAM 102b. It is assumed here that the error handling program, the FW management program, and the secure program of the FW are executed by referring to the ROM 102a, and the block A of the normal program is executed by referring to the ROM 102a, and other blocks are loaded from the ROM 102a to the RAM 102b and executed.

In the memory map according to the first modification illustrated in FIG. 25, as compared with the memory map illustrated in FIG. 20, an FW load space is present on the RAM 102b. The FW load space includes a normal program load space, and the normal program load space includes a load space of one or more FW blocks (a block-B load space, a block-C load space). It is not particularly required to provide a load space on the RAM 102b for the block A that does not need to be loaded. However, a load space can be equally secured as a load space of the normal program.

Figure 26:
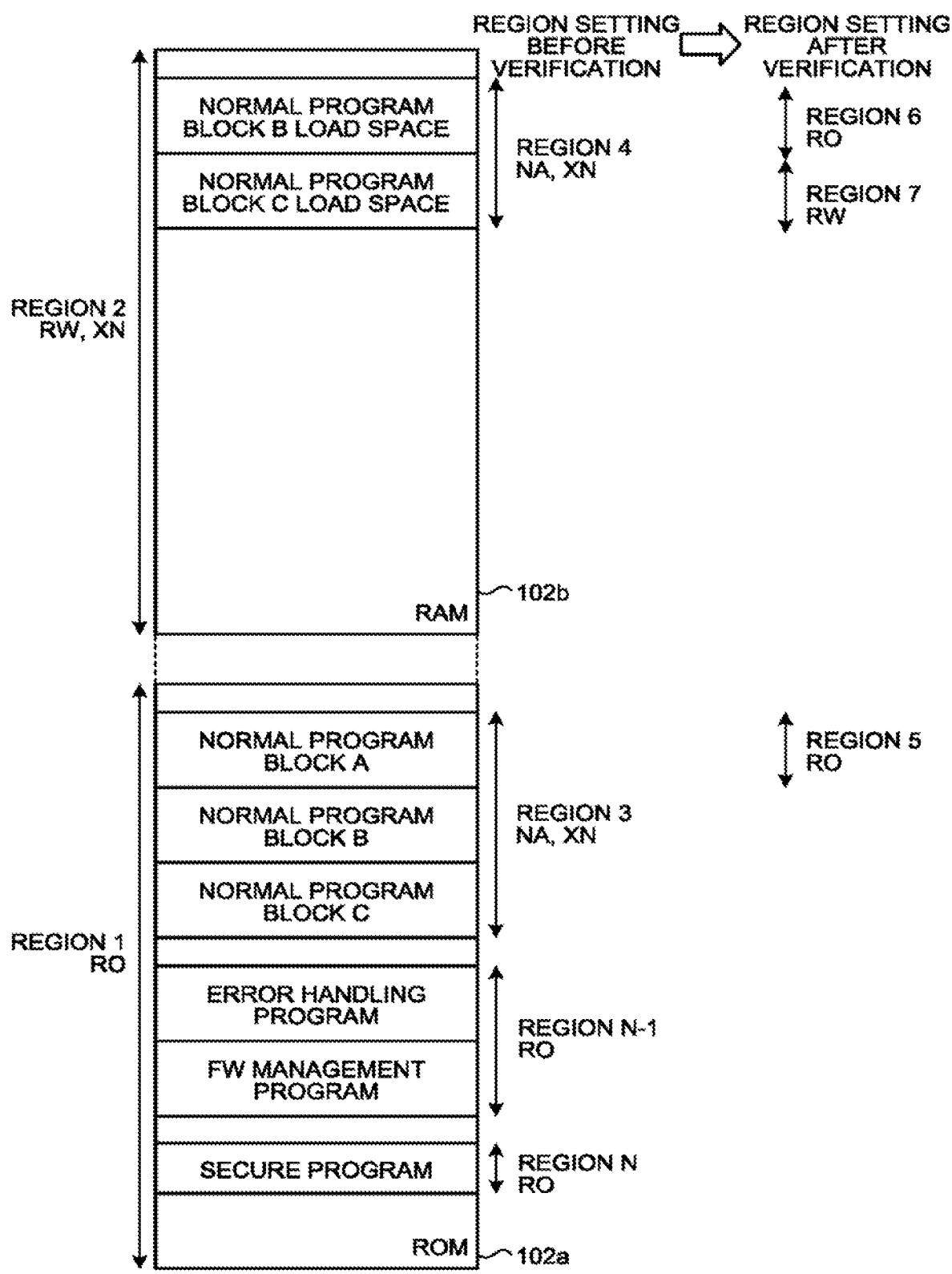
FIG. 26 is a diagram illustrating an example of region setting of FW.

FIG. 26 is a diagram illustrating an example of region setting of FW according to the first modification. In the region setting of the FW according to the first modification illustrated in FIG. 26, as compared with the example illustrated in FIG. 8, because a program to be executed is arranged in the memory space of the ROM 102a, RO is set in the region 1. The memory space in which the normal program being a target of divided verification is arranged is set to NA, XN in the region 3. Meanwhile, in the memory space of the RAM 102b, read and write are possible and data other than the program may be arranged. Therefore, RW, XN are set in the region 2. The memory space to which the normal program being a target of divided verification is loaded is set to NA, XN in the region 4. When the FW is performed in this state, if a program belonging to any of the unverified blocks A, B, and C is called, an access right violation occurs due to setting of the region 3 or the region 4. Upon reception of the access right violation, if load is required, the secure program performs load to the FW block in which the access right violation has occurred, verifies the FW block, and adds new regions (regions 5, 6, 7) to the memory space of the verified FW block so as to allow access thereto.

A processing flow according to the first modification is described next. In the first modification, as compared with the second embodiment described above, load of the normal program is added to the processing flow of the security processing. It is assumed here that the security processing information 174 is the same as that illustrated in FIG. 24, the memory map of the FW is the same as that illustrated in FIG. 25, FW region setting is the same as that illustrated in FIG. 26, and region setting has been performed appropriately for the RAM 102b, and only differences from the second embodiment described above are described here.

Figure 27:
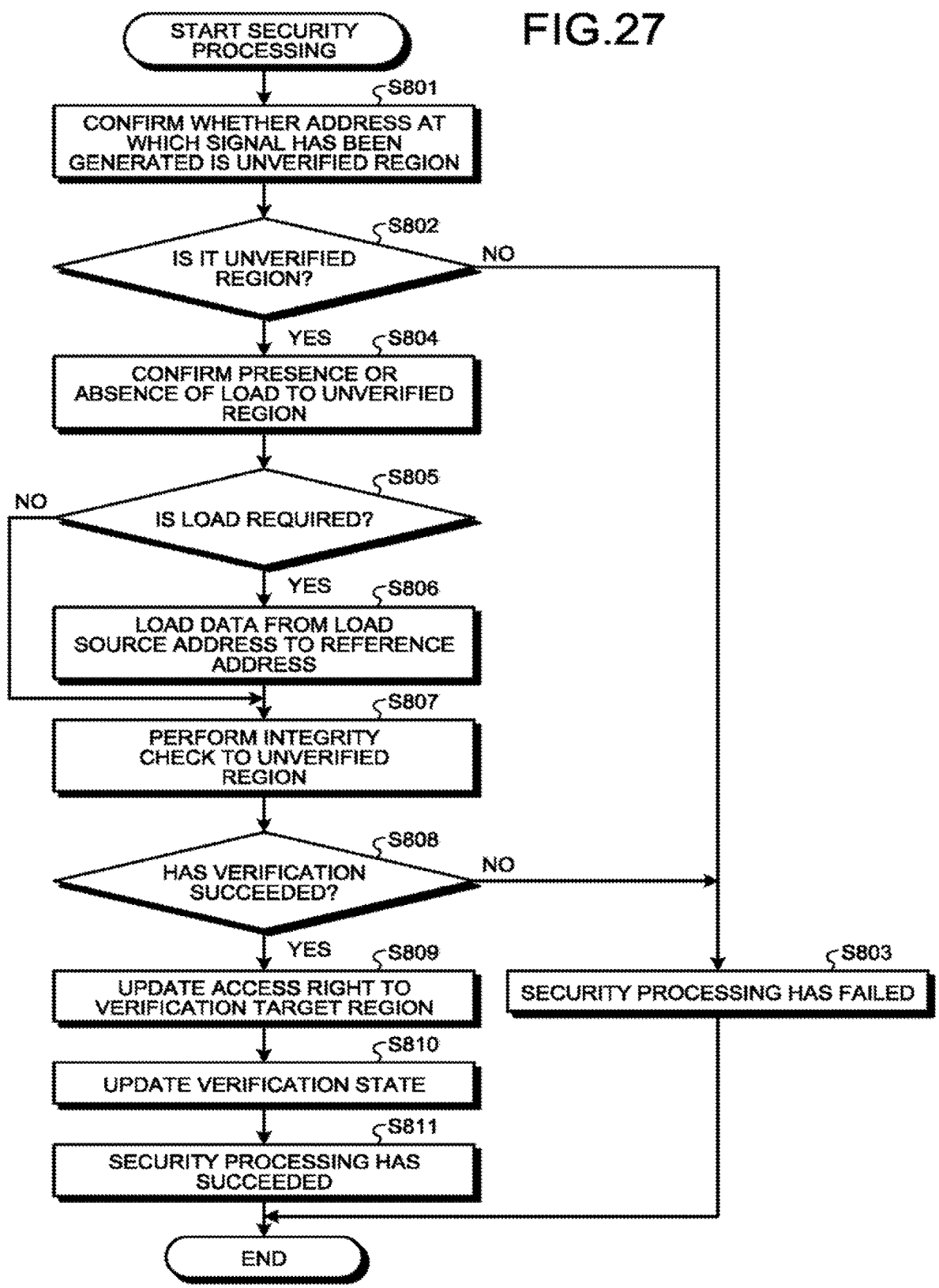
FIG. 27 is a flowchart illustrating a processing flow of security processing.

FIG. 27 is a flowchart illustrating a processing flow of the security processing according to the first modification. When the security processing is started by the secure program, the security-processing management unit 171 confirms whether an address at which a signal has been generated is an unverified region (Step S801). If the address at which the signal has been generated is an unverified region (YES at Step S802), the security-processing management unit 171 confirms the presence or absence of load to the unverified region in which the signal has been generated by referring to the security processing information 174 (Step S804).

If load to the unverified region in which the signal has been generated is required (YES at Step S805), the security-processing management unit 171 requests the load unit 175 to load data to the unverified region and the integrity check unit 172 to perform integrity check. The load unit 175 acquires the load source address, the reference address, and the size from the security-processing management unit 171 and loads data for the specified size from the load source address to the reference address (Step S806). After completion of load by the load unit 175, the integrity check unit 172 performs integrity check to the loaded data (the unverified region) (Step S807). On the other hand, if load to the unverified region in which the signal has been generated is not required (NO at Step S805), integrity check is performed without performing the load to the unverified region (Step S807).

Because other parts of the processing flow are the same as those of the processing flow illustrated in FIG. 12, descriptions thereof are omitted. If integrity check of the unverified region to which data has been loaded has failed, the security-processing management unit 171 can delete the loaded data or leave the loaded data as it is.

As described above, according to the first modification, because data movement and verification can be performed simultaneously, data on the memory 102 that has not been mapped in the memory can be subjected to divided verification, and the first modification can be applied to many more environments, not limited to the hardware configuration of the information processing apparatus 100B according to the second embodiment illustrated in FIG. 19. The memory 102 that has not been mapped in the memory indicates, for example, an SPI (Serial Peripheral Interface)-connected NOR flash memory or NAND flash memory.

The first modification has been described while assuming that the IPL does not perform load; however, the IPL can perform the load. In this case, in the processing flow illustrated in FIG. 21, the IPL confirms the presence or absence of load of a program to be verified before performing the integrity check, and if load is required, the IPL performs the load.

(Second Modification of Second Embodiment)

A second modification is an example in which cryptographic processing is performed with respect to a region detected due to an access right violation. In the first modification of the second embodiment described above, verification is performed after loading data on the ROM 102a to the RAM 102b and access is performed thereto. However, in the second modification, after loading data on the ROM 102a to the RAM 102b, the cryptographic processing is performed and access is performed thereto. The cryptographic processing according to the second modification is processing intended to conceal data, and a cryptographic algorithm such as AES (Advanced Encryption Standard) or DES (Data Encryption Standard) can be used, or mask processing of data or processing that is not based on the cryptographic algorithm, such as data scramble by changing data placement can be used.

Figure 28:
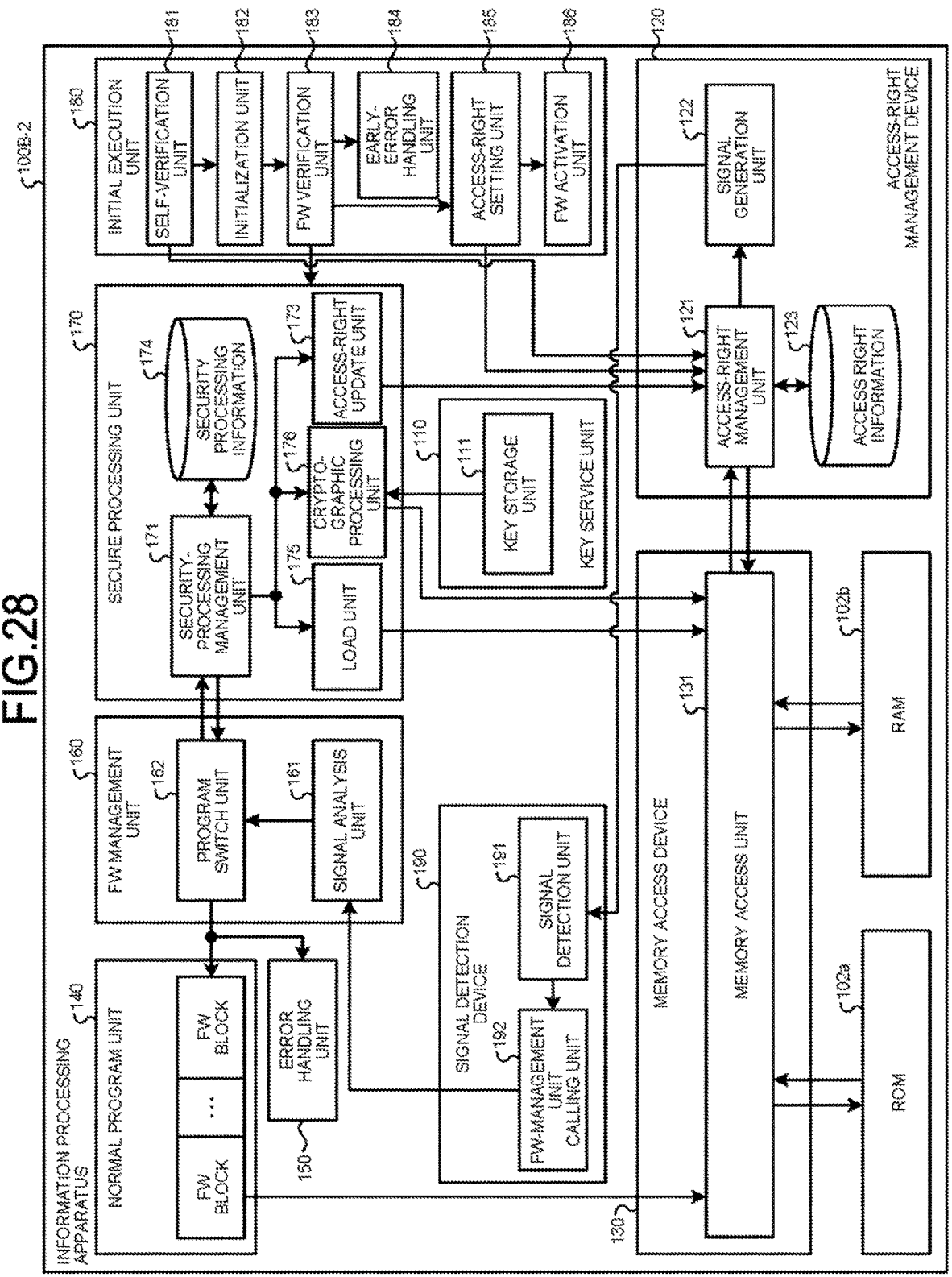
FIG. 28 is a block diagram illustrating a functional configuration example of an information processing apparatus.

FIG. 28 is a block diagram illustrating a functional configuration example of an information processing apparatus 100B-2 according to the second modification. In the information processing apparatus 100B-2, the integrity check unit 172 is replaced by a cryptographic processing unit 176, as compared with the information processing apparatus 100B-1 according to the first modification of the second embodiment illustrated in FIG. 23. The cryptographic processing unit 176 is a functional module that performs cryptographic processing with respect to a region detected due to an access right violation.

The second modification is described while assuming that the cryptographic processing by the cryptographic processing unit 176 is decoding of encrypted data. In the second modification, on the assumption that a partial data on the ROM 102a in which the FW is arranged is encrypted, the encrypted data on the ROM 102a is loaded to the RAM 102b and decoded, and then access thereto is performed. Load does not depend on the presence or absence of the cryptographic processing, and for example, data on the ROM 102a that has not been encrypted can be loaded to the RAM 102b and accessed as it is. In a case where the non-volatile main storage memory is used, the non-volatile main storage memory can be regarded as the ROM 102a, and the FW can be loaded to another memory space on the RAM 102b and decoded, or a specific memory space of the non-volatile main storage memory can be regarded as the RAM 102b, and the FW can be loaded thereto and decoded.

FIG. 29 is a diagram illustrating an example of the security processing information 174 according to the second modification. In the security processing information 174 according to the second modification, as compared with the security processing information 174 illustrated in FIG. 24, presence or absence of the cryptographic processing is added, the verification data is deleted, and the verification state is changed to an access state. In the second modification, because the cryptographic processing is performed instead of the integrity check, the security processing information 174 does not include information related to the verification target region, but includes information related to a memory space as a target of security processing (hereinafter, "target region").

The presence or absence of the cryptographic processing is information indicating whether the cryptographic processing unit 176 is to perform the cryptographic processing, and in the case of presence of the cryptographic processing, the cryptographic processing unit 176 performs the cryptographic processing, and in the case of absence of the cryptographic processing, the cryptographic processing unit 176 does not perform the cryptographic processing. Data in a region with the cryptographic processing is encrypted, and the cryptographic processing unit 176 performs the cryptographic processing to decode the data in the region. The access state is information indicating whether access has occurred to the region.

The presence or absence of load and the presence or absence of the cryptographic processing do not necessarily need to match each other, and a combination of "with load" and "without cryptographic processing" can be present. When the FW is arranged on the RAM 102b that operates as the non-volatile main storage memory, there can be a combination of "without load" and "with cryptographic processing". However, when the FW is arranged on the ROM 102a that can be updated only by a predetermined procedure, such as the NOR flash memory or the NAND flash memory, when there is the cryptographic processing, there is load inevitably.

The security-processing management unit 171 in the second modification performs management of the cryptographic processing with respect to a memory space in which an access right violation has occurred, in addition to management of data load to the memory space in which the access right violation has occurred, and management of the security processing information 174. When having determined that the generated access right violation is load to the target region or a cryptographic processing request based on the reference address in the security processing information 174, the address and size in which the access right violation has occurred, and the access state, the security-processing management unit 171 confirms the presence or absence of load to the target region, and when the load is required, the security-processing management unit 171 requests the load unit 175 to load data to the target region. Further, the security-processing management unit 171 confirms the presence or absence of the cryptographic processing in the target region, and when there is the cryptographic processing, the security-processing management unit 171 requests the cryptographic processing unit 176 to perform the cryptographic processing to the target region. When there is a notice of success in the cryptographic processing from the cryptographic processing unit 176 or the cryptographic processing is not performed, the security-processing management unit 171 requests the access-right update unit 173 to update the access right to the target region, and records that the target region has been accessed in the security processing information 174.

The cryptographic processing unit 176 performs the cryptographic processing with respect to the memory space (the target region) specified by the security-processing management unit 171. When the cryptographic processing unit 176 is to perform the cryptographic processing by a cryptographic algorithm, an encryption key can be stored in the key service unit 110 or stored as the information included in the security processing information 174. Further, the cryptographic processing can use an encryption key different for each region, or can use an algorithm different for each region. The second modification is described while assuming that the cryptographic processing unit 176 is realized by software; however, the cryptographic processing unit 176 can be realized by hardware. When the cryptographic processing unit 176 is realized by the hardware, the encryption key can be held by the cryptographic processing unit 176.

A processing flow according to the second modification is described next. In the second modification, as compared with the first modification of the second embodiment described above, integrity check in the processing flow of the security processing is changed to the cryptographic processing. It is assumed here that the security processing information 174 is the same as that illustrated in FIG. 29, the memory map of the FW is the same as that illustrated in FIG. 25, FW region setting is the same as that illustrated in FIG. 26, and region setting has been performed appropriately for the RAM 102b, and only differences from the first modification of the second embodiment described above are described here.

Figure 30:
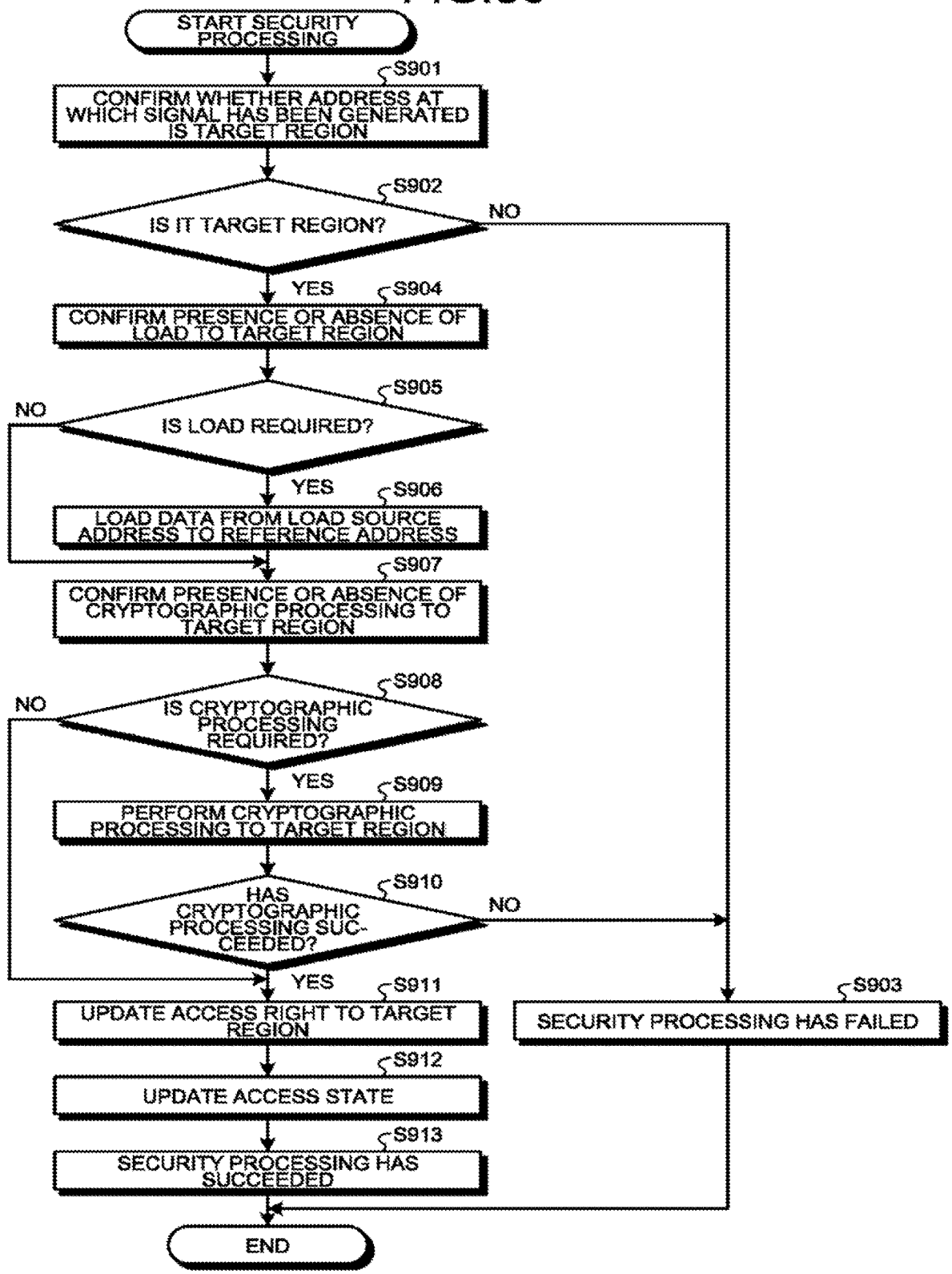
FIG. 30 is a flowchart illustrating a processing flow of security processing.

FIG. 30 is a flowchart illustrating a processing flow of the security processing according to the second modification. When the security processing is started by the secure program, the security-processing management unit 171 confirms whether an address at which a signal has been generated is the target region (Step S901). If the address at which the signal has been generated is not the target region or is the target region but the region has been already accessed (NO at Step S902), the security-processing management unit 171 determines that the security processing has failed (Step S903), and the process is finished. On the other hand, the address at which the signal has been generated is the target region and has not been accessed yet (YES at Step S902), the security-processing management unit 171 confirms the presence or absence of load to the target region in which the signal has been generated by referring to the security processing information 174 (Step S904).

If load to the target region in which the signal has been generated is required (YES at Step S905), the security-processing management unit 171 requests the load unit 175 to load data to the target region. The load unit 175 acquires the load source address, the reference address, and the size from the security-processing management unit 171, and loads data for the specified size from the load source address to the reference address (Step S906). On the other hand, if it is not required to load data to the target region in which the signal has been generated (NO at Step S905), load to the target region is not performed.

The security-processing management unit 171 confirms the presence or absence of the cryptographic processing to the target region in which the signal has been generated by referring to the security processing information 174. If the cryptographic processing is required (YES at Step S908), the security-processing management unit 171 requests the cryptographic processing unit 176 to perform the cryptographic processing to the target region. The cryptographic processing unit 176 acquires the reference address and the size from the security-processing management unit 171 and acquires the encryption key from the key service unit 119, thereby performing the cryptographic processing with respect to the data for the specified size from the reference address (Step S909).

If the cryptographic processing unit 176 has failed in the cryptographic processing (NO at Step S910), the security-processing management unit 171 determines that the security processing has failed (Step S903), and the process is finished. On the other hand, if the cryptographic processing unit 176 has succeeded in the cryptographic processing (YES at Step S910), the access right to the target region to which the cryptographic processing has been performed is updated (Step S911), the access state in the security processing information 174 is updated to "accessed" (Step S912), and the security-processing management unit 171 determines that the security processing is successful (Step S913), and the process is finished. Further, if the cryptographic processing to the target region in which the signal has been generated is not required (NO at Step S908), the cryptographic processing to the target region is not performed, and update of the access right (Step S911) and update of the access state in the security processing information 174 (Step S912) are performed. The security-processing management unit 171 determines that the security processing is successful (Step S913), and the process is finished.

As described above, according to the second modification, because the cryptographic processing can be performed with respect to the FW in a unit of block of an arbitrary size at the time of using data, data on the memory 102 can be concealed, and unintended data usage can be effectively prevented, as in the case where integrity check is performed with respect to the FW. Further, according to the second modification, because data movement and the cryptographic processing can be performed simultaneously, data on the memory 102 that has not been mapped in the memory can be subjected to divided verification, and the second modification can be applied to many more environments, not limited to the hardware configuration of the information processing apparatus 100B according to the second embodiment illustrated in FIG. 19.

In the second modification, it is described that the IPL does not perform load and the cryptographic processing; however, the IPL can perform load and the cryptographic processing. In this case, in the processing flow illustrated in FIG. 21, integrity check becomes the cryptographic processing, and the IPL confirms the presence or absence of load of the program to be verified, and if load is required, the IPL performed the load, and confirms the presence or absence of the cryptographic processing, and if the cryptographic processing is required, performs the cryptographic processing.

(Third Modification of Second Embodiment)

A third modification has a configuration in which the first modification and the second modification of the second embodiment described above are combined together, and the secure processing unit 170 simultaneously includes the load unit 175, the integrity check unit 172, and the cryptographic processing unit 176. In this case, the security processing information 174 has a configuration in which the security processing information 174 illustrated in FIG. 24 and the security processing information 174 illustrated in FIG. 29 are merged. That is, the security processing information 174 according to the third modification includes reference address, size, verification data, access right to be granted, access state, load source address, presence or absence of load, presence or absence of integrity check, presence or absence of cryptographic processing, and region number. The security-processing management unit 171 determines necessity of load, integrity check, and the cryptographic processing with respect to the memory space in which an access right violation has occurred, based on the security processing information 174, and manages execution of the processing.

Further, other than the load unit 175, the integrity check unit 172, and the cryptographic processing unit 176, other processing units can be combined. The other processing units can be any processing unit, for example, a data deletion unit that deletes data. All the processing to be combined together does not need to be performed simultaneously, and for example, only the integrity check unit 172 and the cryptographic processing unit 176 can operate together, or only the load unit 175 can operate. In this case, when any processing unit is determined to be unnecessary as the information processing apparatus 100B, the unrequired processing unit can be deleted.

In the second embodiment and the modifications thereof, as in the first embodiment described above, descriptions have been made while assuming that a region to which access right is newly granted is set with respect to the verified verification target region or the target region in which the cryptographic processing has been performed. However, as in the modification of the first embodiment described above, a configuration of using a subsidiary region in a region allocated in advance can be used.

Third Embodiment

In the first and second embodiments described above, an operation in a single core is assumed, and an operation in a multi-core is not assumed. In a third embodiment, while assuming an operation in a multi-core, the normal program unit 140 and the secure processing unit 170 are executed by different processors to realize improvement of security by data isolation, and verification and execution are realized simultaneously to suppress interrupt of the normal processing due to occurrence of verification. The third embodiment is described by using a multi-core configuration example by two processor cores. However, any number of processor cores can be used. In the multi-core configuration, a homogeneous processor core can be used, or a heterogeneous processor core can be used.

Figure 31:
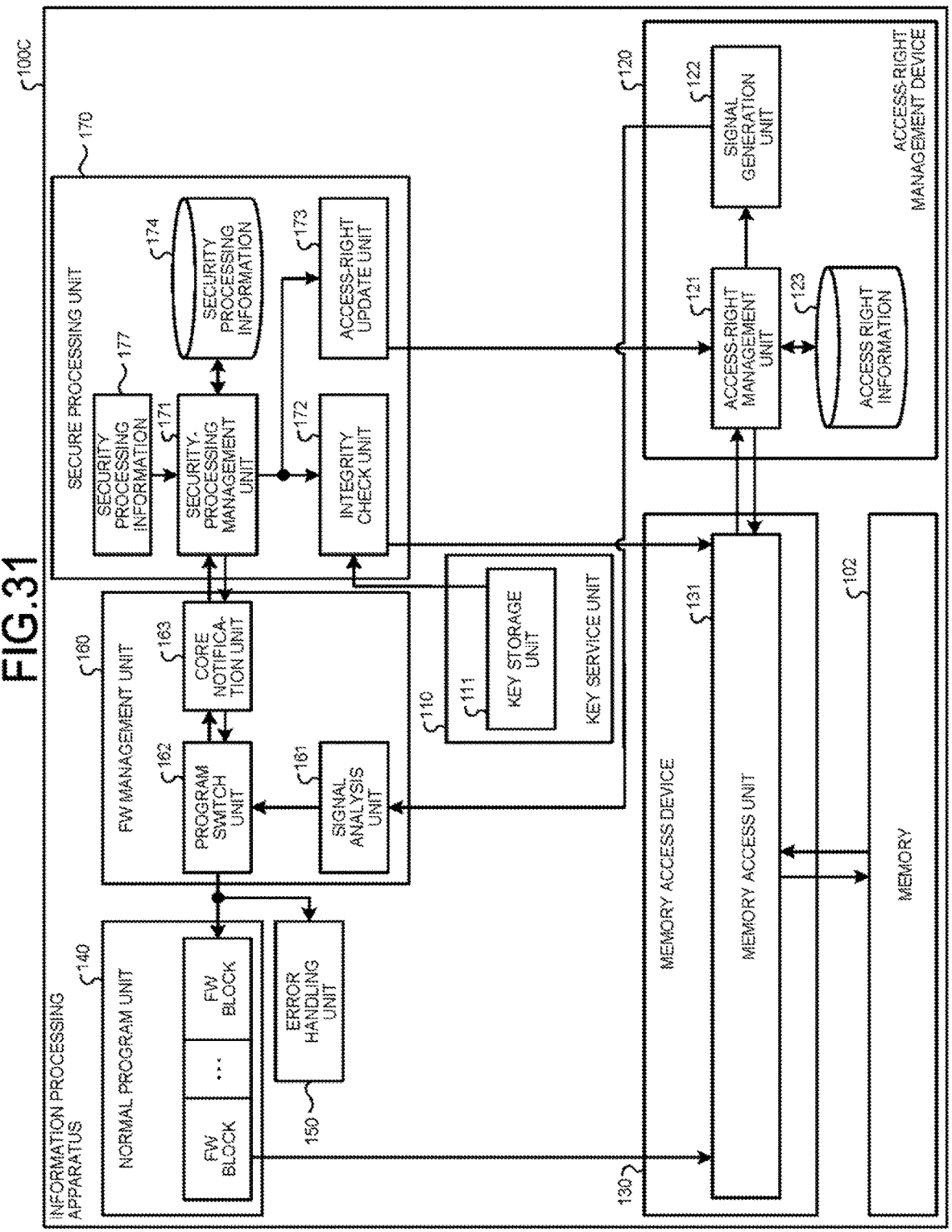
FIG. 31 is a block diagram illustrating a functional configuration example of an information processing apparatus.

FIG. 31 is a block diagram illustrating a functional configuration example of an information processing apparatus 100C according to the third embodiment. In the information processing apparatus 100C, a core notification unit 163 is added in the FW management unit 160, and an advance verification unit 177 is added in the secure processing unit 170, with respect to the functional configuration of the information processing apparatus 100A according to the first embodiment illustrated in FIG. 2.

The core notification unit 163 manages notification between the processor cores 101. For example, when the two processor cores 101 of a processor core A and a processor core B each execute a program, notification between the processor cores 101 indicates notification performed from the program of the processor core A to the program of the processor core B. The core notification unit 163 notifies the specified program operating in the other core to switch the program. Notification of switching the program can include notification contents received from the program switch unit 162. In the third embodiment, it is described that the core notification unit 163 is a part of the FW management unit 160. However, the core notification unit 163 can be realized as software or hardware independent of the FW.

When the core notification unit 163 notifies a switching destination of the program, the program switch unit 162 according to the third embodiment switches the program to a predetermined FW block of the normal program or the error handling program according to the notification. When the program at the switching destination is not the program executed by the current processor core 101, the program switch unit 162 notifies the core notification unit 163 to switch the program. The notification transmitted and received between the program switch unit 162 and the core notification unit 163 can include information required by the program at the switching destination. The information required by the program at the switching destination includes, for example, an address that has generated a signal, a cause of signal generation, and success or failure of the processing.

The advance verification unit 177 manages integrity check with respect to the verification target region in which an access right violation has not occurred (hereinafter, "advance verification") with respect to the security-processing management unit 171. When the security-processing management unit 171 does not perform the security processing due to the access right violation, the advance verification unit 177 requests the security-processing management unit 171 to perform advance verification. The security-processing management unit 171 requests the integrity check unit 172 to perform integrity check with respect to the region specified by the advance verification unit 177 to perform advance verification by using the integrity check unit 172. The region in which advance verification is to be performed is decided according to a predetermined method. Any methods can be used as the predetermined method. For example, the advance verification unit 177 can hold a list in which a verification sequence is described, or an algorithm to verify regions before and after a region where verification has occurred due to an access right violation can be used.

The security-processing management unit 171 according to the third embodiment performs advance verification upon reception of a request from the advance verification unit 177, in addition to management of the security processing with respect to the memory space in which the access right violation has occurred and management of the security processing information 174.

Figure 32:
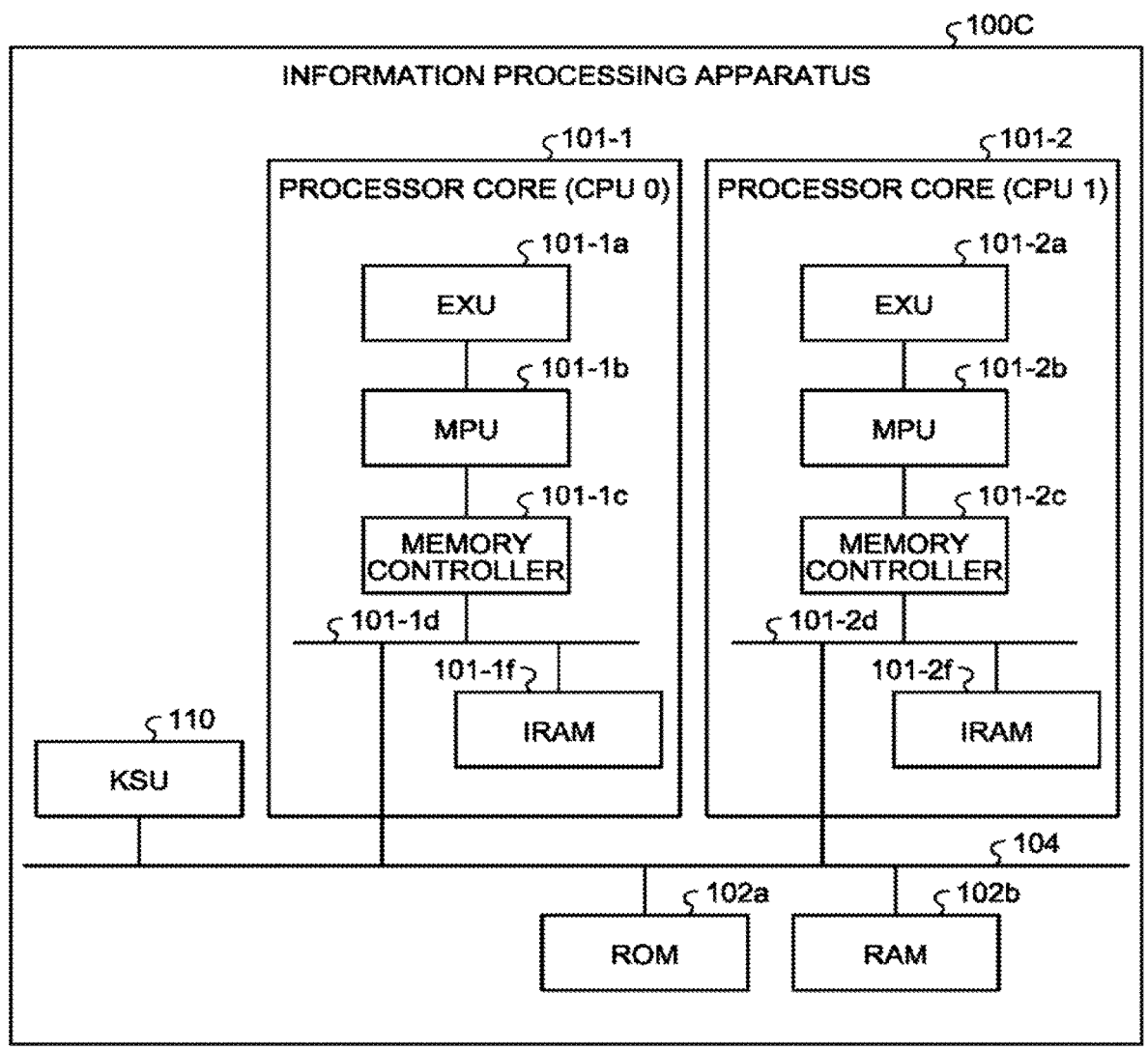
FIG. 32 is a block diagram illustrating a hardware configuration example of the information processing apparatus.

FIG. 32 is a block diagram illustrating a hardware configuration example of the information processing apparatus 100C according to the third embodiment. As compared with the hardware configuration of the information processing apparatus 100A according to the first embodiment illustrated in FIG. 5, the information processing apparatus 100C according to the third embodiment includes a processor core (CPU0) 101-1 and a processor core (CPU1) 101-2. The processor core (CPU0) 101-1 and the processor core (CPU1) 101-2 each include an internal RAM (IRAN) 101-1f, 101-2f in addition to an instruction execution unit (EXU) 101-1a, 101-2a, a memory protection unit (MPU) 101-1b, 101-2b, and a memory controller 101-1c, 101-2c.

It is assumed that the processor core (CPU0) 101-1, the processor core (CPU1) 101-2, the ROM 102a, and the RAM 102b can transmit and receive data, signals, and instructions to and from each other via the external bus 104. It is also assumed that the execution unit (EXU) 101-1a, the memory protection unit (MPU) 101-1b, the memory controller 101-1c, and the internal RAM (IRAM) 101-1f in the processor core (CPU0) 101-1 can transmit and receive data, signals, and instructions to and from each other via an internal bus 101-1d. Further, it is assumed that the execution unit (EXU) 101-2a, the memory protection unit (MPU) 101-2b, the memory controller 101-2c, and the internal RAM (IRAN) 101-2f in the processor core (CPU1) 101-2 can transmit and receive data, signals, and instructions to and from each other via an internal bus 101-2d. In the third embodiment, descriptions have been made with an example using the internal RAMs (IRAN) 101-1f and 101-2f; however, the internal RAMs (IRAN) 101-1f and 101-2f do not necessarily need to be used.

Figure 33:
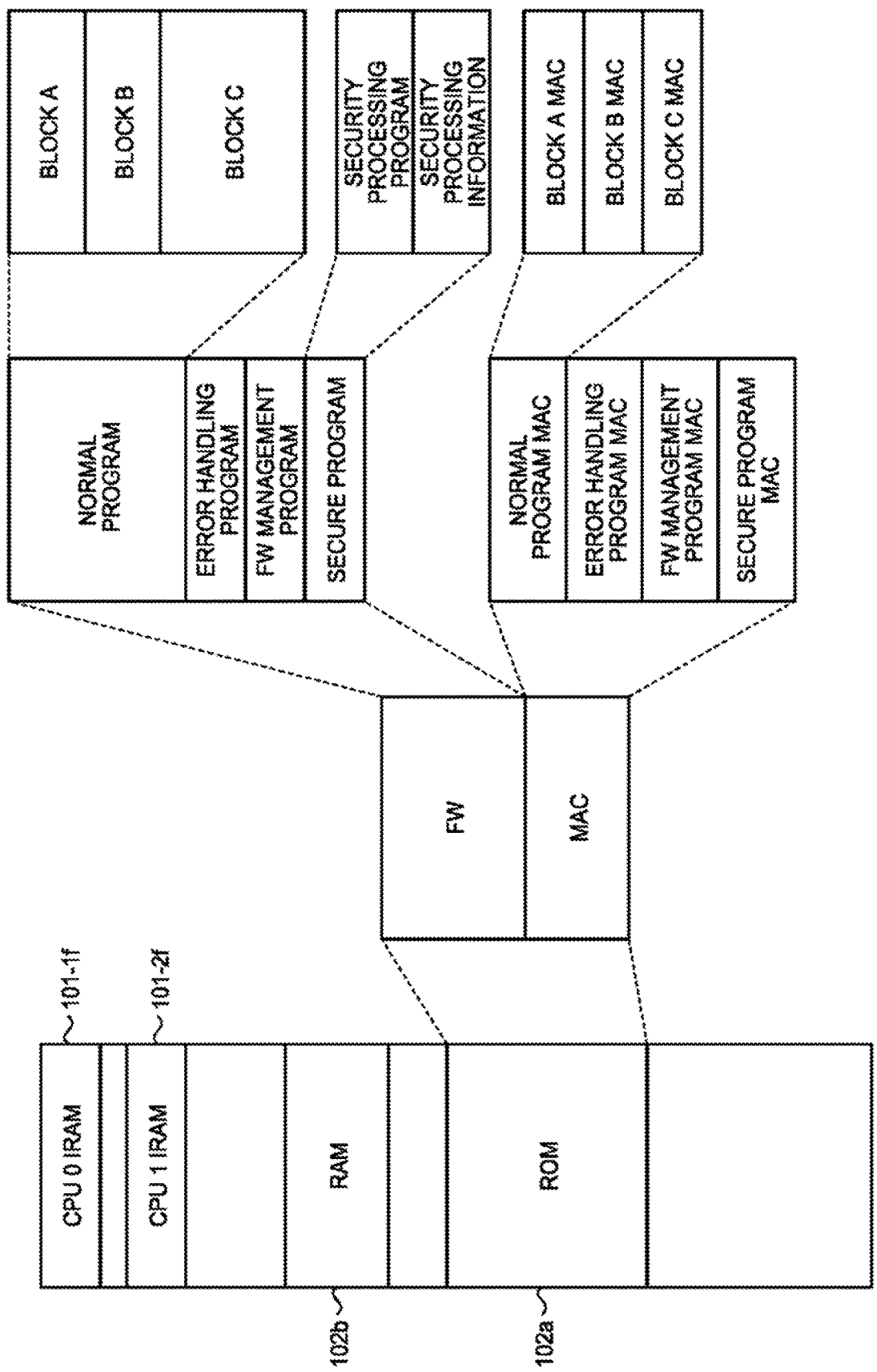
FIG. 33 is a diagram illustrating an example of the memory map.

A memory map assumed in the third embodiment is described next. FIG. 33 is a diagram illustrating an example of the memory map in the third embodiment. In the third embodiment, a CPU0 IRAM and a CPU1 IRAN are present in the memory space, as compared with the memory map illustrated in FIG. 6. The CPU0 IRAM is the internal RAM (IRAN) 101-1f of the processor core (CPU0) 101-1, and the CPU1 IRAN is the internal RAM (IRAN) 101-2f of the processor core (CPU1) 101-2. The processor core (CPU0) 101-1 cannot access the CPU1 IRAN, and the processor core (CPU1) 101-2 cannot access the CPU0 IRAN. Therefore, if data is arranged in the CPU0 IRAN in a program operating in the processor core (CPU0) 101-1, a program operating in the processor core (CPU1) cannot access the data, thereby realizing the data isolation. The RAM 102b and the ROM 102a can be accessed from the processor core (CPU0) 101-1 and the processor core (CPU1) 101-2. In the third embodiment, the internal RAMs (IRAN) 101-1f and 101-2f of the respective processor cores 101-1 and 101-2 are used to store data of the program operating in the respective processors cores 101-1 and 101-2.

Advance verification according to the third embodiment is performed by the secure program when the secure program is not performing the security processing due to an access right violation. Advance verification is performed automatically by a predetermined method. As the predetermined method, for example, advance verification can be performed in a state in which verification due to an access right violation has never occurred after activating the information processing apparatus 100C, or can be performed continuously after verification due to an access right violation is performed. When the security processing due to the access right violation has occurred during the advance verification performed by the secure program, the secure program can stop or interrupt the advance verification and perform the security processing due to the access right violation, or can perform the security processing due to the access right violation after finishing the advance verification. When the advance verification being performed is stopped, the advance verification is handled as having never been performed. Meanwhile, when the advance verification being performed is interrupted, the advance verification unit 177 stores the information at the time of interrupt, and restarts the interrupted advance verification after completion of the security processing due to the access right violation.

A processing flow of the information processing apparatus 100C according to the third embodiment is described next. In the third embodiment, as compared with the first embodiment described above, the processing flow at the time of activating and the processing flow at the time of data access are different from the first embodiment, and a processing flow at the time of advance verification is added. The third embodiment is described while assuming that the information processing apparatus 100C activates the processor core (CPU0) 101-1 first, causes the processor core (CPU0) 101-1 to operate the secure program, and the processor core (CPU1) 101-2 then operates the normal program, the FW management program, and the error handling program. However, the processor cores 101 that operate the respective programs can be changed over. The programs to be operated may depend on the processor cores 101 such that the secure program and the error handling program are operated by the processor core (CPU0) 101-1, and the normal program and the FW management program are operated by the processor core (CPU1) 101-2. It is assumed here that the security processing information 174 is the same as that illustrated in FIG. 4, the memory map of the FW is the same as that illustrated in FIG. 33, and the region setting of the FW is the same as that illustrated in FIG. 8, and the region setting for the RAM 102*b* is appropriately performed, and only differences from the first embodiment are described here.

Figure 34:
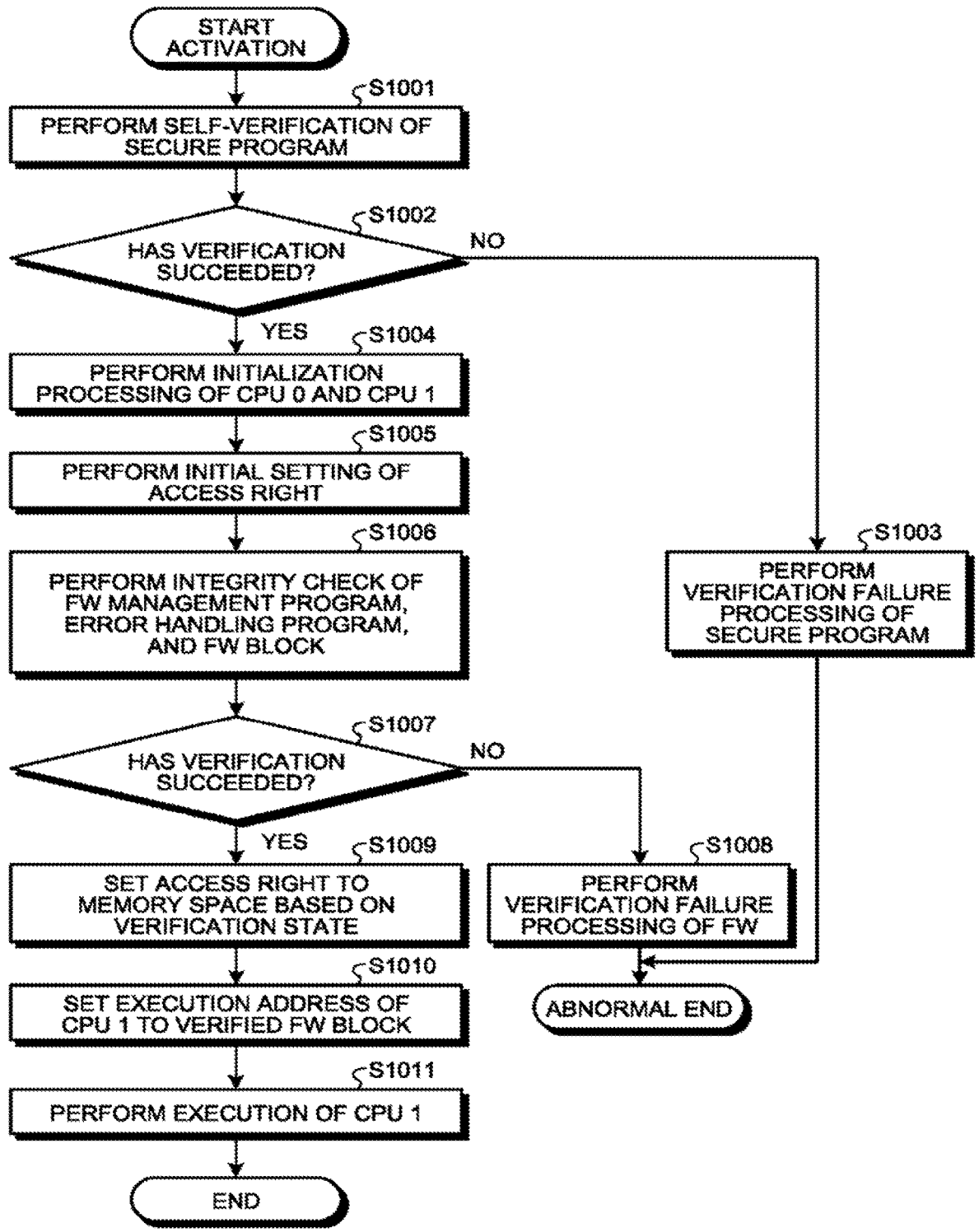
FIG. 34 is a flowchart illustrating a processing flow at the time of activating.

FIG. 34 is a flowchart illustrating a processing flow at the time of activating the information processing apparatus 100C according to the third embodiment. Upon input of power, the information processing apparatus 100C starts execution of the secure program of the FW by the processor core (CPU0) 101-1.

The secure program performs self-verification first (Step S1001). If the self-verification has succeeded (YES at Step S1002), the secure program performs initialization processing of the processor core (CPU0) 101-1 and the processor core (CPU1) 101-2 (Step S1004). In the initialization processing of the processor core (CPU0) 101-1 and the processor core (CPU1) 101-2, predetermined initialization processing is performed, for example, peripheral initialization and supply of clock to the processor core (CPU1) 101-2.

Subsequently, the secure program performs initial setting of the access right (Step S1005). The secure program performs integrity check of the FW management program and the error handling program on the ROM 102*a* and the FW block (the block A) to be executed first by the integrity check unit 172 (Step S1006). If the verification processes have succeeded (YES at Step S1007), the secure program performs setting of the access right to the memory space (Step S1009). The initial setting of the access right and setting of the access right based on the verification state need to be performed by both the processor core (CPU0) 101-1 and the processor core (CPU1) 101-2. If one of the settings of the processor core (CPU0) 101-1 and the processor core (CPU1) 101-2 is reflected to the other, the initial setting of the access right and the setting of the access right based on the verification state can be performed by only one of the processor core (CPU0) 101-1 and the processor core (CPU1) 101-2.

Thereafter, the secure program sets the program to be executed by the processor core (CPU1) 101-2 to the FW block (the block A) (Step S1010). Accordingly, the processor core (CPU1) 101-2 starts execution of the FW block of (the block A) the normal program (Step S1011), and the activation processing is finished. Because other parts of the processing flow are the same as those of the processing flow illustrated in FIG. 9, descriptions thereof are omitted.

Figure 35:
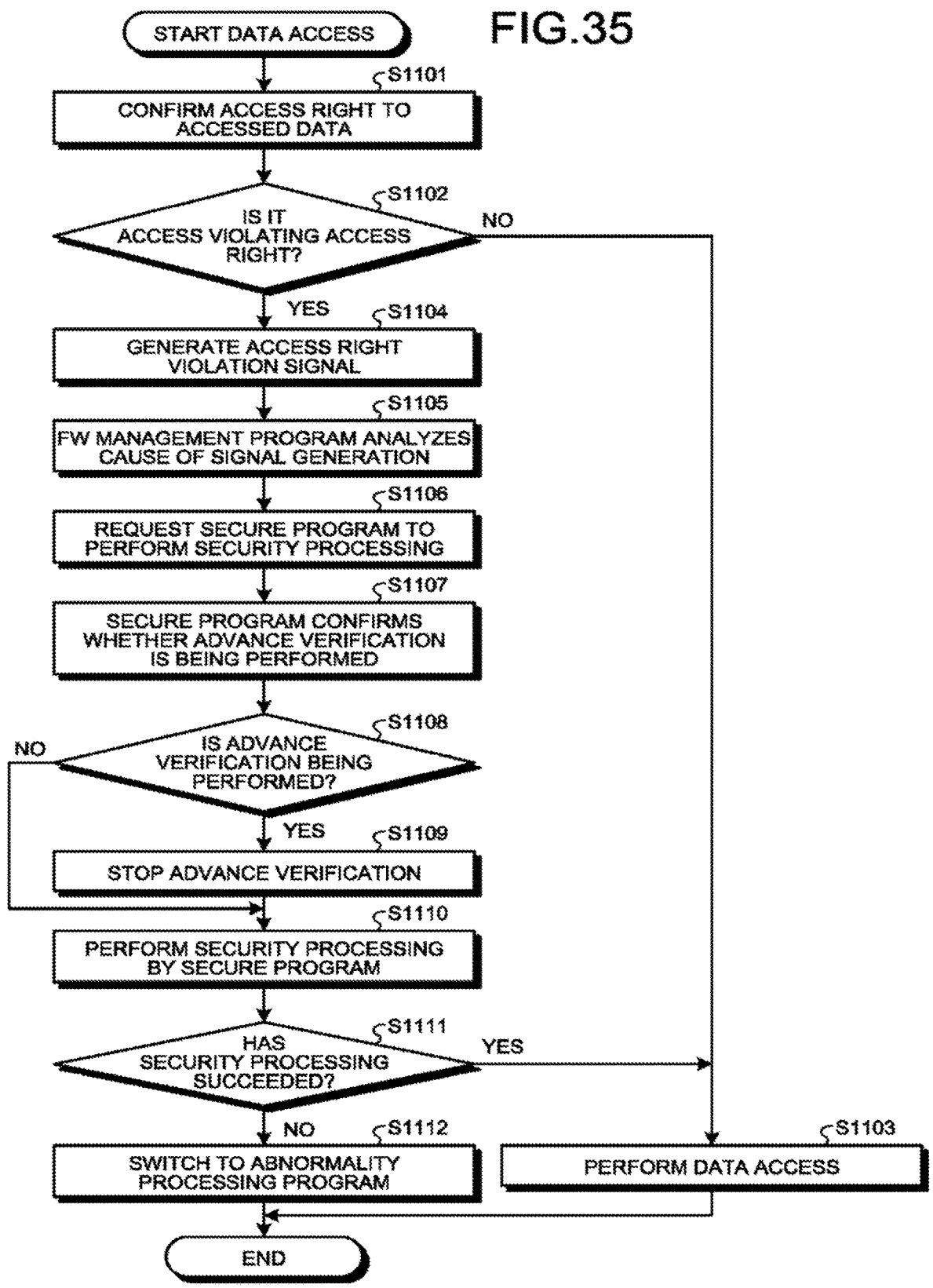
FIG. 35 is a flowchart illustrating a processing flow at the time of data access.

FIG. 35 is a flowchart illustrating a processing flow at the time of data access by the information processing apparatus 100C according to the third embodiment. The processing flow is described here while assuming a case where data access has occurred from the block A to the block B of the normal program operating in the processor core (CPU1) 101-2. Descriptions of the processing common to the processing flow illustrated in FIG. 10 are omitted, and only differences from the processing flow illustrated in FIG. 10 are described.

When an access right violation signal is generated with respect to the memory access (Step S1104), the processor core (CPU1) 101-2 interrupts execution of the normal program, and the signal analysis unit 161 of the FW management program analyzes the cause of signal generation (Step S1105). If the cause of signal generation is an access right violation, the program switch unit 162 notifies the core notification unit 163 to switch the program to the secure program in order to switche the program to the secure program, and the core notification unit 163 requests the secure program to perform the security processing (Step S1106).

The secure program confirms whether the advance verification is being performed (Step S1107), and if the advance verification is being performed (YES at Step S1108), the secure program stops the advance verification being currently performed (Step S1109). After the advance verification is stopped, or the advance verification is not being performed (NO at Step S1108), the secure program performs the security processing due to an access right violation (Step S1110). After completion of the security processing, the security-processing management unit 171 notifies the core notification unit 163 of success or failure of the security processing. The core notification unit 163 having received the notice from the security-processing management unit 171 provides the notice from the security-processing management unit 171 to the program switch unit 162. Other parts of the processing flow are the same as those of the processing flow illustrated in FIG. 10, and thus descriptions thereof are omitted.

Figure 36:
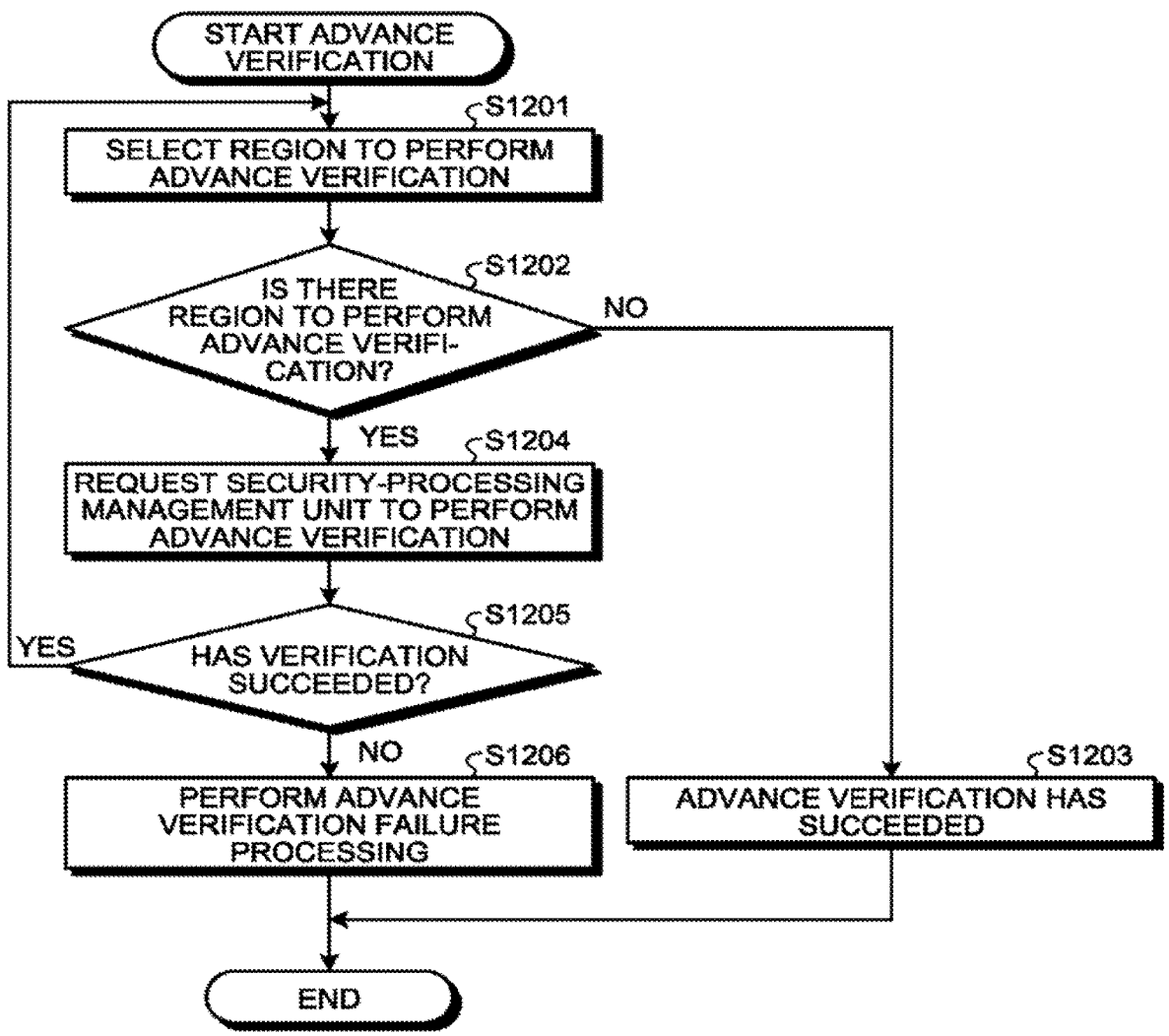
FIG. 36 is a flowchart illustrating a processing flow at the time of advance verification.

FIG. 36 is a flowchart illustrating a processing flow at the time of advance verification performed by the information processing apparatus 100C according to the third embodiment. The third embodiment is described while assuming that the advance verification occurs in the state with the security processing being not performed, and if the security processing occurs during the advance verification, the advance verification is stopped to perform the security processing.

When execution of the advance verification is started, the advance verification unit 177 first selects a region to perform advance verification (Step S1201). If there is no region to perform advance verification (NO at Step S1202), the advance verification unit 177 determines that the advance verification has succeeded (Step S1203), and the process is finished. At this time, because the advance verification unit 177 does not set the next advance verification, advance verification thereafter does not occur.

On the other hand, if there is a region to perform advance verification (YES at Step S1202), the advance verification unit 177 requests the security-processing management unit 171 to perform advance verification (Step S1204). The advance verification is the same processing as the security processing, and the security-processing management unit 171 receives the advance verification request as a security processing request. The security-processing management unit 171 performs the advance verification, and if the advance verification has failed (NO at Step S1205), the advance verification unity 177 performs post-processing involved with a failure of advance verification (Step S1206), and the process is finished. On the other hand, if the advance verification has succeeded (YES at Step S1205), the advance verification unity 177 returns to selection of a region to perform advance verification (Step S1201) in order to perform the next advance verification.

In the post-processing involved with the failure of advance verification, the similar operation to that of the verification failure processing in the security processing can be performed, or an operation for realizing fail soft. The operation for realizing fail soft can be an operation such that by notifying the normal program unit 140 of a region in which advance verification has failed, the normal program unit 140 can avoid access to data in the region in which advance verification has failed. In this case, there is a limitation on the function of the information processing apparatus 100C; however, the information processing apparatus 100C itself is not suspended and can continue its operation.

The security-processing management unit 171 can add region setting of access prohibition and execution prohibition with respect to a region in which verification has failed. In this case, in the post-processing involved with the failure of advance verification, the access-right update unit 173 sets predetermined access right.

As described above, according to the third embodiment, by providing a core that specializes in the security processing, data isolation between the normal processing and the security processing is realized, and by performing verification of the verification target region speculatively by the advance verification, interrupt of the normal processing due to verification of the unverified region can be suppressed. Further, because a falsified region can be detected before the use, although the function of the information processing apparatus 100C is limited, fail soft in which the information processing apparatus 100C itself can continue the operation without being suspended can be realized.

In the third embodiment, an example in which the secure program is activated first as in the first embodiment described above has been described. However, as in the second embodiment described above, the configuration of the third embodiment can be ouch that the IPL is activated first. Further, as the method of updating the access right to the verification target region, the subsidiary region can be used as in the modification of the first embodiment, or the security processing can have a configuration of using the load, the integrity check, the cryptographic processing, and other types of processing in combination, as in the first modification, the second modification, and the third modification of the second embodiment described above.

Fourth Embodiment

In the first and second embodiments, the verification target region is not verified unless data access to the verification target region occurs. Therefore, even if the information processing apparatuses 100A and 100B are operated for a long period, access does not necessarily occur to all the verification target regions, and thus it cannot be guaranteed that all the verification target regions are surely verified. Further, according to the third embodiment, even if data access does not occur, verification of the verification target region is possible by the advance verification unit 177 due to the multi-core; however, a single core is not assumed. A fourth embodiment has such a configuration that even in the case of single core, it can be guaranteed that all the verification target regions are surely verified by performing advance verification, upon reception of a signal to start advance verification.

Figure 37:
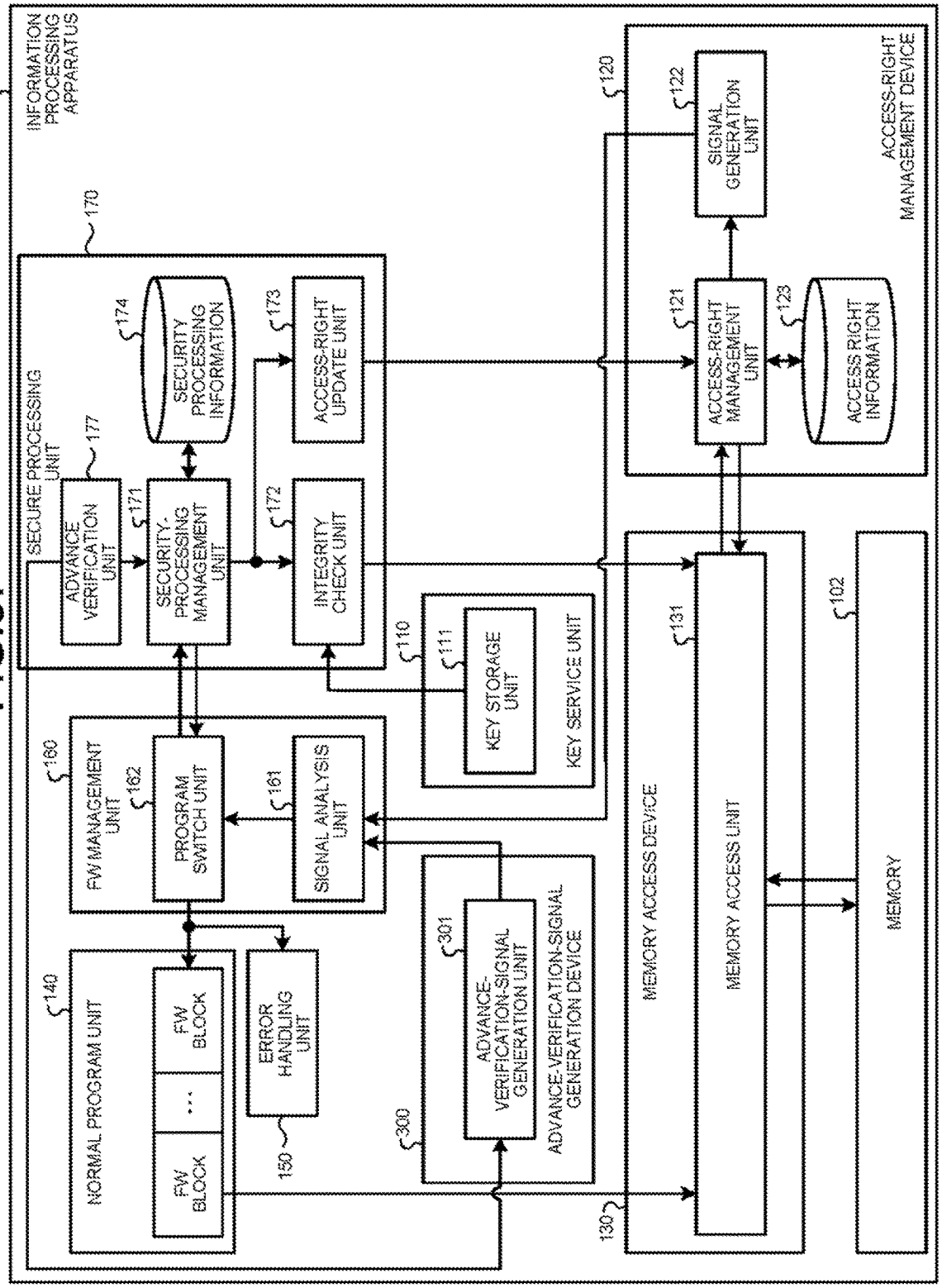
FIG. 37 is a block diagram illustrating a functional configuration example of an information processing apparatus.

FIG. 37 is a block diagram illustrating a functional configuration example of an information processing apparatus 100D according to the fourth embodiment. In the information processing apparatus 100D, an advance-verification-signal generation device 300 including an advance-verification-signal generation unit 301 is added, and the advance verification unit 177 is added in the secure processing unit 170, with respect to the functional configuration of the information processing apparatus 100A according to the first embodiment illustrated in FIG. 2.

The advance-verification-signal generation unit 301 generates an advance verification signal for starting advance verification by the secure program. Generation of the advance verification signal is according to a predetermined advance verification generation rule. The fourth embodiment is described while assuming that the advance verification generation rule is set by the advance verification unit 177. However, the advance verification generation rule can be set by the security-processing management unit 171 or by other methods. In addition, the advance-verification-signal generation unit 301 can be realized by software or by hardware. When the advance-verification-signal generation unit 301 is realized by software, it can be realized as a part of the FW, or realized as another program independent of the FW.

The advance verification unit 177 has functions identical to those of the advance verification unit 177 in the third embodiment described above.

The signal analysis unit 161 according to the fourth embodiment receives a signal generated by the advance-verification-signal generation unit 301 of the advance-verification-signal generation device 300, in addition to a signal generated by the signal generation unit 122 of the access-right management device 120, and analyzes the cause of the signals. A signal analysis result is notified to the program switch unit 162.

Figure 38:
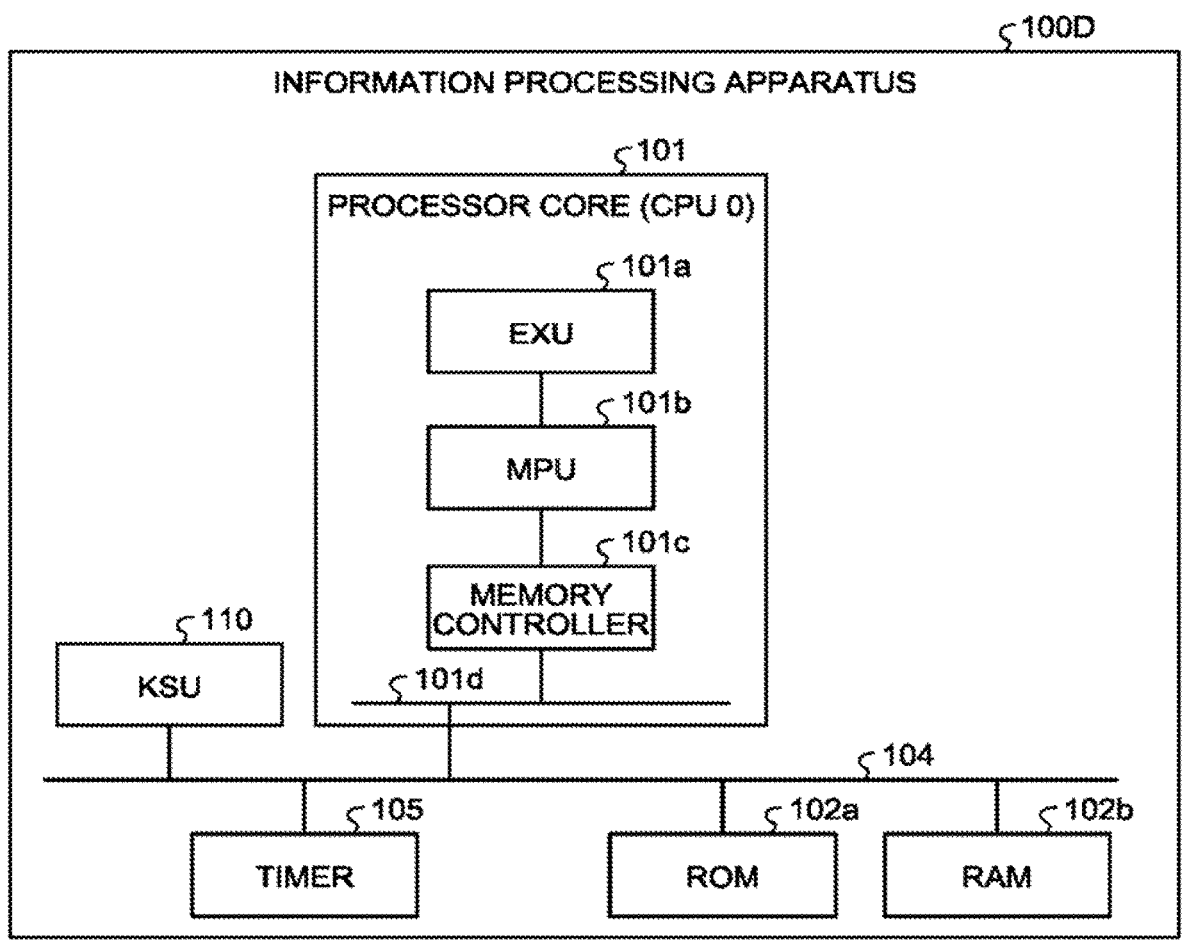
FIG. 38 is a block diagram illustrating a hardware configuration of the information processing apparatus.

FIG. 38 is a block diagram illustrating a hardware configuration of the information processing apparatus 100D according to the fourth embodiment. In the information processing apparatus 100D according to the fourth embodiment, a timer 105 is added as compared with the hardware configuration of the information processing apparatus 100A according to the first embodiment illustrated in FIG. 5. The processor core (CPU0) 101, the ROM 102a, the RAM 102b, and the timer 105 can transmit and receive data, signals, and instructions to and from each other via the external bus 104. It is assumed that the key service unit (KSU) 110 can transmit and receive data, signals, and instructions only to and from a device to which access is permitted. In the fourth embodiment, it is assumed that the timer 105 is used as the advance-verification-signal generation device 300 illustrated in FIG. 37. Therefore, the advance verification signal is generated by timer interrupt.

A processing flow of the information processing apparatus 100D according to the fourth embodiment is described next. In the fourth embodiment, as compared with the first embodiment described above, the processing flow at the time of activating, the processing flow at the time of data access, and the processing flow at the time of signal generation are different from the first embodiment, and a processing flow at the time of generation of the advance verification signal and a processing flow at the time of advance verification are added. The processing flow at the time of advance verification is the same as that of the third embodiment described above (FIG. 36), and thus descriptions thereof are omitted. It is assumed here that the security processing information 174 is the same as that illustrated in FIG. 4, the memory map of the FW is the same as that illustrated in the FIG. 6, the region setting of the FW is the same as that illustrated in FIG. 8, and the region setting for the RAM 102b is appropriately performed, and only differences from the first embodiment are described here.

Figure 39:
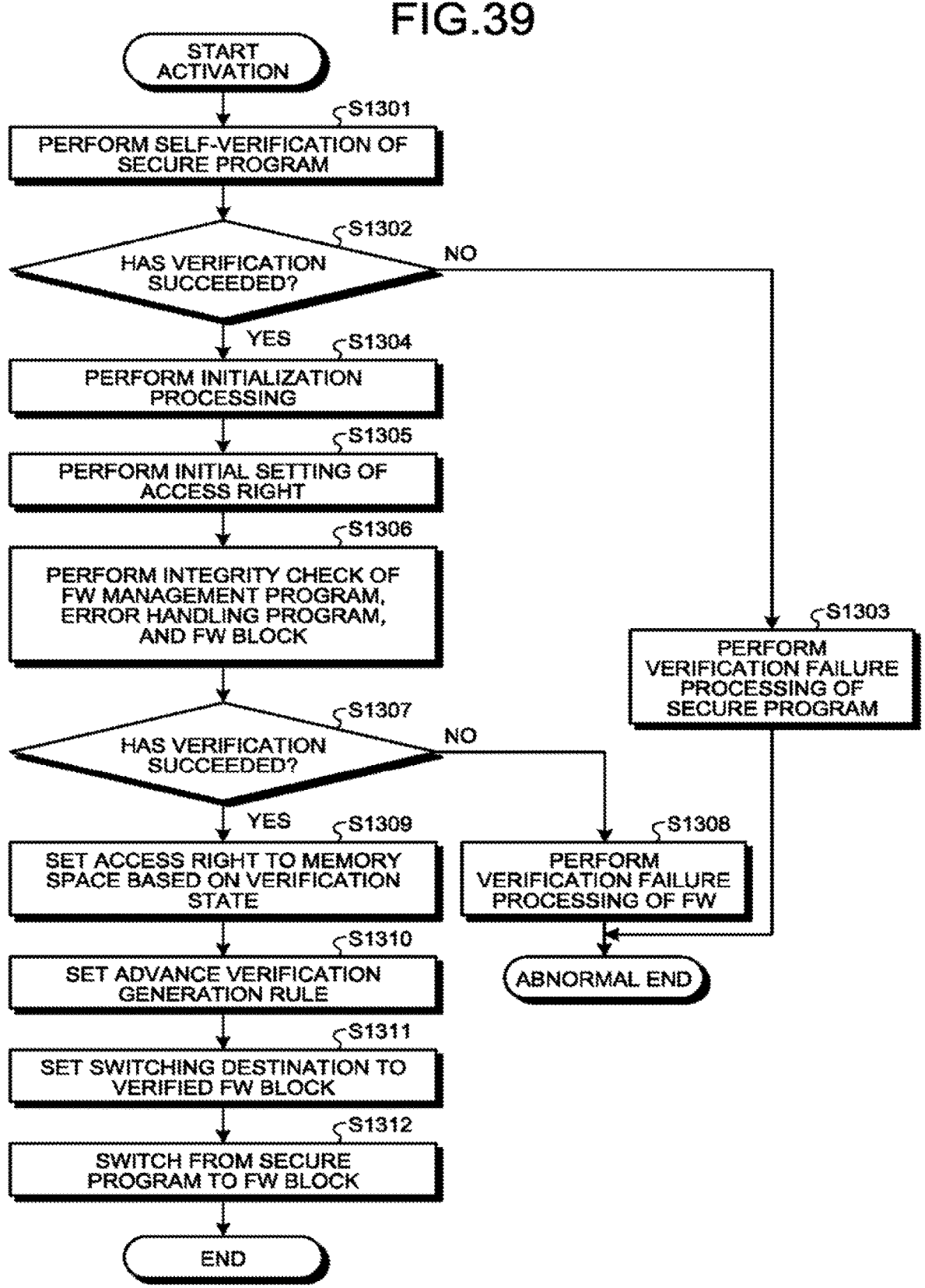
FIG. 39 is a flowchart illustrating a processing flow at the time of activating.

FIG. 39 is a flowchart illustrating a processing flow at the time of activating the information processing apparatus 100D according to the fourth embodiment. Descriptions of the processing common to the processing flow illustrated in FIG. 9 are omitted, and only differences from processing flow illustrated in FIG. 9 are described.

After integrity check of the FW management program and the error handling program on the ROM 102a and the FW block (the block A) to be executed first has succeeded (YES at Step S1307), and the access right has been set based on the verification state (Step S1309), the advance verification unit 177 of the secure program sets the advance verification generation rule with respect to the advance-verification-signal generation unit 301 (Step S1310). In the case of the fourth embodiment, because the advance-verification-signal generation device 300 is the timer 105, the timer 105 is set so that timer interrupt that starts advance verification after a predetermined time is generated. Setting of the advance verification generation rule can be performed before setting of the access right information based on the verification state, or after the switching destination is set to the verified FW block (the block A). Other parts of the processing flow are the same as those of the processing flow illustrated in FIG. 9, and thus descriptions thereof are omitted.

Figure 40:
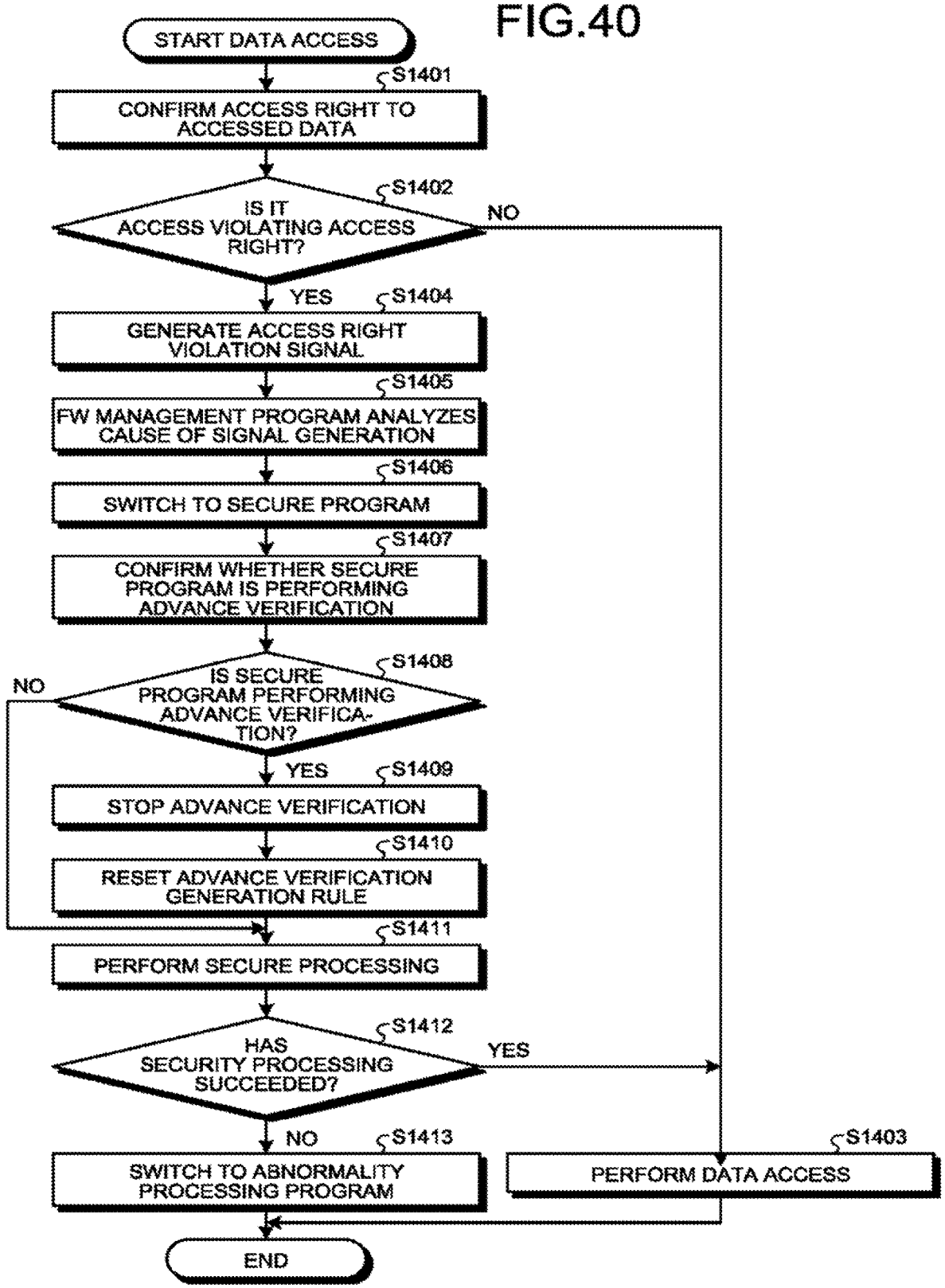
FIG. 40 is a flowchart illustrating a processing flow at the time of data access.

FIG. 40 is a flowchart illustrating a processing flow at the time of data access by the information processing apparatus 100D according to the fourth embodiment. Descriptions of the processing common to the processing flow illustrated in FIG. 10 are omitted here, and only differences from the processing common to the processing flow illustrated in FIG. 10 are described.

If the cause of signal generation is an access right violation, the program switch unit 162 switches the program to be executed by the processor core (CPU0) 101 to the secure program (Step S1406). The security-processing management unit 171 of the secure program confirms whether the secure program is performing advance verification (Step S1407). If the secure program is performing advance verification (YES at Step S1408), the security-processing management unit 171 stops advance verification being performed (Step S1409), and notifies the advance verification unit 177 of stoppage of advance verification being performed.

Upon reception of a notice of stoppage of advance verification, the advance verification unit 177 resets the advance verification generation rule with respect to the advance-verification-signal generation unit 301 (Step S1410). After resetting of the advance verification generation rule, or if the secure program is not performing advance verification (NO at Step S1408), the secure program performs the security processing (Step S1411). Because other parts of the processing flow are the same as those of the processing flow illustrated in FIG. 10, descriptions thereof are omitted.

Figure 41:
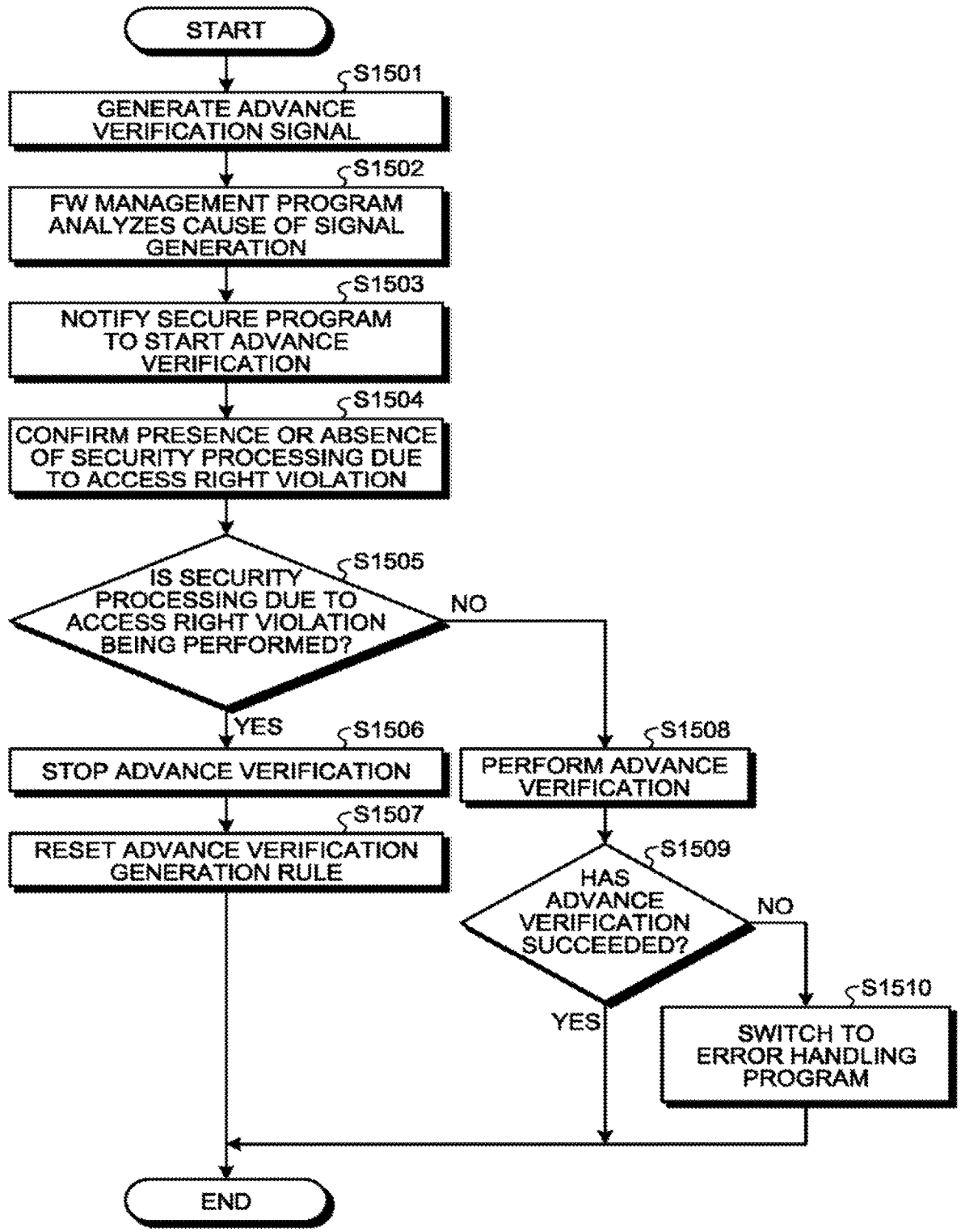
FIG. 41 is a flowchart illustrating a processing flow at the time of generation of an advance verification signal.

FIG. 41 is a flowchart illustrating a processing flow at the time of generation of an advance verification signal by the information processing apparatus 100D according to the fourth embodiment. The advance-verification-signal generation unit 301 first generates an advance verification signal according to a predetermined method (Step S1501). The predetermined method is timer interrupt by time-out, for example, when the advance-verification-signal generation device 300 is the timer 105, and other methods can be used.

When the advance verification signal is generated, the processor core (CPU0) 101 interrupts execution of the normal program, and the signal analysis unit 161 of the FW management program analyzes the cause of signal generation (Step S1502). If the cause of signal generation is advance verification, the program switch unit 162 switches the program to be executed by the processor core (CPU0) 101 to the secure program, and notifies the secure program to start advance verification (Step S1503).

The security-processing management unit 171 of the secure program confirms whether the secure program is performing the security processing due to an access right violation (Step S1504). If the secure program is performing the security processing due to the access right violation (YES at Step S1505), the security-processing management unit 171 stops the advance verification (Step S1506), and notifies the advance verification unit 177 of stoppage of the advance verification. The advance verification unit 177 resets the advance verification generation rule with respect to the advance-verification-signal generation unit 301 (Step S1507).

On the other hand, if the secure program is not performing the security processing due to an access right violation (NO at Step S1505), the secure program performs advance verification (Step S1508). If the advance verification performed by the secure program has failed (NO at Step S1509), the program switch unit 162 switches the program to be executed by the processor core (CPU0) 101 to the error handling program (Step S1510) to execute the error handling program. On the other hand, if the advance verification performed by the secure program has succeeded (YES at Step S1509), the program switch unit 162 switches the program to be executed by the processor core (CPU0) 101 to the normal program that has been interrupted, and the process is finished.

It is assumed that the error handling program to be executed when the advance verification has failed is the same as that described in the first, second, and third embodiments, and can be a program that realizes the fail soft as exemplified in the third embodiment. When the program that realizes the fail soft is used, the secure program notifies the normal program of a region in which the advance verification has failed, and the program switch unit 162 switches the program to be executed by the processor core (CPU0) 101 to the normal program that has been interrupted.

Figure 42:
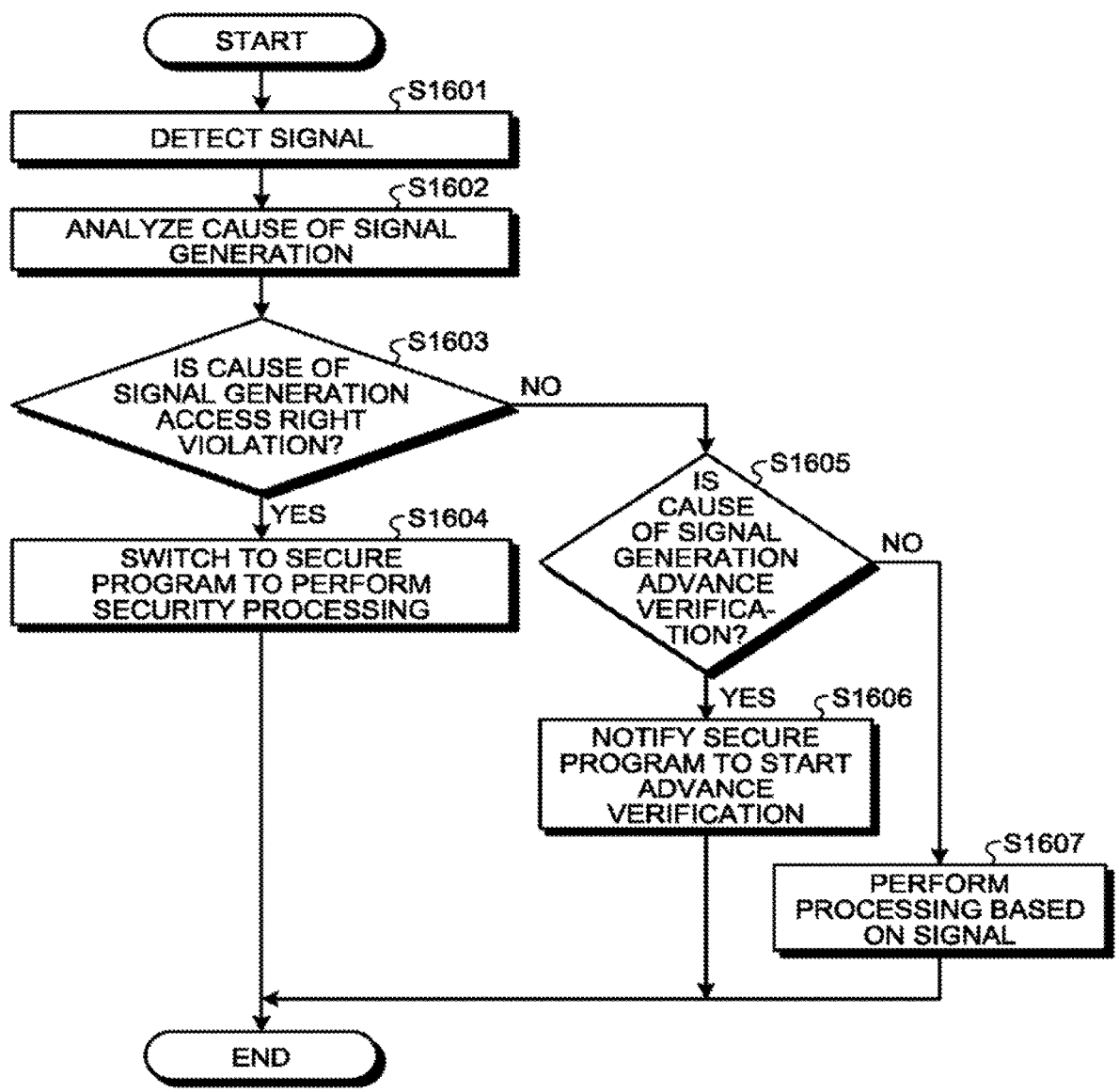
FIG. 42 is a flowchart illustrating a processing flow at the time of signal generation.

FIG. 42 is a flowchart illustrating a processing flow at the time of signal generation by the information processing apparatus 100D according to the fourth embodiment. In FIG. 40 and FIG. 41, it is described that the cause of signal generation is advance verification. However, the signal analysis unit 161 has an analysis function of other signals generated by the information processing apparatus 100D.

First, when a signal is detected (Step S1601), the processor core (CPU0) 101 interrupts execution of the normal program, and the signal analysis unit 161 in the FW management program analyzes the cause of signal generation (Step S1602). When the cause of signal generation is an access right violation (YES at Step S1603), the program switch unit 162 switches the program to be executed by the processor core (CPU0) 101 to the secure program, thereby performing the security processing by the secure program (Step S1604).

On the other hand, if the cause of signal generation is not the access right violation (NO at Step S1603), the signal analysis unit 161 further confirms whether the cause of signal generation is advance verification. If the cause of signal generation is advance verification (YES at Step S1606), the program switch unit 162 notifies the secure program to start advance verification (Step S1606), and the secure program performs advance verification. On the other hand, if the cause of signal generation is not advance verification (NO at Step S1605), the signal analysis unit 161 performs predetermined processing based on the signal (Step S1607).

As described above, according to the fourth embodiment, by generating verification with respect to a region to which access has not occurred at an arbitrary timing, verification to all the verification target regions can be guaranteed even in the single core. Further, as in the third embodiment, because a falsified region can be detected before use, fail soft can be realized in which the information processing apparatus 100D itself can continue the operation without being suspended, although the functions of the information processing apparatus 100D are limited.

Further, in the fourth embodiment, an example in which the secure program is first activated as in the first embodiment described above has been described. However, the fourth embodiment can have a configuration in which the IPL is first activated as in the second embodiment described above. As the method of updating the access right to the verification target region, the subsidiary region can be used as in the modification of the first embodiment, or the security processing can have a configuration of using the load, the integrity check, the cryptographic processing, and other types of processing in combination, as in the first modification, the second modification, and the third modification of the second embodiment described above.

Fifth Embodiment

In the embodiments described above, an upper limit of the region that can be set to the information processing apparatus is not taken into consideration. Therefore, the division number of the FW is limited by the number of regions that can be set. A fifth embodiment has a configuration in which when there is no empty region to which the access right can be set at the time of adding the region, the region is reset to secure an empty region.

Figure 43:
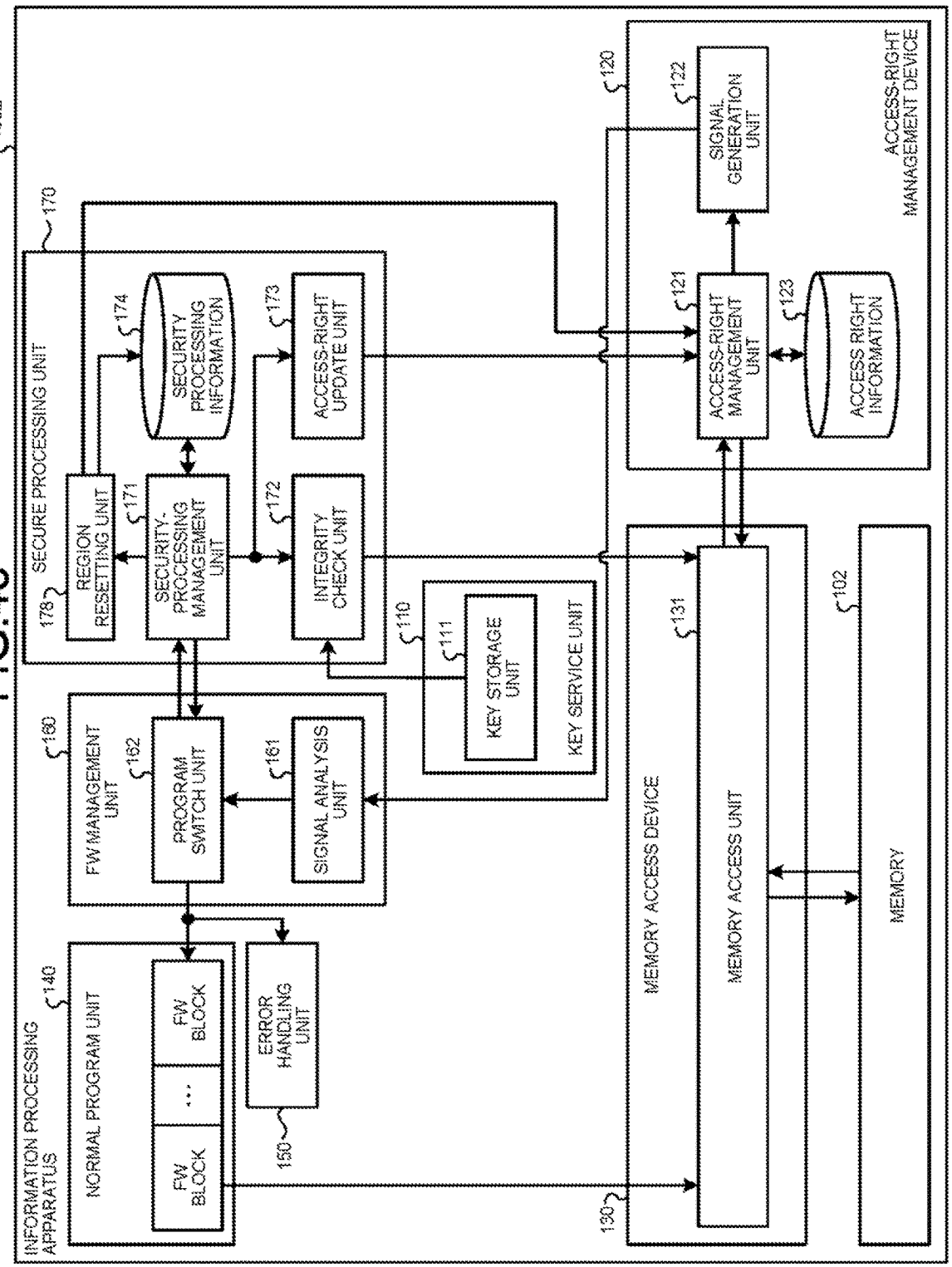
FIG. 43 is a block diagram illustrating a functional configuration example of an information processing apparatus.

FIG. 43 is a block diagram illustrating a functional configuration example of an information processing apparatus 100E according to the fifth embodiment. In the information processing apparatus 100E, a region resetting unit 178 is added with respect to the functional configuration of the information processing apparatus 100A according to the first embodiment illustrated in FIG. 2. The region resetting unit 178 is a functional module that reviews and resets region setting.

In addition to management of the security processing with respect to the memory space in which an access right violation has occurred and management of the security processing information 174, the security-processing management unit 171 according to the fifth embodiment requests the region resetting unit 178 to secure an empty region. In the fifth embodiment, an example in which securement of the empty region is requested when there is no empty region to which the access right can be set is described. However, the request can be made at any time, and for example, the request can be performed when the number of empty regions becomes equal to or less than a designated number. The request for securing the empty region can be made at the time of performing advance verification, so long as the configuration is to perform advance verification as in the third and fourth embodiments.

The region resetting unit 178 performs review of the region setting and resetting to secure the region to which the access right can be set. Upon reception of the request for securing the empty region from the security-processing management unit 171, the region resetting unit 178 acquires the security processing information 174 to perform resetting of the region based on a predetermined method, and notifies the access-right management unit 121 of the new region setting.

Figures 44A, 44B:
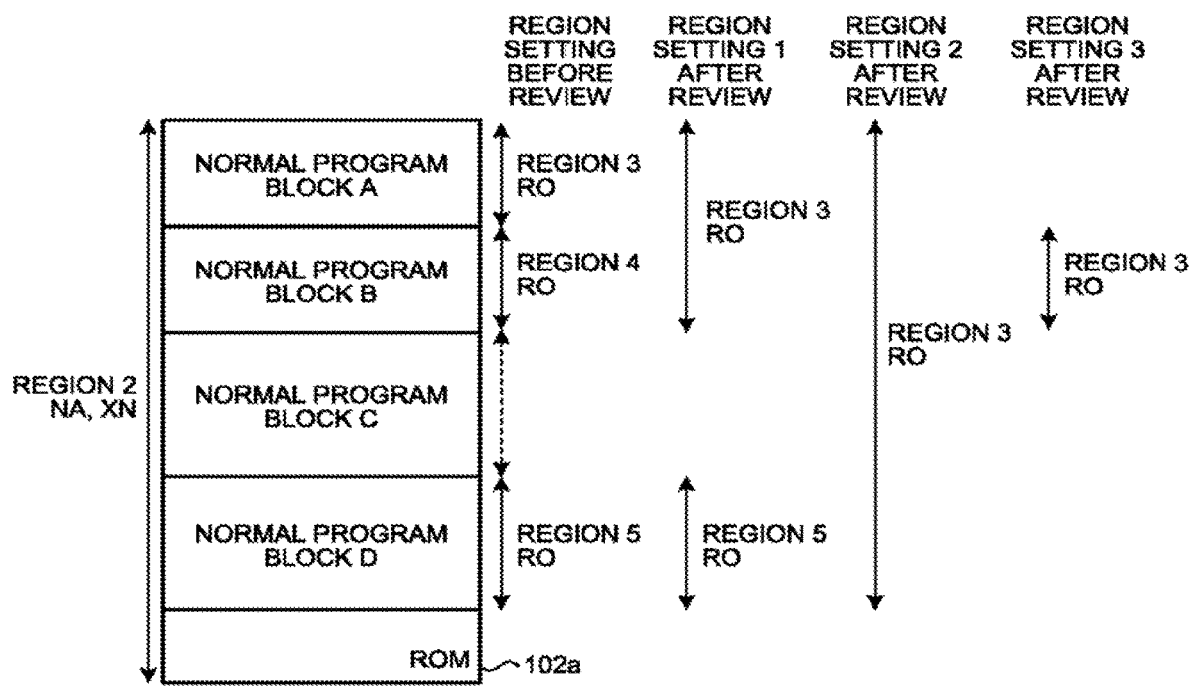
FIGS. 44A and 44B are explanatory diagrams of a setting method of a region.

The resetting method of the region for securing the region to which the access right can be set is exemplified with reference to FIG. 44. FIGS. 44A and 44B are explanatory diagrams of the resetting method of the region, where FIG. 44A illustrates an example of a region setting, and FIG. 44B illustrates an example of security processing information corresponding to the region setting before the review. It is assumed that the normal program is divided into four FW blocks such as blocks A, B, C, and D, and the blocks A, 13, and D have been verified already. The blocks A, B, and D are dynamically allocated (regions 3, 4, and 5), and a region has not been allocated to the unverified block C.

In order to secure the region to which the access right can be set, a method of collecting the regions currently set, and a method of disabling all the regions currently set are considered.

As the method of collecting the regions currently set, there are a method of collecting continuous verified regions having the same access right to be granted in one region, and a method of creating continuous regions having the same access right to be granted by verifying the unverified region forcibly. The method of collecting the continuous verified regions having the same access right to be granted in one region is to collect the regions 3 and 4 into the region 3 as illustrated in region setting 1 after the review in FIG. 44A. Meanwhile, as illustrated in region setting 2 after the review in FIG. 44A, the method of creating the continuous regions having the same access right to be granted by verifying the unverified region forcibly is to create continuous region blocks A, B, C, and D having the same access right to be granted by verifying the unverified block C, and designate these memory spaces as the region 3. In the region setting 1 after the review, the region 4 becomes the region to which the access right can be set, and in the region setting 2 after the review, the regions 4 and 5 become the regions to which the access right can be set.

As the method of disabling all the regions currently set, there is a method of resetting the verification state in the security processing information 174 at an arbitrarily timing to reallocate the region. In the example in FIGS. 44A and 44B, when reset of the verification state has occurred, the verification states of the blocks A, B, and D in the security processing information 174 illustrated in FIG. 44D are updated to "unverified". For example, when access to the block B occurs, the block B is re-verified, and the region 3 is allocated to the block B as illustrated in the region setting 3 after the review in FIG. 44A. At this time, in the region setting 3 after the review, the regions 4 and 5 become the region to which the access right can be set.

In the method of collecting the regions currently set, because reverification with respect to the block having been verified once does not occur, performance penalty due to resetting of the region is low. However, because the continuous regions having the same access right to be granted are not always present, the region to which the access right can be set may not be secured. Meanwhile, in the method of disabling all the regions currently set, because reverification with respect to the block having been verified once occurs, performance penalty due to resetting of the region is high. However, the regions to which the access right can be set can be surely secured. As a method of reducing performance penalty in the method of disabling all the regions currently set, there is a method of resetting only the region number without resetting the verification state, and omitting verification to allocate the region with respect to the block in which verification has been performed but re-verification has occurred.

A plurality of methods can be used for the resetting method of the region, and for example, a method of disabling all the regions currently set can be used when the method of collecting the regions currently set is performed and the region to which the access right can be set cannot be secured. Other than these methods, for example, there is a method of disabling a region having a low access frequency, a method of setting the priority in the regions in advance and preferentially disabling a region having low priority, and any method different from the exemplified method can be used as the resetting method of the region.

A processing flow of the information processing apparatus 100E according to the fifth embodiment is described next. In the fifth embodiment, as compared with the first embodiment, the processing flow of the security processing is different, and a processing flow of resetting the region is added. It is assumed here that the security processing information 174 is the same as that illustrated in FIG. 4, the memory map of the FW is the same as that illustrated in the FIG. 6, the region setting of the FW is the same as that illustrated in FIG. 8, and the region setting for the RAM 102b is appropriately performed, and only differences from the first embodiment are described here. Further, the descriptions are made here while assuming that the region to which the access right is set is dynamically decided.

Figure 45:
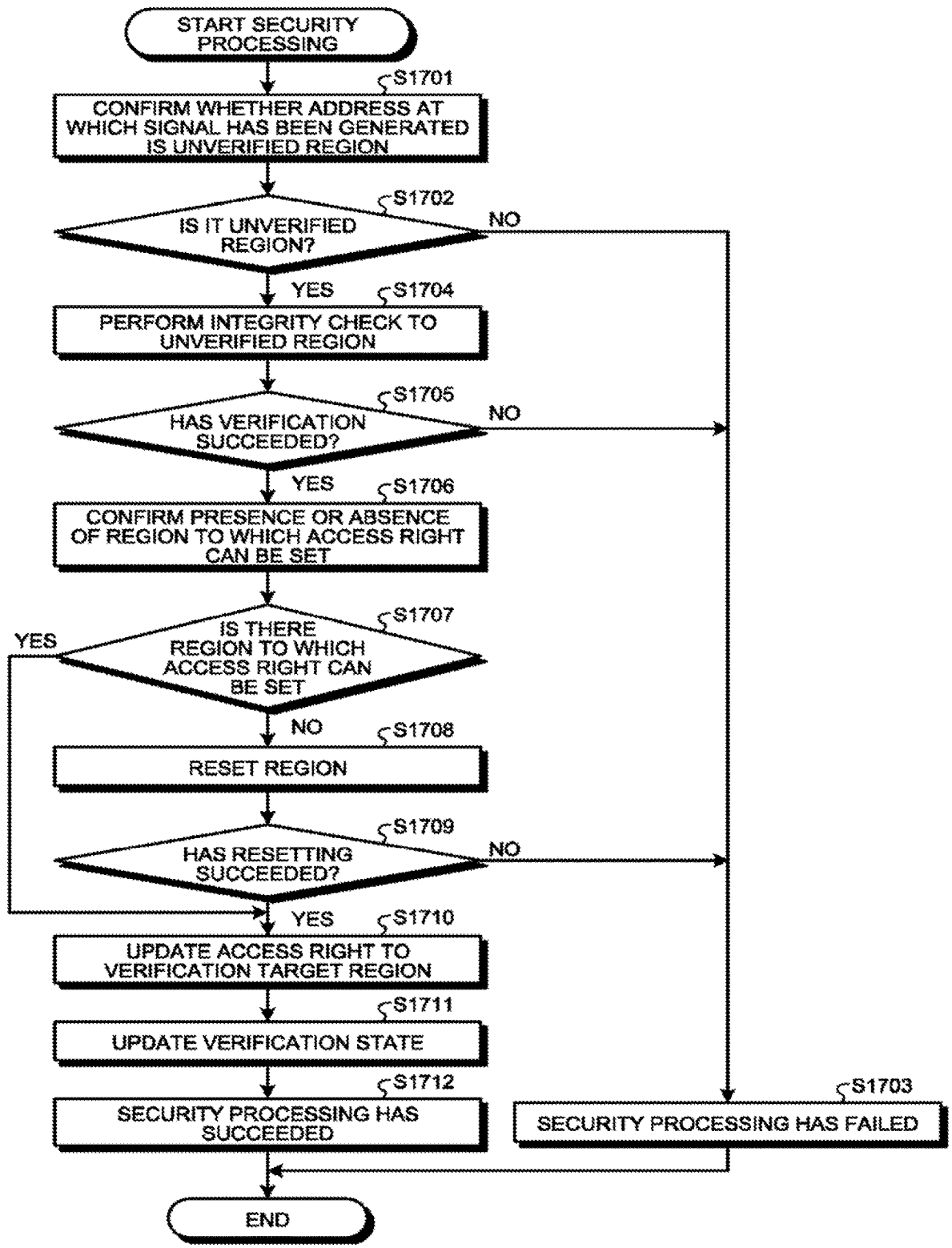
FIG. 45 is a flowchart illustrating a processing flow of security processing.

FIG. 45 is a flowchart illustrating a processing flow of security processing according to the fifth embodiment. Descriptions of the processing common to the processing flow illustrated in FIG. 12 are omitted, and only differences from the processing flow illustrated in FIG. 12 are described.

If the integrity check unit 172 has succeeded in integrity check (YES at Step S1705), the security-processing management unit 171 confirms presence or absence of a region to which the access right can be set (Step S1706). If there is no region to which the access right can be set (NO at Step S1707), the security-processing management unit 171 requests the region resetting unit 178 to reset the region in order to secure the empty region. Upon reception of the request from the security-processing management unit 171, the region resetting unit 178 resets the region based on a predetermined algorithm (Step S1708).

If the region resetting unit 178 has failed in resetting of the region (NO at Step S1709), the security-processing management unit 171 assumes that the security processing has failed (Step S1703), and the process is finished. On the other hand, if the region resetting unit 178 has succeeded in resetting of the region (YES at Step S1709) or there is a region to which the access right can be set (YES at Step S1707), the security-processing management unit 171 updates the access right to the verification target region (Step S1710). Because other parts of the processing flow are the same as those of the processing flow illustrated in FIG. 12, descriptions thereof are omitted. The series of processing regarding securement of the empty region added in the fifth embodiment can be performed before performing integrity check to the unverified region performed by the integrity check unit 172.

FIG. 46 is a flowchart illustrating a processing flow of resetting a region in the fifth embodiment. Upon reception of a request to reset the region from the security-processing management unit 171, the region resetting unit 178 starts resetting of the region.

The region resetting unit 178 resets the region according to a predetermined resetting method (Step S1801), and confirms presence or absence of the region to which the access right can be set (Step S1802). If there is no region to which the access right can be set (NO at Step S1802), the region resetting unit 178 assumes that resetting has failed (Step S1804), and the process is finished.

On the other hand, if there is a region to which the access right can be set (YES at Step S1802), the region resetting unit 178 requests the access-right management unit 121 to set the access right to the respective regions based on a resetting result. The access-right management unit 121 sets the requested access right (Step S1805). The region resetting unit 178 reflects the resetting result in the security processing information 174 (Step S1806), and assumes that resetting has succeeded (Step S1807), and the process is finished.

As described above, according to the fifth embodiment, even if there is no empty region to which the access right can be set, the empty region can be secured by resetting the region. Further, even if the FW is divided into more than the number of regions that can be set to the information processing apparatus 100E, because the region setting can be dynamically changed, flexible divided verification can be realized.

In the fifth embodiment, an example in which the secure program is first activated has been described as in the first embodiment described above. However, as in the second embodiment described above, the configuration of the fifth embodiment can be such that the IPL is activated first. Further, as the method of updating the access right to the verification target region, the subsidiary region can be used as in the modification of the first embodiment, or the security processing can have a configuration of using the load, the integrity check, the cryptographic processing, and other types of processing in combination, as in the first modification, the second modification, and the third modification of the second embodiment described above.

Further, the fifth embodiment can be combined with advance verification in the third embodiment or the fourth embodiment, and by resetting the region before the empty region to which the access right can be set is lost, the performance penalty at the time of occurrence of verification due to an access right violation can be reduced.

According to at least one of the embodiments described above, it is possible to realize appropriate divided verification even in a low-end information device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a first memory in which firmware is stored; and
a processor programmed to:
at a time of activating the information processing apparatus, assign a first access right to a verification target region of the first memory, the first access right causing, upon the verification target region being accessed, a violation of an access right of the first memory;
detect an access to the first memory;
check whether the access to the first memory violates the first access right;

upon detecting that the access to the first memory violates the first access right, perform an integrity check with respect to the verification target region of the first memory; and update the first access right corresponding to the verification target region, to which the integrity check has been performed.

2. The information processing apparatus according to claim 1, wherein the processor is programmed to determine whether the access to the first memory that violates the first access right invokes the integrity check with respect to the verification target region based on security processing information including at least information indicating a range of the verification target region of the first memory and information regarding the access to the first memory that violates the first access right.

3. The information processing apparatus according to claim 1, wherein at the time of activating the information processing apparatus, the first access right common to a memory space including a plurality of verification target regions is assigned, and the processor is programmed to update only the first access right corresponding to the verification target region, to which the integrity check has been performed, of the memory space including the plurality of verification target regions.

4. The information processing apparatus according to claim 3, wherein the processor is configured to add a region having a new access right corresponding to the verification target region, to which the integrity check has been performed, thereby updating the first access right corresponding to the verification target region.

5. The information processing apparatus according to claim 3, wherein the processor is configured to switch the first access right assigned to the verification target region, to which the integrity check has been performed, from disabled to enabled, thereby updating the first access right corresponding to the verification target region.

6. The information processing apparatus according to claim 1, further comprising:

a second memory that is unupdatable from the processor, and in which an initial execution program to be executed first by the processor at the time of activating the information processing apparatus is stored, wherein the processor is programmed by a secure program included in the firmware to perform the integrity check with respect to the verification target, and the secure program is subjected to an integrity check by the processor programmed to execute the initial execution program prior to execution of the secure program.

7. The information processing apparatus according to claim 1, wherein the processor is programmed to perform the integrity check with respect to the verification target region of a memory space of the first memory in which the firmware is stored.

8. The information processing apparatus according to claim 1, wherein the first memory includes a first memory space in which the firmware is stored and a second memory space to which at least a part of data of the firmware is to be loaded, the processor is programmed to load data of the verification target region, to which the integrity check is to be performed, from the first memory space to the second memory space, and the processor is programmed to perform the integrity check with respect to the verification target region of the second memory space.

9. The information processing apparatus according to claim 1, wherein the processor is programmed to:

upon detecting that the access to the first memory that violates the first access right invokes cryptographic processing with respect to a predetermined target region, perform the cryptographic processing with respect to the target region, and update the first access right corresponding to the predetermined target region to which the cryptographic processing has been performed.

10. The information processing apparatus according to claim 1, wherein the processor includes a plurality of processor cores including a first processor core and a second processor core, the second processor core being configured to specialize in processing of the integrity check.

11. The information processing apparatus according to claim 1, wherein the processor is programmed to:

set an advance verification generation rule with respect to the verification target region, and perform the integrity check with respect to the verification target region, when the advance verification generation rule is satisfied even if the access to the first memory does not violate the first access right.

12. The information processing apparatus according to claim 11, wherein, in a case where the integrity check to the verification target region according to the advance verification generation rule has failed, the processor is programmed to perform an operation to inhibit access to the verification target region.

13. The information processing apparatus according to claim 1, the processor is programmed to;

reset a region to which an access right has been set, and secure a region to which a new access right can be set.

14. The information processing apparatus according to claim 1, wherein the information processing apparatus communicates with a host via an interface and accesses the first memory in response to a request from the host.

15. A computer program product comprising a non-transitory computer-readable medium, wherein a computer program included in the medium causes a computer including a first memory in which firmware is stored, to execute:

as an initial setting, assigning a first access right to a verification target region of the first memory, the first access right causing, upon the verification target region being accessed, a violation of an access right of the first memory;

detecting an access to the first memory;

checking whether the access to the first memory violates the first access right;

upon detecting that the access to the first memory violates the first access right, performing an integrity check with respect to the verification target region of the first memory; and updating the first right corresponding to the verification target region, to which the integrity check has been performed.

* * * * *